US011094288B2

(12) United States Patent
Buckley et al.

(10) Patent No.: US 11,094,288 B2
(45) Date of Patent: Aug. 17, 2021

(54) METHOD AND APPARATUS FOR RENDERING COLOR IMAGES

(71) Applicant: E INK CORPORATION, Billerica, MA (US)

(72) Inventors: Edward Buckley, Melrose, MA (US); Kenneth R. Crounse, Somerville, MA (US); Stephen J. Telfer, Arlington, MA (US); Sunil Krishna Sainis, Melrose, MA (US)

( * ) Notice: Subject to any disclaimer, the term of this patent is extended or adjusted under 35 U.S.C. 154(b) by 0 days.

(21) Appl. No.: 16/576,350

(22) Filed: Sep. 19, 2019

(65) Prior Publication Data

US 2020/0020301 A1 Jan. 16, 2020

Related U.S. Application Data

(62) Division of application No. 15/910,081, filed on Mar. 2, 2018, now Pat. No. 10,467,984.

(Continued)

(51) Int. Cl.

| | |
|---|---|
| ***G09G 5/06*** | (2006.01) |
| ***G09G 3/20*** | (2006.01) |
| ***G09G 3/34*** | (2006.01) |
| ***G09G 3/38*** | (2006.01) |
| ***H04N 1/60*** | (2006.01) |
| ***H04N 5/202*** | (2006.01) |
| ***H04N 5/57*** | (2006.01) |
| ***H04N 9/64*** | (2006.01) |
| ***H04N 9/69*** | (2006.01) |

(52) U.S. Cl.

CPC ............ *G09G 5/06* (2013.01); *G09G 3/2003* (2013.01); *G09G 3/2059* (2013.01); *G09G 3/344* (2013.01); *G09G 3/38* (2013.01); *G09G 3/2044* (2013.01); *G09G 2320/0209* (2013.01); *G09G 2320/0214* (2013.01); *G09G 2320/0242* (2013.01); *G09G 2320/0666* (2013.01); *G09G 2340/06* (2013.01)

(58) Field of Classification Search

CPC combination set(s) only.

See application file for complete search history.

(56) References Cited

U.S. PATENT DOCUMENTS

| | | | |
|---|---|---|---|
| 3,383,993 | A | 5/1968 | Yeh |
| 4,418,346 | A | 11/1983 | Batchelder |
| 5,455,600 | A | 10/1995 | Friedman et al. |
| 5,649,083 | A | 7/1997 | Barkans et al. |

(Continued)

FOREIGN PATENT DOCUMENTS

| | | | |
|---|---|---|---|
| JP | 2005039413 | A | 2/2005 |
| WO | 2013081885 | A1 | 6/2013 |
| WO | 2015036358 | A1 | 3/2015 |

OTHER PUBLICATIONS

Wood, D., "An Electrochromic Renaissance?" Information Display, 18(3), Mar. 24, 2002 Mar 1, 2002.

(Continued)

*Primary Examiner* — Wesner Sajous

(57) ABSTRACT

A system for rendering color images on an electro-optic display when the electro-optic display has a color gamut with a limited palette of primary colors, and/or the gamut is poorly structured (i.e., not a spheroid or obloid). The system uses an iterative process to identify the best color for a given pixel from a palette that is modified to diffuse the color error over the entire electro-optic display. The system additionally accounts for variations in color that are caused by cross-talk between nearby pixels.

6 Claims, 17 Drawing Sheets

Related U.S. Application Data

(60) Provisional application No. 62/509,087, filed on May 20, 2017, provisional application No. 62/585,692, filed on Nov. 14, 2017, provisional application No. 62/585,614, filed on Nov. 14, 2017, provisional application No. 62/585,761, filed on Nov. 14, 2017, provisional application No. 62/591,188, filed on Nov. 27, 2017, provisional application No. 62/509,031, filed on May 19, 2017, provisional application No. 62/467,291, filed on Mar. 6, 2017.

(56) References Cited

U.S. PATENT DOCUMENTS 5,760,761 A 6/1998 Sheridon
5,777,782 A 7/1998 Sheridon
5,808,783 A 9/1998 Crowley
5,872,552 A 2/1999 Gordon, II et al.
5,880,857 A 3/1999 Shiau et al.
5,930,026 A 7/1999 Jacobson et al.
6,017,584 A 1/2000 Albert et al.
6,054,071 A 4/2000 Mikkelsen, Jr.
6,055,091 A 4/2000 Sheridon et al.
6,097,531 A 8/2000 Sheridon
6,128,124 A 10/2000 Silverman
6,130,774 A 10/2000 Albert et al.
6,137,467 A 10/2000 Sheridon et al.
6,144,361 A 11/2000 Gordon, II et al.
6,147,791 A 11/2000 Sheridon
6,172,798 B1 1/2001 Albert et al.
6,184,856 B1 2/2001 Gordon, II et al.
6,225,971 B1 5/2001 Gordon, II et al.
6,241,921 B1 6/2001 Jacobson et al.
6,271,823 B1 8/2001 Gordon, II et al.
6,301,038 B1 10/2001 Fitzmaurice et al.
6,445,489 B1 9/2002 Jacobson et al.
6,504,524 B1 1/2003 Gates et al.
6,512,354 B2 1/2003 Jacobson et al.
6,531,997 B1 3/2003 Gates et al.
6,545,797 B2 4/2003 Chen et al.
6,664,944 B1 12/2003 Albert et al.
6,672,921 B1 1/2004 Liang et al.
6,704,133 B2 3/2004 Gates et al.
6,753,999 B2 6/2004 Zehner et al.
6,788,449 B2 9/2004 Liang et al.
6,788,452 B2 9/2004 Liang et al.
6,825,970 B2 11/2004 Goenaga et al.
6,864,875 B2 3/2005 Drzaic et al.
6,866,760 B2 3/2005 Paolini Jr. et al.
6,870,657 B1 3/2005 Fitzmaurice et al.
6,900,851 B2 5/2005 Morrison et al.
6,914,714 B2 7/2005 Chen et al.
6,922,276 B2 7/2005 Zhang et al.
6,950,220 B2 9/2005 Abramson et al.
6,972,893 B2 12/2005 Chen et al.
6,982,178 B2 1/2006 LeCain et al.
6,995,550 B2 2/2006 Jacobson et al.
7,002,728 B2 2/2006 Pullen et al.
7,012,600 B2 3/2006 Zehner et al.
7,023,420 B2 4/2006 Comiskey et al.
7,034,783 B2 4/2006 Gates et al.
7,038,656 B2 5/2006 Liang et al.
7,038,670 B2 5/2006 Liang et al.
7,046,228 B2 5/2006 Liang et al.
7,052,571 B2 5/2006 Wang et al.
7,061,166 B2 6/2006 Kuniyasu
7,061,662 B2 6/2006 Chung et al.
7,072,095 B2 7/2006 Liang et al.
7,075,502 B1 7/2006 Drzaic et al.
7,116,318 B2 10/2006 Amundson et al.
7,116,466 B2 10/2006 Whitesides et al.
7,119,772 B2 10/2006 Amundson et al.
7,144,942 B2 12/2006 Zang et al.
7,167,155 B1 1/2007 Albert et al.
7,170,670 B2 1/2007 Webber
7,177,066 B2 2/2007 Chung et al.
7,193,625 B2 3/2007 Danner et al.
7,202,847 B2 4/2007 Gates
7,236,291 B2 6/2007 Kaga et al.
7,242,514 B2 7/2007 Chung et al.
7,259,744 B2 8/2007 Arango et al.
7,263,382 B2 8/2007 Chandhok et al.
7,304,787 B2 12/2007 Whitesides et al.
7,312,784 B2 12/2007 Baucom et al.
7,312,794 B2 12/2007 Zehner et al.
7,321,459 B2 1/2008 Masuda et al.
7,327,511 B2 2/2008 Whitesides et al.
7,330,193 B2 2/2008 Bhattacharjya
7,339,715 B2 3/2008 Webber et al.
7,385,751 B2 6/2008 Chen et al.
7,408,699 B2 8/2008 Wang et al.
7,411,719 B2 8/2008 Paolini, Jr. et al.
7,420,549 B2 9/2008 Jacobson et al.
7,453,445 B2 11/2008 Amundson
7,492,339 B2 2/2009 Amundson
7,492,505 B2 2/2009 Liang et al.
7,528,822 B2 5/2009 Amundson et al.
7,535,624 B2 5/2009 Amundson et al.
7,545,358 B2 6/2009 Gates et al.
7,561,324 B2 7/2009 Duthaler et al.
7,583,251 B2 9/2009 Arango et al.
7,602,374 B2 10/2009 Zehner et al.
7,612,760 B2 11/2009 Kawai
7,667,684 B2 2/2010 Jacobson et al.
7,679,599 B2 3/2010 Kawai
7,679,813 B2 3/2010 Liang et al.
7,679,814 B2 3/2010 Paolini, Jr. et al.
7,683,606 B2 3/2010 Kang et al.
7,684,108 B2 3/2010 Wang et al.
7,688,297 B2 3/2010 Zehner et al.
7,715,088 B2 5/2010 Liang et al.
7,729,039 B2 6/2010 LeCain et al.
7,733,311 B2 6/2010 Amundson et al.
7,733,335 B2 6/2010 Zehner et al.
7,773,769 B2 8/2010 Rattan et al.
7,787,169 B2 8/2010 Abramson et al.
7,791,789 B2 9/2010 Albert et al.
7,800,813 B2 9/2010 Wu et al.
7,821,702 B2 10/2010 Liang et al.
7,839,564 B2 11/2010 Whitesides et al.
7,859,742 B1 12/2010 Chiu et al.
7,910,175 B2 3/2011 Webber
7,952,557 B2 5/2011 Amundson et al.
7,952,790 B2 5/2011 Honeyman et al.
7,956,841 B2 6/2011 Albert et al.
7,982,479 B2 7/2011 Wang et al.
7,982,941 B2 7/2011 Lin et al.
7,999,787 B2 8/2011 Amundson et al.
8,040,594 B2 10/2011 Paolini, Jr. et al.
8,054,526 B2 11/2011 Bouchard
8,077,141 B2 12/2011 Duthaler et al.
8,098,418 B2 1/2012 Paolini, Jr. et al.
8,125,501 B2 2/2012 Amundson et al.
8,139,050 B2 3/2012 Jacobson et al.
8,159,636 B2 4/2012 Sun et al.
8,174,490 B2 5/2012 Whitesides et al.
8,213,076 B2 7/2012 Albert et al.
8,243,013 B1 8/2012 Sprague et al.
8,274,472 B1 9/2012 Wang et al.
8,289,250 B2 10/2012 Zehner et al.
8,300,006 B2 10/2012 Zhou et al.
8,305,341 B2 11/2012 Arango et al.
8,314,784 B2 11/2012 Ohkami et al.
8,319,759 B2 11/2012 Jacobson et al.
8,355,169 B2 1/2013 Hersch et al.
8,363,299 B2 1/2013 Paolini, Jr. et al.
8,373,649 B2 2/2013 Low et al.
8,384,658 B2 2/2013 Albert et al.
8,422,116 B2 4/2013 Sprague et al.
8,441,714 B2 5/2013 Paolini, Jr. et al.
8,441,716 B2 5/2013 Paolini, Jr. et al.
8,456,414 B2 6/2013 Lin et al.
8,462,102 B2 6/2013 Wong et al.
8,466,852 B2 6/2013 Drzaic et al.

(56) References Cited

U.S. PATENT DOCUMENTS

| | | | | |
|---|---|---|---|---|
| 8,503,063 | B2 | 8/2013 | Sprague | |
| 8,514,168 | B2 | 8/2013 | Chung et al. | |
| 8,537,105 | B2 | 9/2013 | Chiu et al. | |
| 8,558,783 | B2 | 10/2013 | Wilcox et al. | |
| 8,558,785 | B2 | 10/2013 | Zehner et al. | |
| 8,558,786 | B2 | 10/2013 | Lin | |
| 8,558,855 | B2 | 10/2013 | Sprague et al. | |
| 8,576,164 | B2 | 11/2013 | Sprague et al. | |
| 8,576,259 | B2 | 11/2013 | Lin et al. | |
| 8,576,470 | B2 | 11/2013 | Paolini, Jr. et al. | |
| 8,576,475 | B2 | 11/2013 | Huang | |
| 8,576,476 | B2 | 11/2013 | Telfer et al. | |
| 8,593,396 | B2 | 11/2013 | Amundson et al. | |
| 8,593,721 | B2 | 11/2013 | Albert et al. | |
| 8,605,032 | B2 | 12/2013 | Liu et al. | |
| 8,605,354 | B2 | 12/2013 | Zhang et al. | |
| 8,643,595 | B2 | 2/2014 | Chung et al. | |
| 8,649,084 | B2 | 2/2014 | Wang et al. | |
| 8,649,785 | B2 | 2/2014 | Durand et al. | |
| 8,665,206 | B2 | 3/2014 | Lin et al. | |
| 8,670,174 | B2 | 3/2014 | Sprague et al. | |
| 8,681,191 | B2 | 3/2014 | Yang et al. | |
| 8,704,756 | B2 | 4/2014 | Lin | |
| 8,717,664 | B2 | 5/2014 | Wang et al. | |
| 8,730,153 | B2 | 5/2014 | Sprague et al. | |
| 8,780,133 | B2 | 7/2014 | Jeong et al. | |
| 8,786,935 | B2 | 7/2014 | Sprague | |
| 8,797,634 | B2 | 8/2014 | Paolini, Jr. et al. | |
| 8,804,196 | B2 | 8/2014 | Kuno | |
| 8,810,525 | B2 | 8/2014 | Sprague | |
| 8,810,899 | B2 | 8/2014 | Sprague | |
| 8,830,559 | B2 | 9/2014 | Honeyman et al. | |
| 8,873,129 | B2 | 10/2014 | Paolini, Jr. et al. | |
| 8,902,153 | B2 | 12/2014 | Bouchard et al. | |
| 8,902,491 | B2 | 12/2014 | Wang et al. | |
| 8,917,439 | B2 | 12/2014 | Wang et al. | |
| 8,928,562 | B2 | 1/2015 | Gates et al. | |
| 8,928,641 | B2 | 1/2015 | Chiu et al. | |
| 8,964,282 | B2 | 2/2015 | Wang et al. | |
| 8,976,444 | B2 | 3/2015 | Zhang et al. | |
| 9,013,394 | B2 | 4/2015 | Lin | |
| 9,013,783 | B2 | 4/2015 | Sprague | |
| 9,019,197 | B2 | 4/2015 | Lin | |
| 9,019,198 | B2 | 4/2015 | Lin et al. | |
| 9,019,318 | B2 | 4/2015 | Sprague et al. | |
| 9,082,352 | B2 | 7/2015 | Cheng et al. | |
| 9,116,412 | B2 | 8/2015 | Lin | |
| 9,129,547 | B2 | 9/2015 | Zeng | |
| 9,146,439 | B2 | 9/2015 | Zhang | |
| 9,164,207 | B2 | 10/2015 | Honeyman et al. | |
| 9,170,467 | B2 | 10/2015 | Whitesides et al. | |
| 9,170,468 | B2 | 10/2015 | Lin et al. | |
| 9,171,508 | B2 | 10/2015 | Sprague et al. | |
| 9,182,646 | B2 | 11/2015 | Paolini, Jr. et al. | |
| 9,195,111 | B2 | 11/2015 | Anseth et al. | |
| 9,199,441 | B2 | 12/2015 | Danner | |
| 9,218,773 | B2 | 12/2015 | Sun et al. | |
| 9,224,338 | B2 | 12/2015 | Chan et al. | |
| 9,224,342 | B2 | 12/2015 | Sprague et al. | |
| 9,224,344 | B2 | 12/2015 | Chung et al. | |
| 9,230,492 | B2 | 1/2016 | Harrington et al. | |
| 9,251,736 | B2 | 2/2016 | Lin et al. | |
| 9,251,802 | B2 | 2/2016 | Crockett et al. | |
| 9,262,973 | B2 | 2/2016 | Wu et al. | |
| 9,268,191 | B2 | 2/2016 | Paolini, Jr. et al. | |
| 9,269,311 | B2 | 2/2016 | Amundson | |
| 9,279,906 | B2 | 3/2016 | Kang | |
| 9,285,649 | B2 | 3/2016 | Du et al. | |
| 9,293,511 | B2 | 3/2016 | Jacobson et al. | |
| 9,299,294 | B2 | 3/2016 | Lin et al. | |
| 9,341,916 | B2 | 5/2016 | Telfer et al. | |
| 9,360,733 | B2 | 6/2016 | Wang et al. | |
| 9,361,836 | B1 | 6/2016 | Telfer et al. | |
| 9,373,289 | B2 | 6/2016 | Sprague et al. | |
| 9,383,623 | B2 | 7/2016 | Lin et al. | |
| 9,390,066 | B2 | 7/2016 | Smith et al. | |
| 9,390,661 | B2 | 7/2016 | Chiu et al. | |
| 9,412,314 | B2 | 8/2016 | Amundson et al. | |
| 9,423,666 | B2 | 8/2016 | Wang et al. | |
| 9,459,510 | B2 | 10/2016 | Lin | |
| 9,460,666 | B2 | 10/2016 | Sprague et al. | |
| 9,495,918 | B2 | 11/2016 | Harrington et al. | |
| 9,501,981 | B2 | 11/2016 | Lin et al. | |
| 9,509,935 | B2 | 11/2016 | Wilson et al. | |
| 9,513,527 | B2 | 12/2016 | Chan et al. | |
| 9,513,743 | B2 | 12/2016 | Sjodin et al. | |
| 9,514,667 | B2 | 12/2016 | Lin | |
| 9,541,814 | B2 | 1/2017 | Lin et al. | |
| 9,542,895 | B2 | 1/2017 | Gates et al. | |
| 9,564,088 | B2 | 2/2017 | Wilcox et al. | |
| 9,612,502 | B2 | 4/2017 | Danner et al. | |
| 9,620,048 | B2 | 4/2017 | Sim et al. | |
| 9,620,067 | B2 | 4/2017 | Harrington et al. | |
| 9,671,668 | B2 | 6/2017 | Chan et al. | |
| 9,672,766 | B2 | 6/2017 | Sjodin | |
| 9,691,333 | B2 | 6/2017 | Cheng et al. | |
| 9,697,778 | B2 | 7/2017 | Telfer et al. | |
| 9,721,495 | B2 | 8/2017 | Harrington et al. | |
| 9,740,076 | B2 | 8/2017 | Paolini et al. | |
| 9,759,980 | B2 | 9/2017 | Du et al. | |
| 9,792,861 | B2 | 10/2017 | Chang et al. | |
| 9,792,862 | B2 | 10/2017 | Hung et al. | |
| 9,812,073 | B2 | 11/2017 | Lin et al. | |
| 9,921,451 | B2 | 3/2018 | Telfer et al. | |
| 9,934,595 | B2 | 4/2018 | Safaee-Rad et al. | |
| 9,966,018 | B2 | 5/2018 | Gates et al. | |
| 10,089,960 | B2 | 10/2018 | Greenebaum et al. | |
| 10,162,242 | B2 | 12/2018 | Wang et al. | |
| 10,209,556 | B2 | 2/2019 | Rosenfeld et al. | |
| 10,229,641 | B2 | 3/2019 | Yang et al. | |
| 10,270,939 | B2 | 4/2019 | Crounse | |
| 10,319,313 | B2 | 6/2019 | Harris et al. | |
| 2003/0102858 | A1 | 6/2003 | Jacobson et al. | |
| 2004/0174597 | A1 * | 9/2004 | Craig ..................... | G06Q 30/02<br>359/484.01 |
| 2004/0246562 | A1 | 12/2004 | Chung et al. | |
| 2005/0253777 | A1 | 11/2005 | Zehner et al. | |
| 2007/0081739 | A1 | 4/2007 | Wilbrink et al. | |
| 2007/0091418 | A1 | 4/2007 | Danner et al. | |
| 2007/0103427 | A1 | 5/2007 | Zhou et al. | |
| 2007/0176912 | A1 | 8/2007 | Beames et al. | |
| 2007/0223079 | A1 * | 9/2007 | Honeyman ............ | G02B 5/201<br>359/296 |
| 2008/0024429 | A1 | 1/2008 | Zehner | |
| 2008/0024482 | A1 | 1/2008 | Gates et al. | |
| 2008/0043318 | A1 | 2/2008 | Whitesides et al. | |
| 2008/0048970 | A1 | 2/2008 | Drzaic et al. | |
| 2008/0136774 | A1 | 6/2008 | Harris et al. | |
| 2008/0303780 | A1 | 12/2008 | Sprague et al. | |
| 2009/0174651 | A1 | 7/2009 | Jacobson et al. | |
| 2009/0225398 | A1 | 9/2009 | Duthaler et al. | |
| 2009/0322721 | A1 | 12/2009 | Zehner et al. | |
| 2010/0156780 | A1 | 6/2010 | Jacobson et al. | |
| 2010/0194733 | A1 | 8/2010 | Lin et al. | |
| 2010/0194789 | A1 | 8/2010 | Lin et al. | |
| 2010/0220121 | A1 | 9/2010 | Zehner et al. | |
| 2010/0265561 | A1 | 10/2010 | Gates et al. | |
| 2011/0043543 | A1 | 2/2011 | Chen et al. | |
| 2011/0063314 | A1 | 3/2011 | Chiu et al. | |
| 2011/0175875 | A1 | 7/2011 | Lin et al. | |
| 2011/0193840 | A1 | 8/2011 | Amundson et al. | |
| 2011/0193841 | A1 | 8/2011 | Amundson et al. | |
| 2011/0199671 | A1 | 8/2011 | Amundson et al. | |
| 2011/0221740 | A1 | 9/2011 | Yang et al. | |
| 2012/0001957 | A1 | 1/2012 | Liu et al. | |
| 2012/0098740 | A1 | 4/2012 | Chiu et al. | |
| 2012/0293858 | A1 | 11/2012 | Telfer et al. | |
| 2012/0326957 | A1 | 12/2012 | Drzaic et al. | |
| 2013/0063333 | A1 | 3/2013 | Arango et al. | |
| 2013/0170540 | A1 | 7/2013 | Damkat et al. | |
| 2013/0194250 | A1 | 8/2013 | Amundson et al. | |
| 2013/0242378 | A1 | 9/2013 | Paolini, Jr. et al. | |
| 2013/0249782 | A1 | 9/2013 | Wu et al. | |
| 2013/0278995 | A1 | 10/2013 | Drzaic et al. | |

(56) References Cited

U.S. PATENT DOCUMENTS

| | | | |
|---|---|---|---|
| 2014/0009817 A1 | 1/2014 | Wilcox et al. | |
| 2014/0055840 A1 | 2/2014 | Zang et al. | |
| 2014/0078576 A1 | 3/2014 | Sprague | |
| 2014/0176730 A1 | 6/2014 | Kap Yohsuke et al. | |
| 2014/0204012 A1 | 7/2014 | Wu et al. | |
| 2014/0240210 A1 | 8/2014 | Wu et al. | |
| 2014/0253425 A1 | 9/2014 | Zalesky et al. | |
| 2014/0293398 A1 | 10/2014 | Wang et al. | |
| 2014/0362213 A1 | 12/2014 | Tseng | |
| 2015/0097877 A1 | 4/2015 | Lin et al. | |
| 2015/0118390 A1 | 4/2015 | Rosenfeld et al. | |
| 2015/0243243 A1 | 8/2015 | Greenebaum et al. | |
| 2015/0262255 A1 | 9/2015 | Khajehnouri et al. | |
| 2015/0262551 A1 | 9/2015 | Zehner et al. | |
| 2015/0268531 A1 | 9/2015 | Wang et al. | |
| 2015/0287354 A1 | 10/2015 | Wang et al. | |
| 2015/0301246 A1 | 10/2015 | Zang et al. | |
| 2016/0026062 A1 | 1/2016 | Zhang | |
| 2016/0048054 A1 | 2/2016 | Danner | |
| 2016/0091770 A1 | 3/2016 | Bouchard et al. | |
| 2016/0140910 A1 | 5/2016 | Amundson | |
| 2016/0180777 A1 | 6/2016 | Lin et al. | |
| 2016/0275879 A1 | 9/2016 | Hodges et al. | |
| 2017/0148372 A1 | 5/2017 | Emelie et al. | |
| 2019/0011703 A1* | 1/2019 | Robaina | G06F 3/011 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct 24, 1991.

Bach, Udo. et al., "Nanomaterials-Based Electrochromics for Paper-Quality Displays", Adv. Mater, vol. 14, No. 11, pp. 845-848, (Jun. 5, 2002). Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

Kitamura, T. et al., "Electrical toner movement for electronic paper-like display", Asia Display/IDW '01, pp. 1517-1520, Paper HCS1-1 (2001). Jan. 1, 2001.

Yamaguchi, Y. et al., "Toner display using insulative particles charged triboelectrically", Asia Display/IDW '01, pp. 1729-1730, Paper AMD4-4 (2001). Jan. 1, 2001.

Pappas, Thrasyvoulos N. "Model-based halftoning of color images." IEEE Transactions on image processing 6.7 (1997): 1014-1024. Jul. 1, 1997.

Mitsa, T. et al., "Digital halftoning technique using a blue-noise mask", J. Opt. Soc. Am. A, vol. 9, No. 11, p. 1920, (Nov. 1992). Nov. 1, 1992.

Kuang, Jiangtao et al. "iCAM06: A refined image appearance model for HDR image rendering." J. Vis. Commun. Image R. 18 (2007) 406-414. Jan. 1, 2007.

Pouli, Tania et al. "Color Correction for Tone Reproduction" CIC21: Twenty-first Color and Imaging Conference, Albuquerque, New Mexico, USA, (Nov. 2013), pp. 215-220. Nov. 1, 2013.

Kang, Henry, "Computational Color Technology", SPIE Press, 2006. Jan. 1, 2006.

Balasubramanian, Raja et al., "Method for Quantifying the Color Gamut of an Output Device", SPIE Proceedings vol. 3018, (Apr. 4, 1997). Apr. 4, 1997.

European Patent Office, PCT/US2018/020588, International Search Report and Written Opinion, dated Jul. 9, 2018, dated Jul 9, 2018.

* cited by examiner

METHOD AND APPARATUS FOR RENDERING COLOR IMAGES

REFERENCE TO RELATED APPLICATIONS

This application is a divisional of U.S. Ser. No. 15/910,081 filed on Mar. 2, 2018, which claims benefit of:

1. Provisional Application Ser. No. 62/467,291, filed Mar. 6, 2017;
2. Provisional Application Ser. No. 62/509,031, filed May 19, 2017;
3. Provisional Application Ser. No. 62/509,087, filed May 20, 2017;
4. Provisional Application Ser. No. 62/585,614, filed Nov. 14, 2017;
5. Provisional Application Ser. No. 62/585,692, filed Nov. 14, 2017;
6. Provisional Application Ser. No. 62/585,761, filed Nov. 14, 2017; and
7. Provisional Application Ser. No. 62/591,188, filed Nov. 27, 2017;

This application is related to application Ser. No. 14/277,107, filed May 14, 2014 (Publication No. 2014/0340430, now U.S. Pat. No. 9,697,778); application Ser. No. 14/866,322, filed Sep. 25, 2015 (Publication No. 2016/0091770); U.S. Pat. Nos. 9,383,623 and 9,170,468, application Ser. No. 15/427,202, filed Feb. 8, 2017 (Publication No. 2017/0148372) and application Ser. No. 15/592,515, filed May 11, 2017 (Publication No. 2017/0346989). The entire contents of these co-pending applications and patents (which may hereinafter be referred to the "electrophoretic color display" or "ECD" patents), and of all other U.S. patents and published and co-pending applications mentioned below, are herein incorporated by reference.

This application is also related to U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/

0070744; 2015/0097877; 2015/0109283; 2015/0213749; 2015/0213765; 2015/0221257; 2015/0262255; 2015/0262551; 2016/0071465; 2016/0078820; 2016/0093253; 2016/0140910; and 2016/0180777. These patents and applications may hereinafter for convenience collectively be referred to as the "MEDEOD" (MEthods for Driving Electro-Optic Displays) applications.

BACKGROUND OF INVENTION

This invention relates to a method and apparatus for rendering color images. More specifically, this invention relates to a method for half-toning color images in situations where a limited set of primary colors are available, and this limited set may not be well structured. This method may mitigate the effects of pixelated panel blooming (i.e., the display pixels not being the intended color because that pixel is interacting with nearby pixels), which can alter the appearance of a color electro-optic (e.g., electrophoretic) or similar display in response to changes in ambient surroundings, including temperature, illumination, or power level. This invention also relates to a methods for estimating the gamut of a color display.

The term "pixel" is used herein in its conventional meaning in the display art to mean the smallest unit of a display capable of generating all the colors which the display itself can show.

Half-toning has been used for many decades in the printing industry to represent gray tones by covering a varying proportion of each pixel of white paper with black ink. Similar half-toning schemes can be used with CMY or CMYK color printing systems, with the color channels being varied independently of each other.

However, there are many color systems in which the color channels cannot be varied independently of one another, in as much as each pixel can display any one of a limited set of primary colors (such systems may hereinafter be referred to as "limited palette displays" or "LPD's"); the ECD patent color displays are of this type. To create other colors, the primaries must be spatially dithered to produce the correct color sensation.

Standard dithering algorithms such as error diffusion algorithms (in which the "error" introduced by printing one pixel in a particular color which differs from the color theoretically required at that pixel is distributed among neighboring pixels so that overall the correct color sensation is produced) can be employed with limited palette displays. There is an enormous literature on error diffusion; for a review see Pappas, Thrasyvoulos N. "Model-based halftoning of color images," IEEE Transactions on Image Processing 6.7 (1997): 1014-1024.

ECD systems exhibit certain peculiarities that must be taken into account in designing dithering algorithms for use in such systems. Inter-pixel artifacts are a common feature in such systems. One type of artifact is caused by so-called "blooming"; in both monochrome and color systems, there is a tendency for the electric field generated by a pixel electrode to affect an area of the electro-optic medium wider than that of the pixel electrode itself so that, in effect, one pixel's optical state spreads out into parts of the areas of adjacent pixels. Another kind of crosstalk is experienced when driving adjacent pixels brings about a final optical state, in the area between the pixels that differs from that reached by either of the pixels themselves, this final optical state being caused by the averaged electric field experienced in the inter-pixel region. Similar effects are experienced in monochrome systems, but since such systems are onedimensional in color space, the inter-pixel region usually displays a gray state intermediate the states of the two adjacent pixel, and such an intermediate gray state does not greatly affect the average reflectance of the region, or it can easily be modeled as an effective blooming. However, in a color display, the inter-pixel region can display colors not present in either adjacent pixel.

The aforementioned problems in color displays have serious consequences for the color gamut and the linearity of the color predicted by spatially dithering primaries. Consider using a spatially dithered pattern of saturated Red and Yellow from the primary palette of an ECD display to attempt to create a desired orange color. Without crosstalk, the combination required to create the orange color can be predicted perfectly in the far field by using linear additive color mixing laws. Since Red and Yellow are on the color gamut boundary, this predicted orange color should also be on the gamut boundary. However, if the aforementioned effects produce (say) a blueish band in the inter-pixel region between adjacent Red and Yellow pixels, the resulting color will be much more neutral than the predicted orange color. This results in a “dent” in the gamut boundary, or, to be more accurate since the boundary is actually three-dimensional, a scallop. Thus, not only does a naïve dithering approach fail to accurately predict the required dithering, but it may as in this case attempt to produce a color which is not available since it is outside the achievable color gamut.

Ideally, one would like to be able to predict the achievable gamut by extensive measurement of patterns or advanced modeling. This may be not be feasible if the number of device primaries is large, or if the crosstalk errors are large compared to the errors introduced by quantizing pixels to a primary colors. The present invention provides a dithering method that incorporates a model of blooming/crosstalk errors such that the realized color on the display is closer to the predicted color. Furthermore, the method stabilizes the error diffusion in the case that the desired color falls outside the realizable gamut, since normally error diffusion will produce unbounded errors when dithering to colors outside the convex hull of the primaries.

FIG. 1 of the accompanying drawings is a schematic flow diagram of a prior art error diffusion method, generally designated 100, as described in the aforementioned Pappas paper (“Model-based halftoning of color images,” IEEE Transactions on Image Processing 6.7 (1997): 1014-1024.) At input 102, color values $x_{i,j}$ are fed to a processor 104, where they are added to the output of an error filter 106 (described below) to produce a modified input $u_{i,j}$. (This description assumes that the input values $x_{i,j}$ are such that the modified inputs $u_{i,j}$ are within the color gamut of the device. If this is not the case, some preliminary modification of the inputs or modified inputs may be necessary to ensure that they lie within the appropriate color gamut.) The modified inputs $u_{i,j}$ are fed to a threshold module 108. The module 108 determines the appropriate color for the pixel being considered and feeds the appropriate colors to the device controller (or stores the color values for later transmission to the device controller). The outputs $y_{i,j}$ are fed to a module 110 which corrects these outputs for the effect of dot overlap in the output device. Both the modified inputs $u_{i,j}$ and the outputs $y'_{i,j}$ from module 110 are fed to a processor 112, which calculates error values $e_{i,j}$, where:

$$e_{i,j}=u_{i,j}-y'_{i,j}$$

The error values $e_{i,j}$ are then fed to the error filter 106, which serves to distribute the error values over one or more selected pixels. For example, if the error diffusion is being carried out on pixels from left to right in each row and from top to bottom in the image, the error filter 106 might distribute the error over the next pixel in the row being processed, and the three nearest neighbors of the pixel being processed in the next row down. Alternatively, the error filter 106 might distribute the error over the next two pixels in the row being processed, and the nearest neighbors of the pixel being processed in the next two rows down. It will be appreciated that the error filter need not apply the same proportion of the error to each of the pixels over which the error is distributed; for example when the error filter 106 distributes the error over the next pixel in the row being processed, and the three nearest neighbors of the pixel being processed in the next row down, it may be appropriate to distribute more of the error to the next pixel in the row being processed and to the pixel immediately below the pixel being processed, and less of the error to the two diagonal neighbors of the pixel being processed.

Unfortunately, when conventional error diffusion methods (e.g., FIG. 1) are applied to ECD and similar limited palette displays, severe artifacts are generated that may render the resulting images unusable. For example, the threshold module 108 operates on the error-modified input values $u_{i,j}$ to select the output primary, and then the next error is computed by applying the model to the resulting output region (or what is known of it causally). If the model output color deviates significantly from the selected primary color, huge errors can be generated, which can lead to very grainy output because of huge swings in primary choices, or unstable results.

The present invention seeks to provide a method of rendering color images which reduces or eliminates the problems of instability caused by such conventional error diffusion methods. The present invention provides an image processing method designed to decrease dither noise while increasing apparent contrast and gamut-mapping for color displays, especially color electrophoretic displays, so as to allow a much broader range of content to be shown on the display without serious artifacts.

This invention also relates to a hardware system for rendering images on an electronic paper device, in particular color images on an electrophoretic display, e.g., a four particle electrophoretic display with an active matrix backplane. By incorporating environmental data from the electronic paper device, a remote processor can render image data for optimal viewing. The system additionally allows the distribution of computationally-intensive calculations, such as determining a color space that is optimum for both the environmental conditions and the image that will be displayed.

Electronic displays typically include an active matrix backplane, a master controller, local memory and a set of communication and interface ports. The master controller receives data via the communication/interface ports or retrieves it from the device memory. Once the data is in the master controller, it is translated into a set of instruction for the active matrix backplane. The active matrix backplane receives these instructions from the master controller and produces the image. In the case of a color device, on-device gamut computations may require a master controller with increased computational power. As indicated above, rendering methods for color electrophoretic displays are often computational intense, and although, as discussed in detail below, the present invention itself provides methods for reducing the computational load imposed by rendering, both the rendering (dithering) step and other steps of the overall rendering process may still impose major loads on device computational processing systems.

The increased computational power required for image rendering diminishes the advantages of electrophoretic displays in some applications. In particular, the cost of manufacturing the device increases, as does the device power consumption, when the master controller is configured to perform complicated rendering algorithms. Furthermore, the extra heat generated by the controller requires thermal management. Accordingly, at least in some cases, as for example when very high resolution images, or a large number of images need to be rendered in a short time, it may be desirable to move many of the rendering calculations off the electrophoretic device itself.

SUMMARY OF INVENTION

Accordingly, in one aspect this invention provides a system for producing a color image. The system includes an electro-optic display having pixels and a color gamut including a palette of primaries; and a processor in communication with the electro-optic display. The processor is configured to render color images for the electro-optic device by performing the following steps: a) receiving first and second sets of input values representing colors of first and second pixels of an image to be displayed on the electro-optic display; b) equating the first set of input values to a first modified set of input values; c) projecting the first modified set of input value on to the color gamut to produce a first projected modified set of input values when the first modified set of input values produced in step b is outside the color gamut; d) comparing the first modified set of input values from step b or the first projected modified set of input values from step c to a set of primary values corresponding to the primaries of the palette, selecting the set of primary values corresponding to the primary with the smallest error, thereby defining a first best primary value set, and outputting the first best primary value set as the color of the first pixel; e) replacing the first best primary value set in the palette with the first modified set of input values from step b or the first projected modified set of input values from step c to produce a modified palette; f) calculating a difference between the first modified set of input values from step b or the first projected modified set of input values from step c and the first best primary value set from step e to derive a first error value; g) adding to the second set of input values the first error value to create a second modified set of input values; h) projecting the second modified set of input value on to the color gamut to produce a second projected modified set of input values when the second modified set of input values produced in step g is outside the color gamut; i) comparing the second modified set of input values from step g or the second projected modified set of input values from step h to the set of primary values corresponding to the primaries of the modified palette, selecting the set of primary values corresponding to the primary from the modified palette with the smallest error, thereby defining a second best primary value set, and outputting the second best primary value set as the color of the second pixel. In some embodiments, the processor additionally j) replaces the second best primary value set in the modified palette with the second modified set of input values from step g or the second projected modified set of input values from step h to produce a second modified palette. The processor is configured to hand off the best primary values for the respective pixels to a controller of the electro-optic display, whereby those colors are shown at the respective pixels of the electro-optic display.

In another aspect, this invention provides a method of rendering color images on an output device having a color gamut derived from a palette of primary colors, the method comprising:

a. receiving a sequence of input values each representing the color of a pixel of an image to be rendered;
b. for each input value after the first input value, adding to the input value an error value derived from at least one input value previously processed to produce a modified input value;
c. if the modified input value produced in step b is outside the color gamut, projecting the modified input value on to the color gamut to produce a projected modified input value;
d. for each input value after the first input value, modifying the palette to allow for the effects of the output value e of at least one pixel previously processed, thereby producing a modified palette;
e. comparing the modified input value from step b or the projected modified input value from step c with the primaries in the modified palette, selecting the primary with the smallest error, and outputting this primary as the color value for the pixel corresponding the input value being processed;
f. calculating the difference between the modified or projected modified input value used in step e and the primary output from step e to derive an error value, and using at least a portion of this error value as the error value input to step b for at least one later-processed input value; and
g. using the primary output value from step e in step d of at least one later-processed input value.

The method of the present invention may further comprise displaying at least a portion of the primary outputs as an image on a display device having the color gamut used in the method.

In one form of the present method, the projection in step c is effected along lines of constant brightness and hue in a linear RGB color space on to a nominal gamut. The comparison ("quantization") in step e may be effected using a minimum Euclidean distance quantizer in a linear RGB space. Alternatively, the comparison may be effected by barycentric thresholding (choosing the primary associated with the largest barycentric coordinate) as described in the aforementioned application Ser. No. 15/592,515. If, however, barycentric thresholding is employed, the color gamut used in step c of the method should be that of the modified palette used in step e of the method lest the barycentric thresholding give unpredictable and unstable results.

In one form of the present method, the input values are processed in an order corresponding to a raster scan of the pixels, and in step d the modification of the palette allows for the output values corresponding to the pixel in the previously-processed row which shares an edge with the pixel corresponding to the input value being processed, and the previously-processed pixel in the same row which shares an edge with the pixel corresponding to the input value being processed.

The variant of the present method using barycentric quantization may be summarized as follows:

1. Partition the gamut into tetrahedra using a Delaunay triangulation;
2. Determine the convex hull of the device color gamut;
3. For a color outside of the gamut convex hull:
   a. Project back onto the gamut boundary along some line;

b. Compute the intersection of that line with the tetrahedra comprising the color space;

c. Find the tetrahedron which encloses the color and the associated barycentric weights;

d. Determine the dithered color by the tetrahedron vertex having the largest barycentric weight.

4. For a color inside the convex hull:

a. Find the tetrahedron which encloses the color and the associated barycentric weights;

b. Determine the dithered color by the tetrahedron vertex having the largest barycentric weight.

This variant of the present method, however, has the disadvantages of requiring both the Delaunay triangulation and the convex hull of the color space to be calculated, and these calculations make extensive computational demands, to the extent that, in the present state of technology, the variant is in practice impossible to use on a stand-alone processor. Furthermore, image quality is compromised by using barycentric quantization inside the color gamut hull. Accordingly, there is a need for a further variant of the present method which is computationally more efficient and exhibits improved image quality by choice of both the projection method used for colors outside the gamut hull and the quantization method used for colors within the gamut hull.

Using the same format as above, this further variant of the method of the present invention (which may hereinafter be referred to as the "triangle barycentric" or "TB" method may be summarized as follows:

1. Determine the convex hull of the device color gamut;

2. For a color (EMIC) outside the gamut convex hull:

a. Project back onto the gamut boundary along some line;

b. Compute the intersection of that line with the triangles which make up the surface of the gamut;

c. Find the triangle which encloses the color and the associated barycentric weights;

d. Determine the dithered color by the triangle vertex having the largest barycentric weight.

3. For a color (EMIC) inside the convex hull, determine the "nearest" primary color from the primaries, where "nearest" is calculated as a Euclidean distance in the color space, and use the nearest primary as the dithered color.

In other words, the triangle barycentric variant of the present method effects step c of the method by computing the intersection of the projection with the surface of the gamut, and then effects step e in two different ways depending upon whether the EMIC (the product of step b) is inside or outside the color gamut. If the EMIC is outside the gamut, the triangle which encloses the aforementioned intersection is determined, the barycentric weights for each vertex of this triangle is determined, and the output from step e is the triangle vertex having largest barycentric weight. If, however, the EMIC is within the gamut, the output from step e is the nearest primary calculated by Euclidean distance.

As may be seen from the foregoing summary, the TB method differs from the variants of the present method previously discussed by using differing dithering methods depending upon whether the EMIC is inside or outside the gamut. If the EMIC is inside the gamut, a nearest neighbor method is used to find the dithered color; this improves image quality because the dithered color can be chosen from any primary, not simply from the four primaries which make up the enclosing tetrahedron, as in previous barycentric quantizing methods. (Note that, because the primaries are often distributed in a highly irregular manner, the nearest neighbor may well be a primary which is not a vertex of the enclosing tetrahedron.)

If, on the other hand, the EMIC is outside the gamut, projection is effected back along some line until the line intersects the convex hull of the color gamut. Since only the intersection with the convex hull is considered, and not the Delaunay triangulation of the color space, it is only necessary to compute the intersection of the projection line with the triangles that comprise the convex hull. This substantially reduces the computational burden of the method and ensures that colors on the gamut boundary are now represented by at most three dithered colors.

The TB method is preferably conducted in an opponent-type color space so that the projection on to the color gamut is guaranteed to preserve the EMIC hue angle; this represents an improvement over the '291 method. Also, for best results the calculation of the Euclidian distance (to identify the nearest neighbor for EMIC lying within the color gamut) should be calculated using a perceptually-relevant color space. Although use of a (non-linear) Munsell color space might appear desirable, the required transformations of the linear blooming model, pixel values and nominal primaries adds unnecessary complexity. Instead, excellent results can be obtained by performing a linear transformation to an opponent-type space in which lightness L and the two chromatic components (O1, O2) are independent. The linear transformation from linear RGB space is given by:

$$\begin{bmatrix} L \\ O_1 \\ O_2 \end{bmatrix} = \begin{bmatrix} 0.5774 & 0.5774 & 0.5774 \\ -0.5774 & 0.7887 & -0.2113 \\ -0.5774 & -0.2113 & 0.7887 \end{bmatrix} \begin{bmatrix} R \\ G \\ B \end{bmatrix} \tag{1}$$

In this embodiment, the line along which project is effected in Step 2(a) can be defined as a line which connects the input color u and $V_y$, where:

$$V_y = w + \alpha(w - b) \tag{2}$$

and w, b are the respective white point and black point in opponent space. The scalar α is found from $$\alpha = \frac{u_L - b_L}{w_L - b_L} \tag{3}$$

where the subscript L refers to the lightness component. In other words, the projection line used is that which connects the EMIC to a point on the achromatic axis which has the same lightness. If the color space is properly chosen, this projection preserves the hue angle of the original color; the opponent color space fulfils this requirement.

It has, however, been found empirically that even the presently preferred embodiment of the TB method (described below with reference to Equations (4) to (18)) still leaves some image artifacts. These artifacts, which are typically referred to as "worms", have horizontal or vertical structures that are introduced by the error-accumulation process inherent in error diffusion schemes such as the TB method. Although these artifacts can be removed by adding a small amount of noise to the process which chooses the primary output color (so-called "threshold modulation"), this can result in an unacceptably grainy image.

As described above, the TB method uses a dithering algorithm which differs depending upon whether or not an EMIC lies inside or outside the gamut convex hull. The majority of the remaining artifacts arise from the barycentric quantization for EMIC outside the convex hull, because the chosen dithering color can only be one of the three associated with the vertices of the triangle enclosing the projected color; the variance of the resulting dithering pattern is accordingly much larger than for EMIC within the convex hull, where the dithered color can be chosen from any one of the primaries, which are normally substantially greater than three in number.

Accordingly, the present invention provides a further variant of the TB method to reduce or eliminate the remaining dithering artifacts. This is effected by modulating the choice of dithering color for EMIC outside the convex hull using a blue-noise mask that is specially designed to have perceptually pleasing noise properties. This further variant may hereinafter for convenience be referred to as the "blue noise triangle barycentric" or "BNTB" variant of the method of the present invention.

Thus, the present invention also provides a method of the invention wherein step c is effected by computing the intersection of the projection with the surface of the gamut and step e is effected by (i) if the output of step b is outside the gamut, the triangle which encloses the aforementioned intersection is determined, the barycentric weights for each vertex of this triangle are determined, and the barycentric weights thus calculated are compared with the value of a blue-noise mask at the pixel location, the output from step e being the color of the triangle vertex at which the cumulative sum of the barycentric weights exceeds the mask value; or (ii) if the output of step b is within the gamut, the output from step e is the nearest primary calculated by Euclidean distance.

In essence, the BNTB variant applies threshold modulation to the choice of dithering colors for EMIC outside the convex hull, while leaving the choice of dithering colors for EMIC inside the convex hull unchanged. Threshold modulation techniques other than the use of a blue noise mask may be useful. Accordingly, the following description will concentrate on the changes in the treatment of EMIC outside the convex hull leaving the reader to refer to the preceding discussion for details of the other steps in the method. It has been found that the introduction of threshold modulation by means of a blue-noise mask removes the image artifacts visible in the TB method, resulting in excellent image quality.

The blue-noise mask used in the present method may be of the type described in Mitsa, T., and Parker, K. J., "Digital halftoning technique using a blue-noise mask," J. Opt. Soc. Am. A, 9(11), 1920 (November 1992), and especially FIG. 1 thereof.

While the BNTB method significantly reduces the dithering artifacts experienced with the TB, it has been found empirically that some of the dither patterns are still rather grainy and certain colors, such as those found in skin tones, are distorted by the dithering process. This is a direct result of using a barycentric technique for the EMIC lying outside the gamut boundary. Since the barycentric method only allows a choice of at most three primaries, the dither pattern variance is high, and this shows up as visible artifacts; furthermore, because the choice of primaries is inherently restricted, some colors become artificially saturated. This has the effect of spoiling the hue-preserving property of the projection operator defined by Equations (2) and (3) above.

Accordingly, a further variant of the method of the present invention further modifies the TB method to reduce or eliminate the remaining dithering artifacts. This is effected by abandoning the use of barycentric quantization altogether and quantizing the projected color used for EMIC outside the convex hull by a nearest neighbor approach using gamut boundary colors only. This variant of the present method may hereinafter for convenience be referred to as the "nearest neighbor gamut boundary color" or "NNGBC" variant.

Thus, in the NNGBC variant, step c of the method of the invention is effected by computing the intersection of the projection with the surface of the gamut and step e is effected by (i) if the output of step b is outside the gamut, the triangle which encloses the aforementioned intersection is determined, the primary colors which lie on the convex hull are determined, and the output from step e is the closest primary color lying on the convex hull calculated by Euclidian distance; or (ii) if the output of step b is within the gamut, the output from step e is the nearest primary calculated by Euclidean distance.

In essence, the NNGBC variant applies "nearest neighbor" quantization to both colors within the gamut and the projections of colors outside the gamut, except that in the former case all the primaries are available, whereas in the latter case only the primaries on the convex hull are available.

It has been found that the error diffusion used in the rendering method of the present invention can be used to reduce or eliminate defective pixels in a display, for example pixels which refuse to change color even when the appropriate waveform is repeatedly applied. Essentially, this is effected by detecting the defective pixels and then overriding the normal primary color output selection and setting the output for each defective pixel to the output color which the defective pixel actually exhibits. The error diffusion feature of the present rendering method, which normally operates upon the difference between the selected output primary color and the color of the image at the relevant pixel, will in the case of the defective pixels operate upon the difference between the actual color of the defective pixel and the color of the image at the relevant pixel, and disseminates this difference to adjacent pixels in the usual way. It has been found that this defect-hiding technique greatly reduces the visual impact of defective pixels.

Accordingly, the present invention also provides a variant (hereinafter for convenience referred to as the "defective pixel hiding" or "DPH" variant) of the rendering methods already described, which further comprises:

(i) identifying pixels of the display which fail to switch correctly, and the colors presented by such defective pixels;

(ii) in the case of each defective pixel, outputting from step e the color actually presented by the defective pixel (or at least some approximation to this color); and (iii) in the case of each defective pixel, in step f calculating the difference between the modified or projected modified input value and the color actually presented by the defective pixel (or at least some approximation to this color).

It will be apparent that the method of the present invention relies upon an accurate knowledge of the color gamut of the device for which the image is being rendered. As discussed in more detail below, an error diffusion algorithm may lead to colors in the input image that cannot be realized. Methods, such as some variants of the TB, BNTB and NNGBC methods of the present invention, which deal with out-of-gamut input colors by projecting the error-modified input values back on to the nominal gamut to bound the growth of the error value, may work well for small differences between the nominal and realizable gamut. However, for large differences, visually disturbing patterns and color shifts can occur in the output of the dithering algorithm. There is, thus, a need for a better, non-convex estimate of the achievable gamut when performing gamut mapping of the source image, so that the error diffusion algorithm can always achieve its target color.

Thus, a further aspect of the present invention (which may hereinafter for convenience be referred to as the "gamut delineation" or "GD" method of the invention) provides an estimate of the achievable gamut.

The GD method for estimating an achievable gamut may include five steps, namely: (1) measuring test patterns to derive information about cross-talk among adjacent primaries; (2) converting the measurements from step (1) to a blooming model that predicts the displayed color of arbitrary patterns of primaries; (3) using the blooming model derived in step (2) to predict actual display colors of patterns that would normally be used to produce colors on the convex hull of the primaries (i.e. the nominal gamut surface); (4) describing the realizable gamut surface using the predictions made in step (3); and (5) using the realizable gamut surface model derived in step (4) in the gamut mapping stage of a color rendering process which maps input (source) colors to device colors.

The color rendering process of step (5) of the GD process may be any color rendering process of the present invention.

It will be appreciated that the color rendering methods previously described may form only part (typically the final part) of an overall rendering process for rendering color images on a color display, especially a color electrophoretic display. In particular, the method of the present invention may be preceded by, in this order, (i) a degamma operation; (ii) HDR-type processing; (iii) hue correction; and (iv) gamut mapping. The same sequence of operations may be used with dithering methods other than those of the present invention. This overall rendering process may hereinafter for convenience be referred to as the "degamma/HDR/hue/gamut mapping" or "DHHG" method of the present invention.

A further aspect of the present invention provides a solution to the aforementioned problems caused by excessive computational demands on the electrophoretic device by moving many of the rendering calculations off the device itself. Using a system in accordance with this aspect of the invention, it is possible to provide high-quality images on electronic paper while only requiring the resources for communication, minimal image caching, and display driver functionality on the device itself. Thus, the invention greatly reduces the cost and bulk of the display. Furthermore, the prevalence of cloud computing and wireless networking allow systems of the invention to be deployed widely with minimal upgrades in utilities or other infrastructure.

Accordingly, in a further aspect this invention provides an image rendering system including an electro-optic display comprising an environmental condition sensor; and a remote processor connected to the electro-optic display via a network, the remote processor being configured to receive image data, and to receive environmental condition data from the sensor via the network, render the image data for display on the electro-optic display under the received environmental condition data, thereby creating rendered image data, and to transmit the rendered image data to the electro-optic display via the network.

This aspect of the present invention (including the additional image rendering system and docking station discussed below) may hereinafter for convenience be referred to as the "remote image rendering system" or "RIRS". The electro-optic display may comprises a layer of electrophoretic display material comprising electrically charged particles disposed in a fluid and capable of moving through the fluid on application of an electric field to the fluid, the electrophoretic display material being disposed between first and second electrodes, at least one of the electrodes being light-transmissive. The electrophoretic display material may comprise four types of charged particles having differing colors.

This invention further provides an image rendering system including an electro-optic display, a local host, and a remote processor, all connected via a network, the local host comprising an environmental condition sensor, and being configured to provide environmental condition data to the remote processor via the network, and the remote processor being configured to receive image data, receive the environmental condition data from the local host via the network, render the image data for display on the electronic paper display under the received environmental condition data, thereby creating rendered image data, and to transmit the rendered image data. The environmental condition data may include temperature, humidity, luminosity of the light incident on the display, and the color spectrum of the light incident on the display.

In any of the above image rendering systems, the electro-optic display may comprise a layer of electrophoretic display material comprising electrically charged particles disposed in a fluid and capable of moving through the fluid on application of an electric field to the fluid, the electrophoretic display material being disposed between first and second electrodes, at least one of the electrodes being light-transmissive. Additionally, in the systems above, a local host may transmit image data to a remote processor.

This invention also provides a docking station comprising an interface for coupling with an electro-optic display, the docking station being configured to receive rendered image data via a network and to update on an image on an electro-optic display coupled to the docking station. This docking station may further comprise a power supply arranged to provide a plurality of voltages to an electro-optic display coupled to the docking station.

BRIEF DESCRIPTION OF DRAWINGS

As already mentioned, FIG. 1 of the accompanying drawings is a schematic flow diagram of a prior art error diffusion method described in the aforementioned Pappas paper.

DETAILED DESCRIPTION

Figure 1:
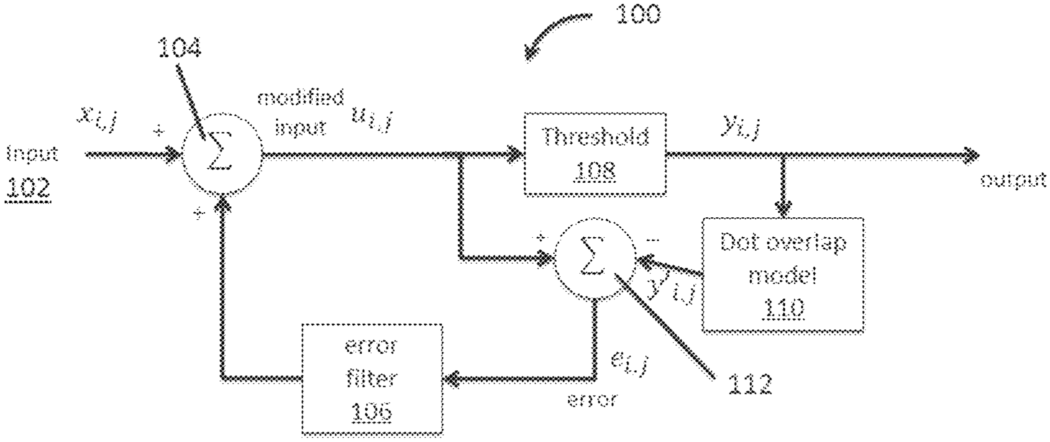
Fig. 1 (Prior Art)
Figure 2:
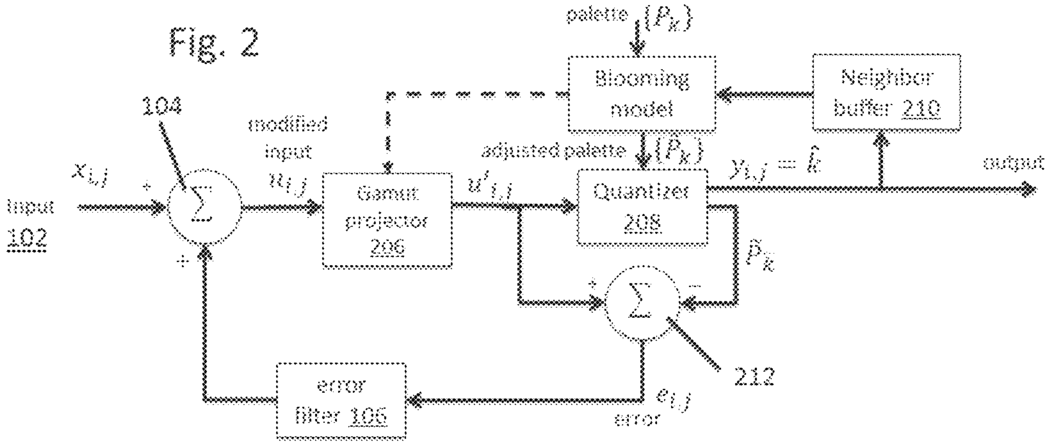
FIG. 2 is a schematic flow diagram illustrating a method of the present invention.

A preferred embodiment of the method of the invention is illustrated in FIG. 2 of the accompanying drawings, which is a schematic flow diagram related to FIG. 1. As in the prior art method illustrated in FIG. 1, the method illustrated in FIG. 2 begins at an input 102, where color values $x_{i,j}$ are fed to a processor 104, where they are added to the output of an error filter 106 to produce a modified input $u_{i,j}$, which may hereinafter be referred to as "error-modified input colors" or "EMIC". The modified inputs $u_{i,j}$ are fed to a gamut projector 206. (As will readily be apparent to those skilled in image processing, the color input values $x_{i,j}$ may previously have been modified to allow for gamma correction, ambient lighting color (especially in the case of reflective output devices), background color of the room in which the image is viewed etc.)

As noted in the aforementioned Pappas paper, one well-known issue in model-based error diffusion is that the process can become unstable, because the input image is assumed to lie in the (theoretical) convex hull of the primaries (i.e. the color gamut), but the actual realizable gamut is likely smaller due to loss of gamut because of dot overlap. Therefore, the error diffusion algorithm may be trying to achieve colors which cannot actually be achieved in practice and the error continues to grow with each successive "correction". It has been suggested that this problem be contained by clipping or otherwise limiting the error, but this leads to other errors.

The present method suffers from the same problem. The ideal solution would be to have a better, non-convex estimate of the achievable gamut when performing gamut mapping of the source image, so that the error diffusion algorithm can always achieve its target color. It may be possible to approximate this from the model itself, or determine it empirically. However neither of the correction methods is perfect, and hence a gamut projection block (gamut projector 206) is included in preferred embodiments of the present method. This gamut projector 206 is similar to that proposed in the aforementioned application Ser. No. 15/592,515, but serves a different purpose; in the present method, the gamut projector is used to keep the error bounded, but in a more natural way than truncating the error, as in the prior art. Instead, the error modified image is continually clipped to the nominal gamut boundary.

The gamut projector 206 is provided to deal with the possibility that, even though the input values $x_{i,j}$ are within the color gamut of the system, the modified inputs $u_{i,j}$ may not be, i.e., that the error correction introduced by the error filter 106 may take the modified inputs $u_{i,j}$ outside the color gamut of the system. In such a case, the quantization effected later in the method may produce unstable results since it is not be possible generate a proper error signal for a color value which lies outside the color gamut of the system. Although other ways of this problem can be envisioned, the only one which has been found to give stable results is to project the modified value $u_{i,j}$ on to the color gamut of the system before further processing. This projection can be done in numerous ways; for example, projection may be effected towards the neutral axis along constant lightness and hue, thus preserving chrominance and hue at the expense of saturation; in the L*a*b* color space this corresponds to moving radially inwardly towards the L* axis parallel to the a*b* plane, but in other color spaces will be less straightforward. In the presently preferred form of the present method, the projection is along lines of constant brightness and hue in a linear RGB color space on to the nominal gamut. (But see below regarding the need to modify this gamut in certain cases, such as use of barycentric thresholding.) Better and more rigorous projection methods are possible. Note that although it might at first appear that the error value $e_{i,j}$ (calculated as described below) should be calculated using the original modified input $u_{i,j}$ rather than the projected input (designated $u'_{i,j}$ in FIG. 2) it is in fact the latter which is used to determine the error value, since using the former could result in an unstable method in which error values could increase without limit.

The modified input values $u'_{i,j}$ are fed to a quantizer 208, which also receives a set of primaries; the quantizer 208 examines the primaries for the effect that choosing each would have on the error, and the quantizer chooses the primary with the least (by some metric) error if chosen. However, in the present method, the primaries fed to the quantizer 208 are not the natural primaries of the system, $\{P_k\}$, but are an adjusted set of primaries, $\{\tilde{P}_k\}$, which allow for the colors of at least some neighboring pixels, and their effect on the pixel being quantized by virtue of blooming or other inter-pixel interactions.

The currently preferred embodiment of the method of the invention uses a standard Floyd-Steinberg error filter and processes pixels in raster order. Assuming, as is conventional, that the display is treated top-to-bottom and left-toright, it is logical to use the above and left cardinal neighbors of pixel being considered to compute blooming or other inter-pixel effects, since these two neighboring pixels have already been determined. In this way, all modeled errors caused by adjacent pixels are accounted for since the right and below neighbor crosstalk is accounted for when those neighbors are visited. If the model only considers the above and left neighbors, the adjusted set of primaries must be a function of the states of those neighbors and the primary under consideration. The simplest approach is to assume that the blooming model is additive, i.e. that the color shift due to the left neighbor and the color shift due to the above neighbor are independent and additive. In this case, there are only "N choose 2" (equal to N*(N−1)/2) model parameters (color shifts) that need to be determined. For N=64 or less, these can be estimated from colorimetric measurements of checkerboard patterns of all these possible primary pairs by subtracting the ideal mixing law value from the measurement.

To take a specific example, consider the case of a display having 32 primaries. If only the above and left neighbors are considered, for 32 primaries there are 496 possible adjacent sets of primaries for a given pixel. Since the model is linear, only these 496 color shifts need to be stored since the additive effect of both neighbors can be produced during run time without much overhead. So for example if the unadjusted primary set comprises (P1 . . . P32) and your current up, left neighbors are P4 and P7, the modified primaries ($P^{\sim}_1 \ldots P^{\sim}_{32}$), the adjusted primaries fed to the quantizer are given by:

$$P_1^{\sim} = P_1 + dP_{(1,4)} + dP_{(1,7)};$$

$$\ldots$$

$$P_{32}^{\sim} = P_{32} + dP_{(32,4)} + dP_{(32,7)},$$

where $dP_{(i,j)}$ are the empirically determined values in the color shift table.

More complicated inter-pixel interaction models are of course possible, for example nonlinear models, models taking account of corner (diagonal) neighbor, or models using a non-causal neighborhood for which the color shift at each pixel is updated as more of its neighbors are known.

The quantizer 208 compares the adjusted inputs $u'_{i,j}$ with the adjusted primaries $\{P^{\sim}_k\}$ and outputs the most appropriate primary $y_{i,k}$ to an output. Any appropriate method of selecting the appropriate primary may be used, for example a minimum Euclidean distance quantizer in a linear RGB space; this has the advantage of requiring less computing power than some alternative methods. Alternatively, the quantizer 208 may effect barycentric thresholding (choosing the primary associated with the largest barycentric coordinate), as described in the aforementioned application Ser. No. 15/592,515. It should be noted, however, that if barycentric thresholding is employed, the adjusted primaries $\{P^{\sim}_k\}$ must be supplied not only to the quantizer 208 but also to the gamut projector 206 (as indicated by the broken line in FIG. 2), and this gamut projector 206 must generate the modified input values $u'_{i,j}$ by projecting on to the gamut defined by the adjusted primaries $\{P^{\sim}_k\}$, not the gamut defined by the unadjusted primaries $\{P_k\}$, since barycentric thresholding will give highly unpredictable and unstable results if the adjusted inputs $u'_{i,j}$ fed to the quantizer 208 represent colors outside the gamut defined by the adjusted primaries $\{P^{\sim}_k\}$, and thus outside all possible tetrahedra available for barycentric thresholding.

The $y_{i,k}$ output values from the quantizer 208 are fed not only to the output but also to a neighborhood buffer 210, where they are stored for use in generating adjusted primaries for later-processed pixels. The modified input $u'_{i,j}$ values and the output $y_{i,j}$ values are both supplied to a processor 212, which calculates:

$$e_{i,j} = u'_{i,j} - y_{i,j}$$

and passes this error signal on to the error filter 106 in the same way as described above with reference to FIG. 1.

TB Method

As indicated above, the TB variant of the present method may be summarized as follows:

1. Determine the convex hull of the device color gamut;
2. For a color (EMIC) outside the gamut convex hull:
   a. Project back onto the gamut boundary along some line;
   b. Compute the intersection of that line with the triangles which make up the surface of the gamut;
   c. Find the triangle which encloses the color and the associated barycentric weights;
   d. Determine the dithered color by the triangle vertex having the largest barycentric weight.
3. For a color (EMIC) inside the convex hull, determine the "nearest" primary color from the primaries, where "nearest" is calculated as a Euclidean distance in the color space, and use the nearest primary as the dithered color.

A preferred method for implementing this three-step algorithm in a computationally-efficient, hardware-friendly will now be described, though by way of illustration only since numerous variations of the specific method described will readily be apparent to those skilled in the digital imaging art.

As already noted, Step 1 of the algorithm is to determine whether the EMIC (hereinafter denoted u), is inside or outside the convex hull of the color gamut. For this purpose, consider a set of adjusted primaries $PP_k$, which correspond to the set of nominal primaries P modified by a blooming model; as discussed above with reference to FIG. 2, such a model typically consists of a linear modification to P determined by the primaries that have already been placed at the pixels to the left of and above the current color. (For simplicity, this discussion of the TB method will assume that input values are processed in a conventional raster scan order, that is to say left to right and top to bottom of the display screen, so that, for any given input value being processed, the pixels immediately above and to the left of the pixel represented by the input value will already have been processed, whereas those immediately to the right and below will not. Obviously, other scan patterns may require modification of this selection of previously-processed values.) Consider also the convex hull of $PP_k$, having vertices $(v_k^1, v_k^2, v_k^3)$ and normal vectors $\widehat{n_k}$. It follows from simple geometry that the point u is outside the convex hull if $$\widehat{n_k} \cdot (u - v_k^1) < 0, \forall k \quad (4)$$

where "·" represents the (vector) dot product and wherein normal vectors "$\widehat{n_k}$" are defined as pointing inwardly. Crucially, the vertices $v_k$ and normal vectors can be precomputed and stored ahead of time. Furthermore, Equation (4) can readily be computer calculated in a simple manner by $$t'_k = \left(\sum_k \widehat{n_k} \circ u - \sum_k \widehat{n_k} \circ v_k^1\right) < 0, \forall k \quad (5)$$

where "○" is the Hadamard (element-by-element) product.

If u is found to be outside the convex hull, it is necessary to define the projection operator which projects u back on to the gamut surface. The preferred projection operator has already been defined by Equations (2) and (3) above. As previously noted, this projection line is that which connects u and a point on the achromatic axis which has the same lightness. The direction of this line is $$d=u-V_y \quad (6)$$

so that the equation of the projection line can be written as $$u=V_y+(1-t)d \quad (7)$$

where $0 \le t \le 1$. Now, consider the $k^{th}$ triangle in the convex hull and express the location of some point $x_k$ within that triangle in terms of its edges $e_k^1$ and $e_k^2$ $$x_k = v_k^1 + e_k^1 p_k + e_k^2 q_k \quad (8)$$

where $e_k^1 = v_k^1 - v_k^2$ and $e_k^1 = v_k^1 - v_k^3$ and $p_k$, $q_k$ are barycentric coordinates. Thus, the representation of $x_k$ in barycentric coordinates ($p_k$, $q_k$) is $$x_k = v_k^1(1-p_k-q_k) + v_k^2 p_k + v_k^3 q_k \quad (9)$$

From the definitions of barycentric coordinates and the line length t, the line intercepts the $k^{th}$ triangle in the convex hull if and only if:

$$0 \le t_k \le 1$$

$$p_k \ge 0$$

$$q_k \ge 0$$

$$p_k + q_k \le 1 \quad (10)$$

If a parameter L is defined as:

$$L = \widehat{n_k} \cdot d = \sum_k \widehat{n_k} \circ d \quad (11)$$

then the distance $t_k$ is simply given by $$t_k = \frac{\widehat{n_k} \cdot (u - v_k)}{L} = \frac{t'_k}{L} \quad (12)$$

Thus, the parameter used in Equation (4) above to determine whether the EMIC is inside or outside the convex hull can also be used to determine the distance from the color to the triangle which is intercepted by the projection line.

The barycentric coordinates are only slightly more difficult to compute. From simple geometry:

$$p_k = -\frac{d \cdot p'_k}{L}$$

$$q_k = \frac{d \cdot q'_k}{L} \quad (13)$$

where $$p_k' = (u - v_k^1) \times e_k^2$$

$$q_k' = (u - v_k^1) \times e_k^1 \quad (14)$$

and "×" is the (vector) cross product.

In summary, the computations necessary to implement the preferred form of the three-step algorithm previously described are:

(a) Determine whether a color is inside or outside the convex hull using Equation (5);

(b) If the color is outside the convex hull, determine on which triangle of the convex hull the color is to be projected by testing each of the k triangles forming the hull using Equations (10)-(14);

(c) For the one triangle k=j where all of the Equations (10) are true, calculate the projection point u' by:

$$u' = V_y(1-t_j)d \quad (15)$$

and its barycentric weights by:

$$a_u = [1-p_j-q_j, p_j, q_j] \quad (16)$$

These barycentric weights are then used for dithering, as previously described.

If the opponent-like color space defined by Equation (1) is adopted, u consists of one luminance component and two chrominance components, $u=[u_L, u_{O1}, u_{O2}]$, and under the projection operation of Equation (16), $d=[0, u_{O1}, u_{O2}]$, since the projection is effected directly towards the achromatic axis.

One can write:

$$t_k = (u - = v_k^1) = [t_k^1, t_k^2, t_k^3]$$

$$e_k^1 = [e_k^{11}, e_k^{12}, e_k^{13}]$$

$$e_k^2 = [e_k^{21}, e_k^{22}, e_k^{23}]$$

$$e_k^3 = [e_k^{31}, e_k^{32}, e_k^{33}] \quad (17)$$

By expanding the cross product and dropping terms that evaluate to zero, it is found that $$p_k' = [t_k^3 \circ e_k^{21} - t_k^1 \circ e_k^{23}, t_k^1 \circ e_k^{22} - t_k^2 \circ e_k^{21}]$$

$$q_k' = [t_k^3 \circ e_k^{11} - t_k^1 \circ e_k^{13}, t_k^1 \circ e_k^{12} - t_k^2 \circ e_k^{11}] \quad (18)$$

Equation (18) is trivial to compute in hardware, since it only requires multiplications and subtractions.

Accordingly, an efficient, hardware-friendly dithering TB method of the present invention can be summarized as follows:

1. Determine (offline) the convex hull of the device color gamut and the corresponding edges and normal vectors of the triangles comprising the convex hull;
2. For all k triangles in the convex hull, compute Equation (5) to determine if the EMIC u lies outside the convex hull;
3. For a color u lying outside the convex hull:
   a. For all k triangles in the convex hull, compute Equations (12), (18), (2), (3), (6) and (13);
   b. Determine the one triangle j which satisfies all conditions of Equation (10);
   c. For triangle j, compute the projected color u' and the associated barycentric weights from Equations (15) and (16) and choose as the dithered color the vertex corresponding to the maximum barycentric weight;
4. For a color (EMIC) inside the convex hull, determine the "nearest" primary color from the primaries, where "nearest" is calculated as a Euclidean distance in the color space, and use the nearest primary as the dithered color.

From the foregoing, it will be seen that the TB variant of the present method imposes much lower computations requirements than the variants previously discussed, thus allowing the necessary dithering to be deployed in relatively modest hardware.

However, further computational efficiencies are possible as follows:

For out of gamut colors, consider only computations against a small number of candidate boundary triangles. This is a significant improvement compared to previous method in which all gamut boundary triangles were considered; and For in-gamut colors, compute the "nearest neighbor" operation using a binary tree, which uses a precomputed binary space partition. This improves the computation time from O(N) to O(log N) where N is the number of primaries.

The condition for a point u to be outside the convex hull has already been given in Equation (4) above. As already noted, the vertices $v_k$ and normal vectors can be precomputed and stored ahead of time. Equation (5) above can alternatively be written:

$$t'_k = \widehat{n_k} \cdot (u - v_k) \tag{5A}$$

and hence we know that only triangles k for which $t'_k<0$ correspond to a u which is out of gamut. If all $t_k>0$, then u is in gamut.

The distance from a point u to the point where it intersects a triangle k is given by $t_k$, where $t_k$ is given by Equation (12) above, with L being defined by Equation (11) above. Also, as discussed above, if u is outside the convex hull, it is necessary to define the projection operator which moves the point u back to the gamut surface The line along which we project in step 2(a) can be defined as a line which connects the input color u and $V_y$, where $$V_y = w + \alpha(w - b) \tag{50}$$

and w, b are the respective white point and black point in opponent space. The scalar α is found from $$\alpha = \frac{u_L - b_L}{w_L - b_L} \tag{51}$$

where the subscript L refers to the lightness component. In other words, the line is defined as that which connects the input color and a point on the achromatic axis which has the same lightness. The direction of this line is given by Equation (6) above and the equation of the line can be written by Equation (7) above. The expression of a point within a triangle on the convex hull, the barycentric coordinates of such a point and the conditions for the projection line to intercept a particular triangle have already been discussed with reference to Equations (9)-(14) above.

For reasons already discussed, it is desirable to avoid working with Equation (13) above since this requires a division operation. Also as already mentioned, u is out if gamut if any one of the k triangles has $t'_k<0$, and, further, that since $t'_k<0$ for triangles where u might be out of gamut, then $L_k$ must be always less than zero to allow $0<t'_k<1$ as required by condition (10). Where this condition holds, there is one, and only one, triangle for which the barycentric conditions hold. Therefore for k such that $t'_k<0$ we must have $$0>p_k' \geq L_k, 0>q_k' \geq L_k 0>p_k'+q_k' \geq L_k \tag{52}$$

and $$p_k = -d \cdot p_k'$$

$$q_k = d \cdot q_k' \tag{53}$$

which significantly reduces the decision logic compared to previous methods because the number of candidate triangles for which $t'_k<0$ is small.

In summary, then, an optimized method finds the k triangles where $t'_k<0$ using Equation (5A), and only these triangles need to be tested further for intersection by Equation (52). For the triangle where Equation (52) holds, we test we calculate the new projected color u' by Equation (15) where $$t_j = \frac{t_j'}{L_j} \tag{54}$$

which is a simple scalar division. Further, only the largest barycentric weight, $\max(\alpha_u)$ is of interest, from Equation (16):

$$\max(\alpha_u) = \min([L_j - d \cdot p_j' - d \cdot p_j', d \cdot p_j', d \cdot q_j']) \tag{55}$$

and use this to select the vertex of the triangle j corresponding to the color to be output.

If all $t'_k>0$, then u is in-gamut, and above it was proposed o use a "nearest-neighbor" method to compute the primary output color. However, if the display has N primaries, the nearest neighbor method requires N computations of a Euclidean distance, which becomes a computational bottleneck.

This bottleneck can be alleviated, if not eliminated by precompute a binary space partition for each of the blooming-modified primary spaces PP, then using a binary tree structure to determine the nearest primary to u in PP. Although this requires some upfront effort and data storage, it reduces the nearest-neighbor computation time from O(N) to O(log N).

Thus, a highly efficient, hardware-friendly dithering method can be summarized (using the same nomenclature as previously) as:

1. Determine (offline) the convex hull of the device color gamut and the corresponding edges and normal vectors of the triangles comprising the convex hull;
2. Find the k triangles for which $t'_k<0$, per Equation (5A). If any $t'_k<0$, u is outside the convex hull, so:
   a. For the k triangles, find the triangle j which satisfies
3. For a color u lying outside the convex hull:
   a. For all k triangles in the convex hull, compute Equations (12), (18), (2), (3), (6) and (13);
   b. Determine the one triangle j which satisfies all conditions of Equation (10);
   c. For triangle j, compute the projected color u' and the associated barycentric weights from Equations (15), (54) and (55) and choose as the dithered color the vertex corresponding to the maximum barycentric weight;
4. For a color (EMIC) inside the convex hull (all $t'_k>0$), determine the "nearest" primary color, where "nearest" is calculated using a binary tree structure against a pre-computed binary space partition of the primaries.

BNTB Method

As already mentioned, the BNTB method differs from the TB described above by applies threshold modulation to the choice of dithering colors for EMIC outside the convex hull, while leaving the choice of dithering colors for EMIC inside the convex hull unchanged.

A preferred form of the BNTB method a modification of the four-step preferred TB method described above; in the BNTB modification, Step 3c is replaced by Steps 3c and 3d as follows:

c. For triangle j, compute the projected color u' and the associated barycentric weights from Equations (15) and (16); and d. Compare the barycentric weights thus calculated with the values of a blue-noise mask at the pixel location, and choose as the dithered color the first vertex at which the cumulative sum of the barycentric weights exceeds the mask value.

As is well known to those skilled in the imaging art, threshold modulation is simply a method of varying the choice of dithering color by applying a spatially-varying randomization to the color selection method. To reduce or prevent grain in the processed image, it is desirable to apply noise with preferentially shaped spectral characteristics, as for example in the blue-noise dither mask Tmn shown in FIG. 1, which is an M×M array of values in the range of 0-1. Although M can vary (and indeed a rectangular rather than square mask may be used), for efficient implementation in hardware, M is conveniently set to 128, and the pixel coordinates of the image, (x, y), are related to the mask index (m, n) by $$m=\mathrm{mod}(x-1,M)+1$$

$$n=\mathrm{mod}(y-1,M)+1 \tag{19}$$

so that the dither mask is effectively tiled across the image.

The threshold modulation exploits the fact that barycentric coordinates and probability density functions, such as a blue-noise function, both sum to unity. Accordingly, threshold modulation using a blue-noise mask may be effected by comparing the cumulative sum of the barycentric coordinates with the value of the blue-noise mask at a given pixel value to determine the triangle vertex and thus the dithered color.

As noted above, the barycentric weights corresponding to the triangle vertices are given by:

$$\alpha_u=[1-p_j-q_j,p_j,q_j] \tag{16}$$

so that the cumulative sum, denoted "CDF", of these barycentric weights is given by:

$$CDF=[1-p_j-q_j,1-q_1,1] \tag{20}$$

and the vertex v, and corresponding dithered color, for which the CDF first exceeds the mask value at the relevant pixel, is given by:

$$v=\{v;CDF(v)\geq T_{mn}\} \tag{21}$$

It is desirable that the BNTB method of the present invention be capable of being implemented efficiently on standalone hardware such as a field programmable gate array (FPGA) or an application specific integrated circuit (ASIC), and for this purpose it is important to minimize the number of division operations required in the dithering calculations. For this purpose, Equation (16) above may be rewritten:

$$\alpha_u=\frac{1}{L_j}[L_j-d\cdot p'_j-d\cdot q'_j,\ d\cdot p'_j,\ d\cdot q'_j] \tag{22}$$

and Equation (20) may be rewritten:

$$CDF=\frac{1}{L_j}[L_j-d\cdot p'_j-d\cdot q'_j,\ L_j-d\cdot q'_j,\ L_j] \tag{23}$$

or, to eliminate the division by $L_1$:

$$CDF'=[L_j-d\cdot p_j'-d\cdot q_j',L_j-d\cdot q_j',L_j] \tag{24}$$

Equation (21) for selecting the vertex v, and the corresponding dithered color, at which the CDF first exceeds the mask value at the relevant pixel, becomes:

$$v=\{v;CDF'(v)\geq T_{mn}L_j\} \tag{25}$$

Use of Equation (25) is only slightly complicated by the fact that both CDF' and $L_j$ are now signed numbers. To allow for this complication, and for the fact that Equation (25) only requires two comparisons (since the last element of the CDF is unity, if the first two comparisons fail, the third vertex of the triangle must be chosen), Equation (25) can be implemented in a hardware-friendly manner using the following pseudo-code:

```
v = 1
for i = 1 to 2
```

$$e=\begin{cases}CDF'(i)\geq T_{mn}L_j & L_j<0\\ CDF'(i)<T_{mn}L_j & L_j\geq 0\end{cases}$$

```
  if e
    v = v + 1
  end
end
```

Figure 3:
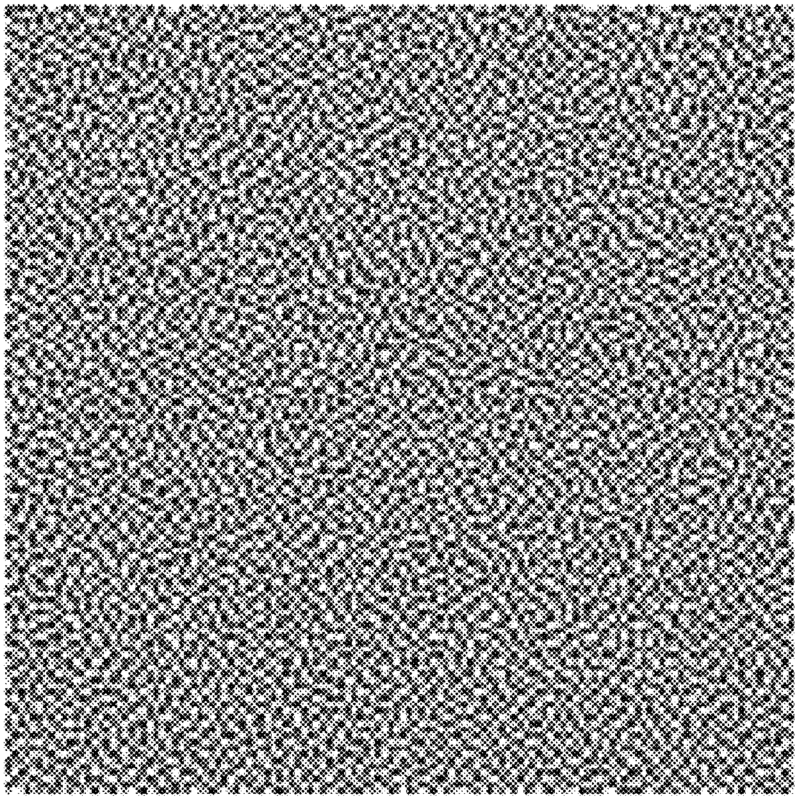
FIG. 3 illustrates a blue-noise mask which may be used in the BNTB variant of the present invention.

The improvement in image quality which can be effected using the method of the present invention may readily be seen by comparison of FIGS. 2 and 3. FIG. 2 shows an image dithered by the preferred four-step TB method described. It will be seen that significant worm defects are present in the circled areas of the image. FIG. 3 shows the same image dithered by the preferred BNTB method, and no such image defects are present.

From the foregoing, it will be seen that the BNTB provides a dithering method for color displays which provides better dithered image quality than the TB method and which can readily be effected on an FPGA, ASIC or other fixed-point hardware platform.

NNGBC Method

As already noted, the NNGBC method quantizes the projected color used for EMIC outside the convex hull by a nearest neighbor approach using gamut boundary colors only, while quantizing EMIC inside the convex hull by a nearest neighbor approach using all the available primaries.

A preferred form of the NNGBC method can be described as a modification of the four-step TB method set out above. Step 1 is modified as follows:

1. Determine (offline) the convex hull of the device color gamut and the corresponding edges and normal vectors of the triangles comprising the convex hull. Also offline, of the N primary colors, find the M boundary colors $P_b$, that is to say the primary colors that lie on the boundary of the convex hull (note that M<N);

and Step 3c is replaced by:

c. For triangle j, compute the projected color u', and determine the "nearest" primary color from the M boundary colors $P_b$, where "nearest" is calculated as a Euclidean distance in the color space, and use the nearest boundary color as the dithered color.

The preferred form of the method of the present invention follows very closely the preferred four-step TB method described above, except that the barycentric weights do not need to be calculated using Equation (16). Instead, the dithered color v is chosen as the boundary color in the set $P_b$ that minimizes the Euclidean norm with u', that is:

$$v=\text{argmin}_v\{\|u'-P_b(v)\|\} \qquad (26)$$

Since the number of boundary colors M is usually much smaller than the total number of primaries N, the calculations required by Equation (26) are relatively fast.

As with the TB and BNTB methods of the present invention, it is desirable that the NNGBC method be capable of being implemented efficiently on standalone hardware such as a field programmable gate array (FPGA) or an application specific integrated circuit (ASIC), and for this purpose it is important to minimize the number of division operations required in the dithering calculations. For this purpose, Equation (16) above may be rewritten in the form of Equation (22) as already described, and Equation (26) may treated in a similar manner.

Figure 4:
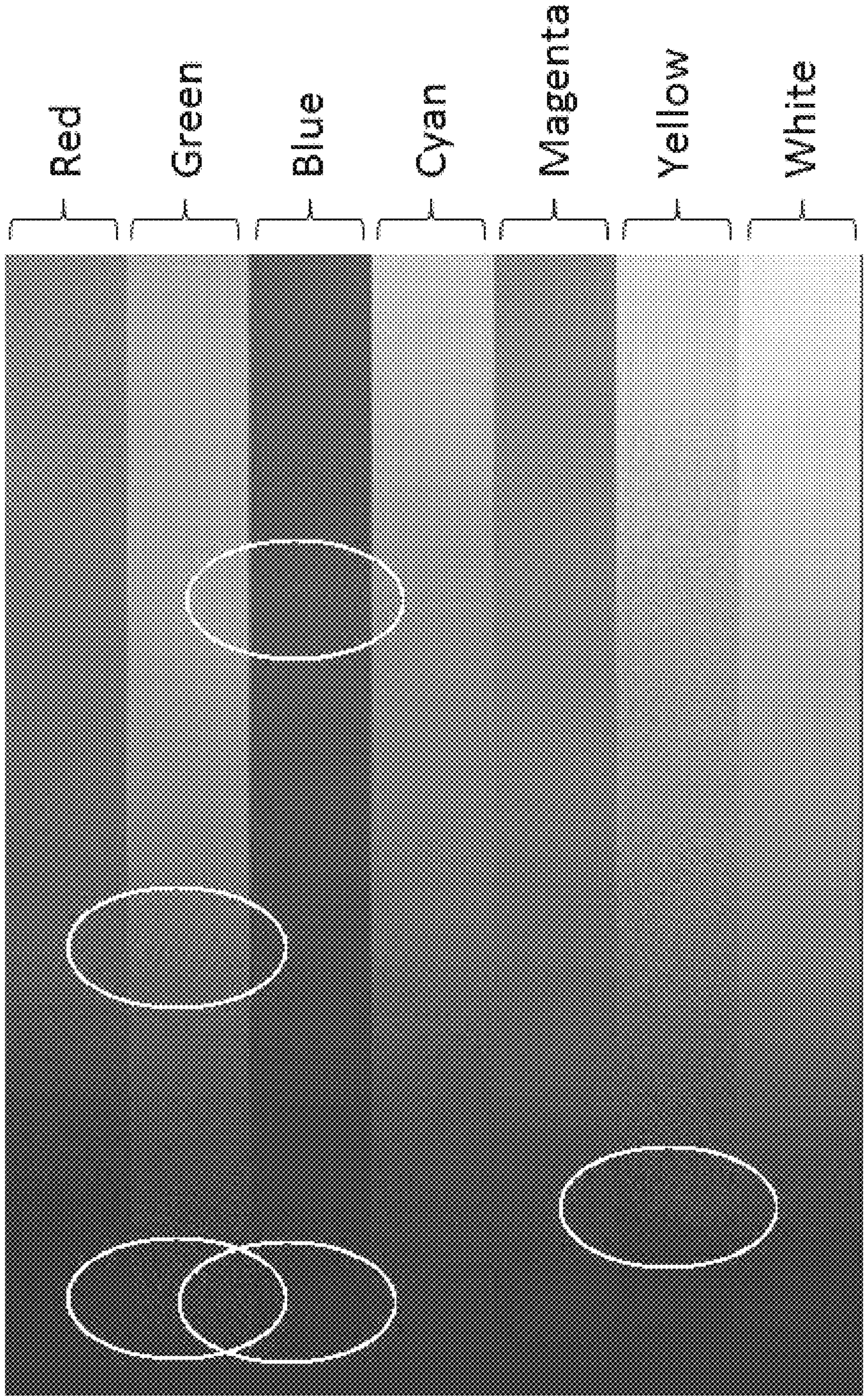
FIG. 4 illustrates an image processed using a TB method of the present invention, and illustrates the worm defects present.
Figure 5:
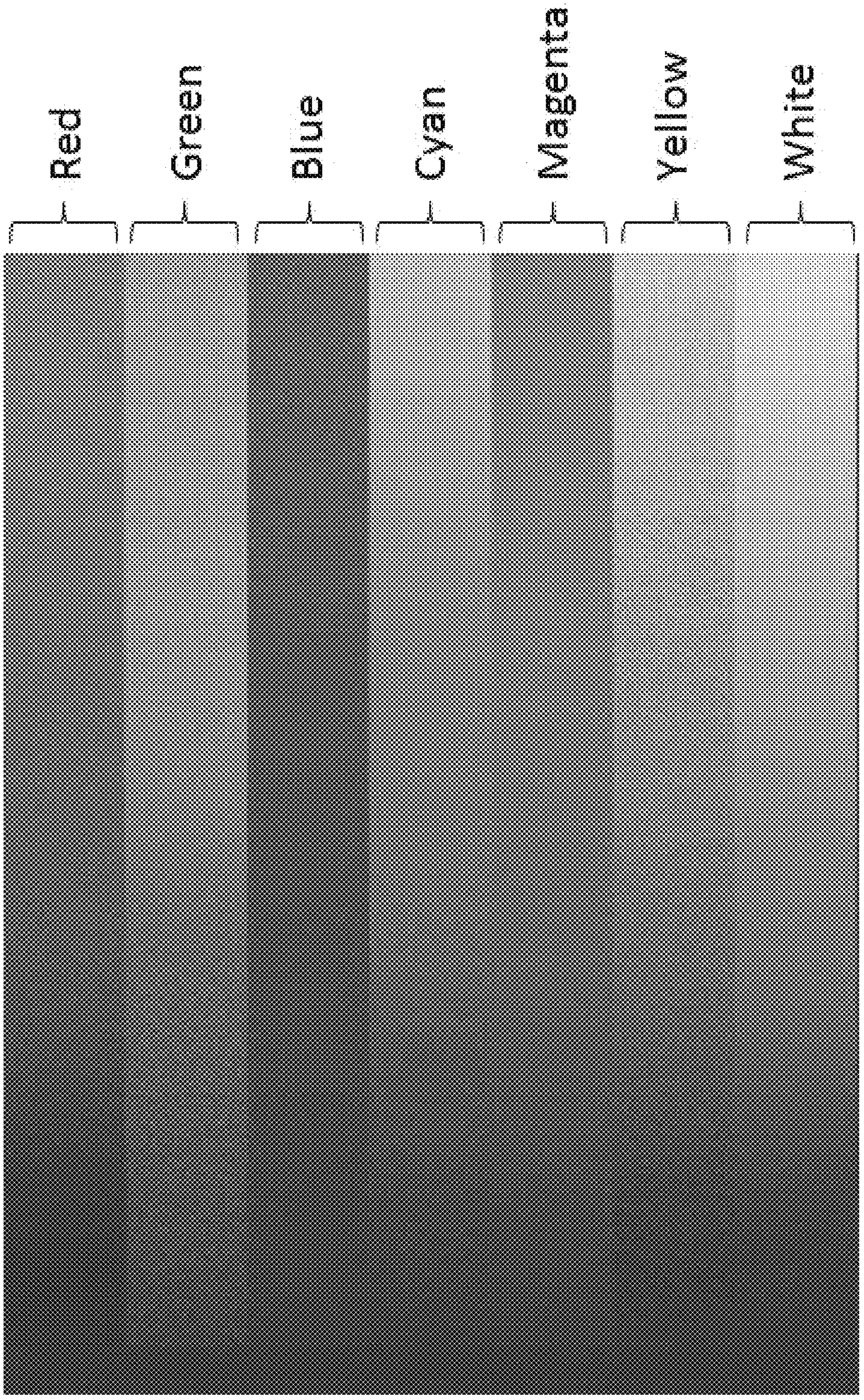
FIG. 5 illustrates the same image as in FIG. 4 but processed using a BNTB method, with no worm defects present.
Figure 6:
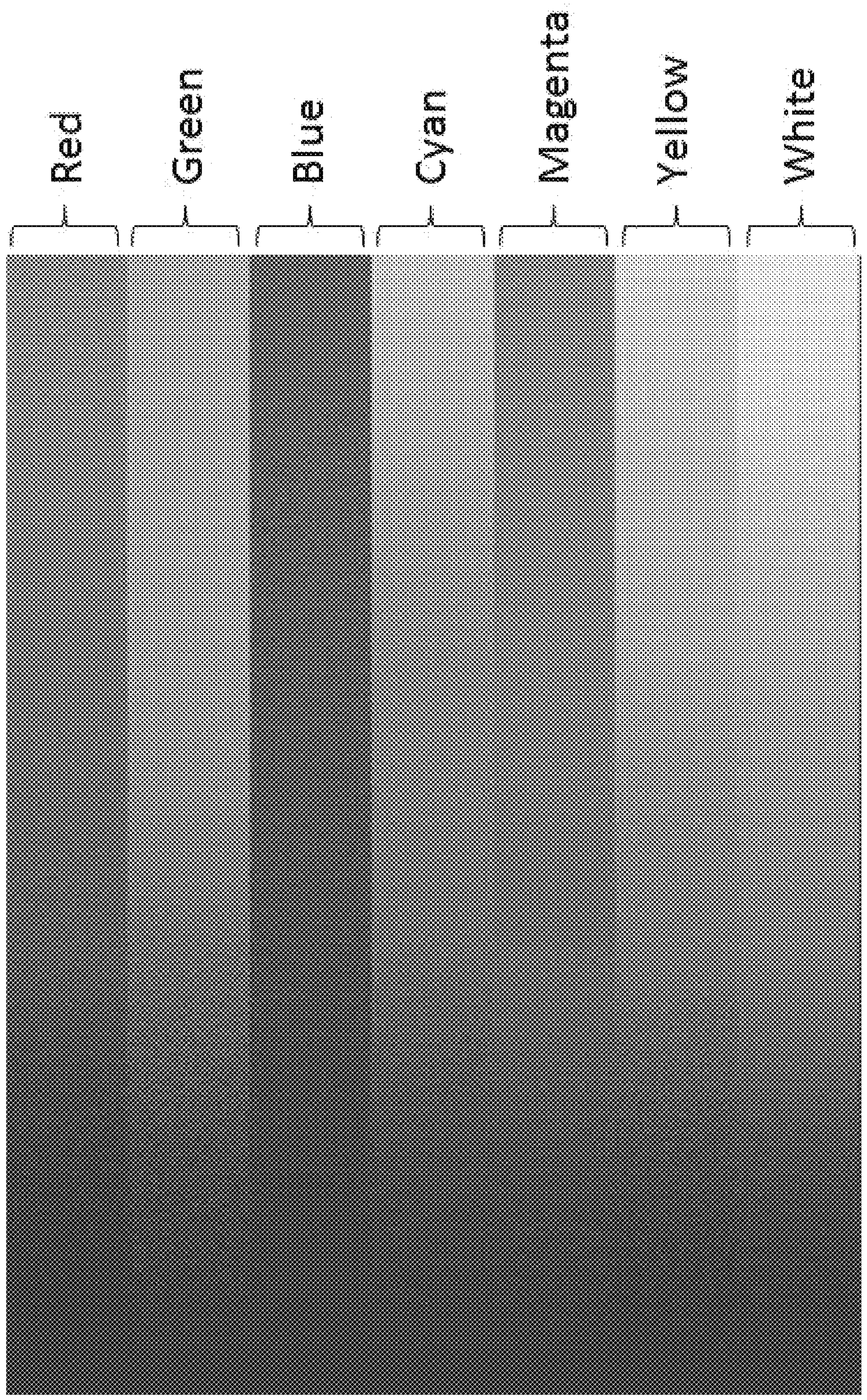
FIG. 6 illustrates the same image as in FIGS. 4 and 5 but processed using a NNGBC method of the present invention.

The improvement in image quality which can be effected using the method of the present invention may readily be seen by comparison of accompanying FIGS. 4, 5 and 6. As already mentioned, FIG. 4 shows an image dithered by the preferred TB method and it will be seen that significant worm defects are present in the circled areas of the image. FIG. 5 shows the same image dithered by the preferred BNTB method; although a significant improvement on the image of FIG. 4, the image of FIG. 5 is still grainy at various points. FIG. 6 shows the same image dithered by the NNGBC method of the present invention, and the graininess is greatly reduced.

From the foregoing, it will be seen that the NNGBC method provides a dithering method for color displays which in general provides better dithered image quality that the TB method and can readily be effected on an FPGA, ASIC or other fixed-point hardware platform.

DPH Method

As already mentioned, the present invention provides a defective pixel hiding or DPH of the rendering methods already described, which further comprises:

(i) identifying pixels of the display which fail to switch correctly, and the colors presented by such defective pixels;

(ii) in the case of each defective pixel, outputting from step e the color actually presented by the defective pixel (or at least some approximation to this color); and (iii) in the case of each defective pixel, in step f calculating the difference between the modified or projected modified input value and the color actually presented by the defective pixel (or at least some approximation to this color).

References to "some approximation to this color" refer to the possibility that the color actually presented by the defective pixel may be considerably outside the color gamut of the display and may hence render the error diffusion method unstable. In such a case, it may be desirable to approximate the actual color of the defective pixel by one of the projection methods previously discussed.

Since spatial dithering methods such as those of the present invention seek to deliver the impression of an average color given a set of discrete primaries, deviations of a pixel from its expected color can be compensated by appropriate modification of its neighbors. Taking this argument to its logical conclusion, it is clear that defective pixels (such as pixels stuck in a particular color) can also be compensated by the dithering method in a very straightforward manner. Hence, rather than set the output color associated with the pixel to the color determined by the dithering method, the output color is set to the actual color of the defective pixel so that the dithering method automatically account for the defect at that pixel by propagating the resultant error to the neighboring pixels. This variant of the dithering method can be coupled with an optical measurement to comprise a complete defective pixel measurement and repair process, which may be summarized as follows.

First, optically inspect the display for defects; this may be as simple as taking a high-resolution photograph with some registration marks, and from the optical measurement, determine the location and color of the defective pixels. Pixels stuck in white or black colors may be located simply by inspecting the display when set to solid black and white respectively. More generally, however, one could measure each pixel when the display is set to solid white and solid black and determine the difference for each pixel. Any pixel for which this difference is below some predetermined threshold can be regarded as "stuck" and defective. To locate pixels in which one pixel is "locked" to the state of one of its neighbors, set the display to a pattern of one-pixel wide lines of black and white (using two separate images with the lines running along the row and columns respectively) and look for error in the line pattern.

Next, build a lookup table of the defective pixels and their colors, and transfer this LUT to the dithering engine; for present purposes, it makes no difference whether the dithering method is performed in software or hardware. The dithering engine performs gamut mapping and dithering in the standard way, except that output colors corresponding to the locations of the defective pixels are forced to their defective colors. The dithering algorithm then automatically, and by definition, compensates for their presence.

Figure 20A:
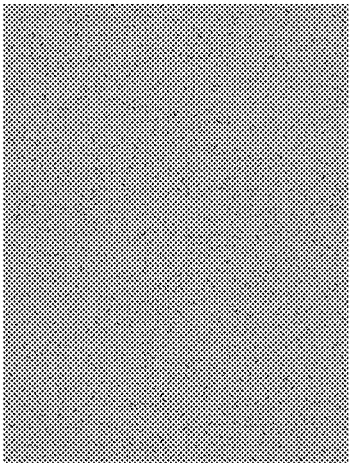
FIG. 20A is a photograph of an imaged display showing dark defects.
Figure 20B:
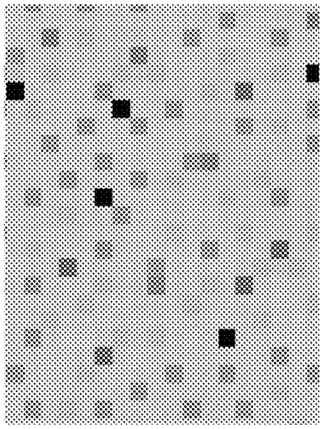
FIG. 20B is a close up of part of the display of FIG. 20A showing some of the dark defects.
Figure 20C:
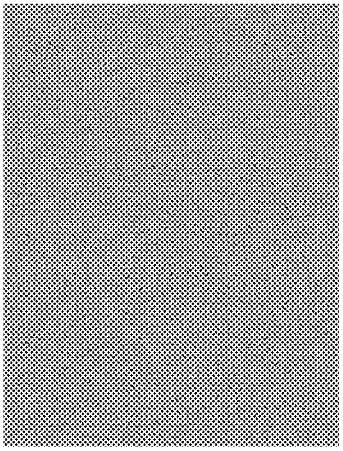
FIG. 20C is a photograph similar to FIG. 20A but with the image corrected by an error diffusion method of the present invention.
Figure 20D:
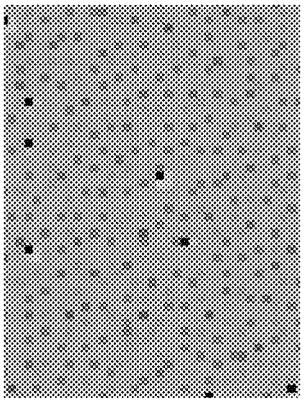
FIG. 20D is a close up similar to that of FIG. 20B but showing part of the image of FIG. 20C.

FIGS. 20A-20D illustrate a DPH method of the present invention which substantially hides dark defects. FIG. 20A shows an overall view of an image containing dark defects, and FIG. 20B is a close up showing some of the dark defects. FIG. 20C is a view similar to FIG. 20A but showing the image after correction by a DPH method, while FIG. 20D is a close up similar to that of FIG. 20B but showing the DPH-corrected image. It will readily be seen from FIG. 20D that the dithering algorithm has brightened pixels surrounding each defect to maintain the average brightness of the area, thus greatly reducing the visual impact of the defects. As will readily be apparent to those skilled in the technology of electro-optic displays, the DPH method can readily be extended to bright defects, or adjacent pixel defects in which one pixel takes on the color of its neighbor.

GD Method

As already mentioned, the present invention provides a gamut delineation method for estimating an achievable gamut comprising five steps, namely: (1) measuring test patterns to derive information about cross-talk among adjacent primaries; (2) converting the measurements from step (1) to a blooming model that predicts the displayed color of arbitrary patterns of primaries; (3) using the blooming model derived in step (2) to predict actual display colors of patterns that would normally be used to produce colors on the convex hull of the primaries (i.e. the nominal gamut surface); (4) describing the realizable gamut surface using the predictions made in step (3); (5) using the realizable gamut surface model derived in step (4) in the gamut mapping stage of a color rendering process which maps input (source) colors to device colors.

Steps (1) and (2) of this method may follow the process described above in connection with the basic color rendering method of the present invention. Specifically, for N primaries, "N choose 2" number of checkerboard patterns are displayed and measured. The difference between the nominal value expected from ideal color mixing laws and the actual measured value is ascribed to the edge interactions. This error is considered to be a linear function of edge density. By this means, the color of any pixel patch of primaries can be predicted by integrating these effects over all edges in the pattern.

Step (3) of the method considers dither patterns one may expect on the gamut surface and computes the actual color predicted by the model. Generally speaking, a gamut surface is composed of triangular facets where the vertices are colors of the primaries in a linear color space. If there were no blooming, these colors in each of these triangles could then be reproduced by an appropriate fraction of the three associated vertex primaries. However, there are many patterns that can be made that have such a correct fraction of primaries, but which pattern is used is critical for the blooming model since primary adjacency types need to be enumerated. To understand this, consider these two extreme cases of using 50% of P1 and 50% of P2. At one extreme a checkerboard pattern of P1 and P2 can be used, in which case the P1|P2 edge density is maximal leading to the most possible deviation from ideal mixing. At another extreme is two very large patches, one of P1 and one of P2, which has a P1|P2 adjacency density that tends towards zero with increasing patch size. This second case will reproduce the nearly correct color even in the presence of blooming but will be visually unacceptable because of the coarseness of the pattern. If the half-toning algorithm used in capable of clustering pixels having the same color, it might be reasonable to choose some compromise between these extremes as the realizable color. However, in practice when using error diffusion this type of clustering leads to bad wormy artifacts, and furthermore the resolution of most limited palette displays, especially color electrophoretic displays, is such that clustering becomes obvious and distracting. Accordingly, it is generally desirable to use the most dispersed pattern possible even if that means eliminating some colors that could be obtained via clustering. Improvements in displays technology and half-toning algorithms may eventually render less conservative pattern models useful.

In one embodiment, let $P_1$, $P_2$, $P_3$ be the colors of three primaries that define a triangular facet on the surface of the gamut. Any color on this facet can be represented field by the linear combination $$\propto_1 P_1 + \propto_2 P_2 + \propto_3 P_3$$

where $\propto_1+\propto_2+\propto_3=1$.

Now let $\Delta_{1,2}$, $\Delta_{1,3}$, $\Delta_{2,3}$ be the model for the color deviation due to blooming if all primary adjacencies in the pattern are of the numbered type, i.e. a checkerboard pattern of $P_1$, $P_2$ pixels is predicted to have the color $$C=\tfrac{1}{2}P_1+\tfrac{1}{2}P_2+\Delta_{1,2}$$

Without loss of generality, assume $$\propto_1 \geq \propto_2 \geq \propto_3$$

which defines a sub-triangle on the facet with corners $$(1,0,0),(\tfrac{1}{2},\tfrac{1}{2},0),(\tfrac{1}{3},\tfrac{1}{3},\tfrac{1}{3})$$

For maximally dispersed pixel populations of the primaries we can evaluate the predicted color at each of those corners to be $$P_1$$

$$\tfrac{1}{2}P_1+\tfrac{1}{2}P_2+\Delta_{1,2}$$

$$\tfrac{1}{3}(P_1+P_2+P_3+\Delta_{1,2}+\Delta_{1,3}+\Delta_{2,3})$$

By assuming our patterns can be designed to alter the edge density linearly between these corners, we now have a model for a sub-facet of the gamut boundary. Since there are 6 ways of ordering $\propto_1$, $\propto_2$, $\propto_3$, there are six such sub-facets that replace each facet of the nominal gamut boundary description.

It should appreciated that other approaches may be adopted. For example, a random primary placement model could be used, which is less dispersed that the one mentioned above. In this case the fraction of edges of each type is proportional to their probabilities, i.e. the fraction of P1|P2 edges is given by the product $\propto_1\propto_2$. Since this is nonlinear in the $\propto_i$, the new surface representing the gamut boundary would need to be triangulated or passed to subsequent steps as a parameterization.

Another approach, which does not follow the paradigm just delineated, is an empirical approach—to actually use the blooming compensated dithering algorithm (using the model from steps 1,2) to determine which colors should be excluded from the gamut model. This can be accomplished by turning off the stabilization in the dithering algorithm and then trying to dither a constant patch of a single color. If an instability criterion is met (i.e. run-away error terms), then this color is excluded from the gamut. By starting with the nominal gamut, a divide and conquer approach could be used to determine the realizable gamut.

In step (4) of the GD method, each of these sub-facets is represented as a triangle, with the vertices ordered such that the right-hand rule will point the normal vector according to a chosen convention for inside/outside facing. The collection of all these triangles forms a new continuous surface representing the realizable gamut.

Figure 7:
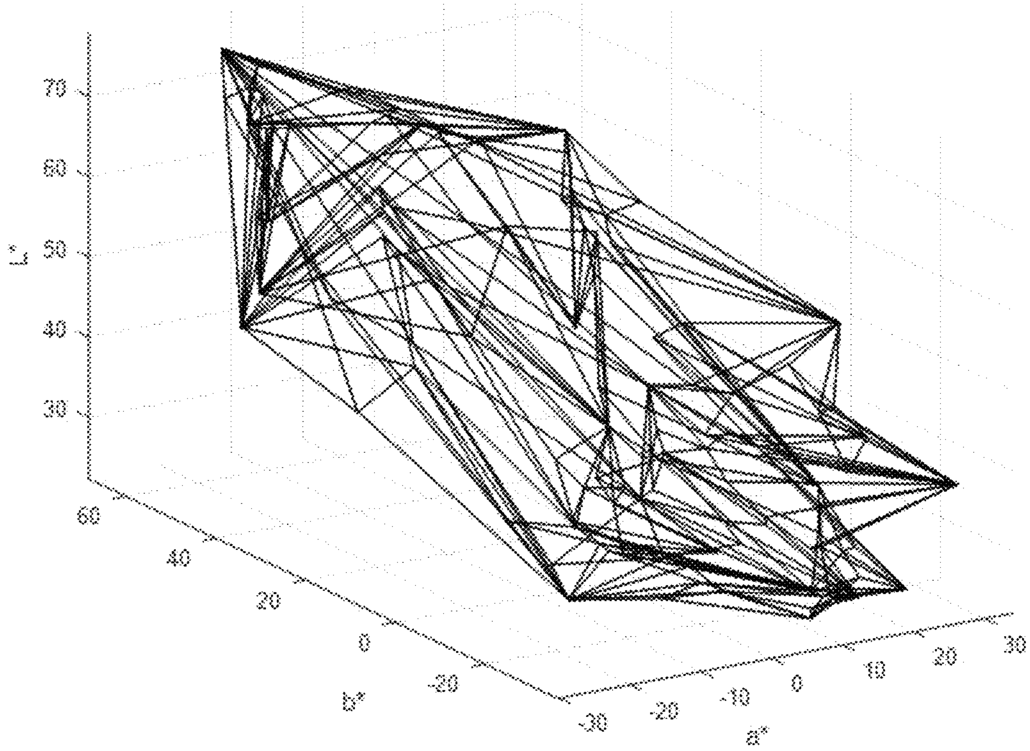
FIG. 7 is an example of a gamut model exhibiting concavities.

In some cases, the model will predict that new colors not in the nominal gamut can be realized by exploiting blooming; however, most effects are negative in the sense of reducing the realizable gamut. For example, the blooming model gamut may exhibit deep concavities, meaning that some colors deep inside the nominal gamut cannot in fact be reproduced on the display, as illustrated for example in FIG. 7. (The vertices in FIG. 7 are given in Table 1 below, while the triangles forming the surface of the hull are specified in Table 2 below.)

TABLE 1

Vertices in L*a*b* color space

| Vertex No. | L* | a* | b* |
|---|---|---|---|
| 1 | 22.291 | −7.8581 | −3.4882 |
| 2 | 24.6135 | 8.4699 | −31.4662 |
| 3 | 27.049 | −9.0957 | −2.8963 |
| 4 | 30.0691 | 7.8556 | 5.3628 |
| 5 | 23.6195 | 19.5565 | −24.541 |
| 6 | 31.4247 | −10.4504 | −1.8987 |
| 7 | 29.4472 | 6.0652 | −35.5804 |
| 8 | 27.5735 | 19.3381 | −35.7121 |

TABLE 1-continued

| Vertices in L*a*b* color space | | | |
|---|---|---|---|
| Vertex No. | L* | a* | b* |
| 9 | 50.1158 | −30.1506 | 34.1525 |
| 10 | 35.2752 | −11.0676 | −1.4431 |
| 11 | 35.8001 | −14.8328 | −16.0211 |
| 12 | 46.8575 | −10.8659 | 22.0569 |
| 13 | 34.0596 | 13.1111 | 8.4255 |
| 14 | 33.8706 | −2.611 | −28.3529 |
| 15 | 39.7442 | 27.2031 | −14.4892 |
| 16 | 41.4924 | 8.7628 | −32.8044 |
| 17 | 35.0507 | 34.0584 | −23.6601 |
| 18 | 48.5173 | −11.361 | 3.1187 |
| 19 | 39.9753 | 15.7975 | 16.1817 |
| 20 | 50.218 | 10.6861 | 7.9466 |
| 21 | 52.6132 | −10.8092 | 4.8362 |
| 22 | 54.879 | 22.7288 | −15.4245 |
| 23 | 61.7716 | −20.2627 | 45.8727 |
| 24 | 57.1284 | −10.2686 | 7.9435 |
| 25 | 54.7161 | −28.9697 | 32.0898 |
| 26 | 67.6448 | −16.0817 | 55.0921 |
| 27 | 60.4544 | −22.4697 | 40.1991 |
| 28 | 48.5841 | −11.9172 | −18.778 |
| 29 | 58.6893 | −11.4884 | −10.7047 |
| 30 | 72.801 | −11.3746 | 68.2747 |
| 31 | 73.8139 | −6.8858 | 21.3934 |
| 32 | 77.8384 | −3.0633 | 4.755 |
| 33 | 24.5385 | −2.1532 | −14.8931 |
| 34 | 31.1843 | −8.6054 | −13.5995 |
| 35 | 28.5568 | 7.5707 | −35.4951 |
| 36 | 28.261 | −1.065 | −22.3647 |
| 37 | 27.7753 | −11.4851 | −5.3461 |
| 38 | 26.0366 | 5.0496 | −9.9752 |
| 39 | 28.181 | 11.3641 | −11.3759 |
| 40 | 27.3508 | 2.1064 | −8.9636 |
| 41 | 26.0366 | 5.0496 | −9.9752 |
| 42 | 24.5385 | −2.1532 | −14.8931 |
| 43 | 24.3563 | 11.1725 | −27.3764 |
| 44 | 24.991 | 4.8394 | −17.8547 |
| 45 | 31.1843 | −8.6054 | −13.5995 |
| 46 | 34.0968 | −17.4657 | −4.7492 |
| 47 | 33.8863 | −7.6695 | −26.5748 |
| 48 | 33.0914 | −11.2605 | −15.7998 |
| 49 | 41.6637 | −22.0771 | 21.0693 |
| 50 | 51.4872 | −17.2377 | 34.7964 |
| 51 | 68.5237 | −14.4392 | 62.7905 |
| 52 | 55.6386 | −16.4599 | 42.5188 |
| 53 | 34.0968 | −17.4657 | −4.7492 |
| 54 | 41.6637 | −22.0771 | 21.0693 |
| 55 | 61.5571 | −16.2463 | 24.6821 |
| 56 | 47.9334 | −17.4314 | 15.7021 |
| 57 | 51.4872 | −17.2377 | 34.7964 |
| 58 | 27.7753 | −11.4851 | −5.3461 |
| 59 | 56.1967 | −8.2037 | 34.2338 |
| 60 | 47.4842 | −11.7712 | 25.028 |
| 61 | 24.3563 | 11.1725 | −27.3764 |
| 62 | 28.0951 | 11.5692 | −34.9293 |
| 63 | 25.5771 | 13.6758 | −27.7731 |
| 64 | 26.0674 | 12.125 | −30.2923 |
| 65 | 28.0951 | 11.5692 | −34.9293 |
| 66 | 28.5568 | 7.5707 | −35.4951 |
| 67 | 30.339 | 12.3612 | −36.266 |
| 68 | 29.0178 | 10.5573 | −35.5705 |
| 69 | 30.323 | 10.437 | 6.7394 |
| 70 | 28.181 | 11.3641 | −11.3759 |
| 71 | 30.4451 | 14.0796 | −12.8243 |
| 72 | 29.6732 | 11.9871 | −6.5836 |
| 73 | 33.8423 | 10.4188 | 8.9198 |
| 74 | 30.323 | 10.437 | 6.7394 |
| 75 | 35.883 | 14.1544 | 11.7358 |
| 76 | 33.4556 | 11.781 | 9.2613 |
| 77 | 56.1967 | −8.2037 | 34.2338 |
| 78 | 33.8423 | 10.4188 | 8.9198 |
| 79 | 59.6655 | −5.5683 | 39.5248 |
| 80 | 51.7599 | −3.3654 | 30.2979 |
| 81 | 30.4451 | 14.0796 | −12.8243 |
| 82 | 27.3573 | 18.8007 | −15.1756 |
| 83 | 33.9073 | 13.4649 | −4.9512 |
| 84 | 30.7233 | 15.2007 | −10.7358 |

TABLE 1-continued

| Vertices in L*a*b* color space | | | |
|---|---|---|---|
| Vertex No. | L* | a* | b* |
| 85 | 27.3573 | 18.8007 | −15.1756 |
| 86 | 25.5771 | 13.6758 | −27.7731 |
| 87 | 33.7489 | 18.357 | −18.113 |
| 88 | 29.171 | 17.0731 | −20.2198 |
| 89 | 30.339 | 12.3612 | −36.266 |
| 90 | 36.4156 | 7.3908 | −35.0008 |
| 91 | 33.9715 | 12.248 | −35.5009 |
| 92 | 33.7003 | 10.484 | −35.4918 |
| 93 | 32.5384 | −10.242 | −19.3507 |
| 94 | 33.8863 | −7.6695 | −26.5748 |
| 95 | 35.4459 | −13.3151 | −12.8828 |
| 96 | 33.9851 | −10.4438 | −19.7811 |
| 97 | 36.4156 | 7.3908 | −35.0008 |
| 98 | 42.6305 | −13.8758 | −19.1021 |
| 99 | 52.4137 | −10.9691 | −15.164 |
| 100 | 44.5431 | −6.873 | −22.0661 |
| 101 | 42.6305 | −13.8758 | −19.1021 |
| 102 | 32.5384 | −10.242 | −19.3507 |
| 103 | 41.1048 | −10.6184 | −20.3348 |
| 104 | 39.1096 | −11.6772 | −19.5092 |
| 105 | 33.7489 | 18.357 | −18.113 |
| 106 | 33.9715 | 12.248 | −35.5009 |
| 107 | 50.7411 | 7.9808 | 2.7416 |
| 108 | 40.6429 | 11.7224 | −15.4312 |
| 109 | 61.5571 | −16.2463 | 24.6821 |
| 110 | 68.272 | −17.4757 | 23.2992 |
| 111 | 44.324 | −16.9442 | −14.8592 |
| 112 | 59.3712 | −16.6207 | 13.0583 |
| 113 | 70.187 | −15.8627 | 46.0122 |
| 114 | 71.2057 | −14.3755 | 54.4062 |
| 115 | 66.3232 | −19.124 | 46.5526 |
| 116 | 69.2902 | −16.3318 | 48.9694 |
| 117 | 71.2057 | −14.3755 | 54.4062 |
| 118 | 68.5237 | −14.4392 | 62.7905 |
| 119 | 73.7328 | −12.8894 | 57.8616 |
| 120 | 71.2059 | −13.8595 | 58.0118 |
| 121 | 68.272 | −17.4757 | 23.2992 |
| 122 | 70.187 | −15.8627 | 46.0122 |
| 123 | 56.5793 | −20.2568 | −1.2576 |
| 124 | 65.4497 | −17.491 | 22.5467 |
| 125 | 35.4459 | −13.3151 | −12.8828 |
| 126 | 44.324 | −16.9442 | −14.8592 |
| 127 | 41.1048 | −10.6184 | −20.3348 |
| 128 | 40.5281 | −13.6957 | −16.1894 |
| 129 | 35.883 | 14.1544 | 11.7358 |
| 130 | 33.9073 | 13.4649 | −4.9512 |
| 131 | 39.4166 | 14.4644 | −3.2296 |
| 132 | 36.5017 | 14.0353 | 0.5249 |
| 133 | 35.5893 | 24.9129 | −13.9743 |
| 134 | 38.2881 | 13.7332 | 0.4361 |
| 135 | 39.4166 | 14.4644 | −3.2296 |
| 136 | 37.8123 | 17.5283 | −5.669 |
| 137 | 38.2881 | 13.7332 | 0.4361 |
| 138 | 48.3592 | 19.9753 | −8.4475 |
| 139 | 44.6063 | 12.12 | 0.9232 |
| 140 | 44.0368 | 15.5418 | −2.9731 |
| 141 | 48.3592 | 19.9753 | −8.4475 |
| 142 | 35.5893 | 24.9129 | −13.9743 |
| 143 | 43.5227 | 23.2087 | −13.3264 |
| 144 | 42.9564 | 22.2354 | −11.5525 |
| 145 | 50.7411 | 7.9808 | 2.7416 |
| 146 | 64.0938 | 0.7047 | 0.487 |
| 147 | 43.5227 | 23.2087 | −13.3264 |
| 148 | 53.8404 | 8.6963 | −2.5804 |
| 149 | 64.0938 | 0.7047 | 0.487 |
| 150 | 69.4971 | −4.1119 | 4.003 |
| 151 | 69.4668 | 3.5962 | −1.2731 |
| 152 | 67.7624 | 0.0633 | 1.0628 |
| 153 | 67.976 | −4.7811 | −2.0047 |
| 154 | 52.4137 | −10.9691 | −15.164 |
| 155 | 67.7971 | −4.4098 | −4.287 |
| 156 | 63.3845 | −6.1019 | −6.3559 |
| 157 | 69.4971 | −4.1119 | 4.003 |
| 158 | 67.976 | −4.7811 | −2.0047 |
| 159 | 75.3716 | −3.1913 | 3.7853 |
| 160 | 71.0659 | −3.9741 | 2.0049 |

TABLE 1-continued

Vertices in L*a*b* color space

| Vertex No. | L* | a* | b* |
|---|---|---|---|
| 161 | 59.6655 | −5.5683 | 39.5248 |
| 162 | 44.6063 | 12.12 | 0.9232 |
| 163 | 72.0031 | −7.6835 | 37.1168 |
| 164 | 60.3911 | −2.4765 | 27.772 |
| 165 | 72.0031 | −7.6835 | 37.1168 |
| 166 | 69.4668 | 3.5962 | −1.2731 |
| 167 | 75.33 | −10.9118 | 39.9331 |
| 168 | 72.332 | −5.2103 | 23.481 |
| 169 | 60.94 | −23.5693 | 41.4224 |
| 170 | 66.3232 | −19.124 | 46.5526 |
| 171 | 68.8066 | −17.1536 | 49.0911 |
| 172 | 65.4882 | −19.6672 | 45.8512 |
| 173 | 56.5793 | −20.2568 | −1.2576 |
| 174 | 74.5326 | −10.6115 | 21.3102 |
| 175 | 67.7971 | −4.4098 | −4.287 |
| 176 | 66.9582 | −10.741 | 5.7604 |
| 177 | 74.5326 | −10.6115 | 21.3102 |
| 178 | 74.3218 | −10.489 | 25.379 |
| 179 | 75.3716 | −3.1913 | 3.7853 |
| 180 | 74.7443 | −8.0307 | 16.0839 |
| 181 | 74.3218 | −10.489 | 25.379 |
| 182 | 60.94 | −23.5693 | 41.4224 |
| 183 | 74.2638 | −10.0199 | 26.0654 |
| 184 | 70.2931 | −13.5922 | 29.0524 |
| 185 | 68.8066 | −17.1536 | 49.0911 |
| 186 | 74.7543 | −10.0079 | 31.1476 |
| 187 | 74.2638 | −10.0199 | 26.0654 |
| 188 | 72.6896 | −12.1441 | 33.8812 |
| 189 | 74.7543 | −10.0079 | 31.1476 |
| 190 | 73.7328 | −12.8894 | 57.8616 |
| 191 | 75.33 | −10.9118 | 39.9331 |
| 192 | 74.6105 | −11.2513 | 41.7499 |

TABLE 1

Triangles forming hull

| | | |
|---|---|---|
| 1 | 33 | 36 |
| 2 | 36 | 33 |
| 2 | 35 | 36 |
| 7 | 36 | 35 |
| 7 | 34 | 36 |
| 1 | 36 | 34 |
| 1 | 37 | 40 |
| 4 | 40 | 37 |
| 4 | 39 | 40 |
| 5 | 40 | 39 |
| 5 | 38 | 40 |
| 1 | 40 | 38 |
| 1 | 41 | 44 |
| 5 | 44 | 41 |
| 5 | 43 | 44 |
| 2 | 44 | 43 |
| 2 | 42 | 44 |
| 1 | 44 | 42 |
| 1 | 45 | 48 |
| 7 | 48 | 45 |
| 7 | 47 | 48 |
| 11 | 48 | 47 |
| 11 | 46 | 48 |
| 1 | 48 | 46 |
| 1 | 49 | 52 |
| 9 | 52 | 49 |
| 9 | 51 | 52 |
| 30 | 52 | 51 |
| 30 | 50 | 52 |
| 1 | 52 | 50 |
| 1 | 53 | 56 |
| 11 | 56 | 53 |
| 11 | 55 | 56 |
| 9 | 56 | 55 |
| 9 | 54 | 56 |
| 1 | 56 | 54 |

TABLE 1-continued

Triangles forming hull

| | | |
|---|---|---|
| 1 | 57 | 60 |
| 30 | 60 | 57 |
| 30 | 59 | 60 |
| 4 | 60 | 59 |
| 4 | 58 | 60 |
| 1 | 60 | 58 |
| 2 | 61 | 64 |
| 5 | 64 | 61 |
| 5 | 63 | 64 |
| 8 | 64 | 63 |
| 8 | 62 | 64 |
| 2 | 64 | 62 |
| 2 | 65 | 68 |
| 8 | 68 | 65 |
| 8 | 67 | 68 |
| 7 | 68 | 67 |
| 7 | 66 | 68 |
| 2 | 68 | 66 |
| 4 | 69 | 72 |
| 13 | 72 | 69 |
| 13 | 71 | 72 |
| 5 | 72 | 71 |
| 5 | 70 | 72 |
| 4 | 72 | 70 |
| 4 | 73 | 76 |
| 19 | 76 | 73 |
| 19 | 75 | 76 |
| 13 | 76 | 75 |
| 13 | 74 | 76 |
| 4 | 76 | 74 |
| 4 | 77 | 80 |
| 30 | 80 | 77 |
| 30 | 79 | 80 |
| 19 | 80 | 79 |
| 19 | 78 | 80 |
| 4 | 80 | 78 |
| 5 | 81 | 84 |
| 13 | 84 | 81 |
| 13 | 83 | 84 |
| 17 | 84 | 83 |
| 17 | 82 | 84 |
| 5 | 84 | 82 |
| 5 | 85 | 88 |
| 17 | 88 | 85 |
| 17 | 87 | 88 |
| 8 | 88 | 87 |
| 8 | 86 | 88 |
| 5 | 88 | 86 |
| 7 | 89 | 92 |
| 8 | 92 | 89 |
| 8 | 91 | 92 |
| 16 | 92 | 91 |
| 16 | 90 | 92 |
| 7 | 92 | 90 |
| 7 | 93 | 96 |
| 14 | 96 | 93 |
| 14 | 95 | 96 |
| 11 | 96 | 95 |
| 11 | 94 | 96 |
| 7 | 96 | 94 |
| 7 | 97 | 100 |
| 16 | 100 | 97 |
| 16 | 99 | 100 |
| 28 | 100 | 99 |
| 28 | 98 | 100 |
| 7 | 100 | 98 |
| 7 | 101 | 104 |
| 28 | 104 | 101 |
| 28 | 103 | 104 |
| 14 | 104 | 103 |
| 14 | 102 | 104 |
| 7 | 104 | 102 |
| 8 | 105 | 108 |
| 17 | 108 | 105 |
| 17 | 107 | 108 |
| 16 | 108 | 107 |
| 16 | 106 | 108 |
| 8 | 108 | 106 |

TABLE 1-continued

| Triangles forming hull | | |
|---|---|---|
| 9 | 109 | 112 |
| 11 | 112 | 109 |
| 11 | 111 | 112 |
| 28 | 112 | 111 |
| 28 | 110 | 112 |
| 9 | 112 | 110 |
| 9 | 113 | 116 |
| 25 | 116 | 113 |
| 25 | 115 | 116 |
| 26 | 116 | 115 |
| 26 | 114 | 116 |
| 9 | 116 | 114 |
| 9 | 117 | 120 |
| 26 | 120 | 117 |
| 26 | 119 | 120 |
| 30 | 120 | 119 |
| 30 | 118 | 120 |
| 9 | 120 | 118 |
| 9 | 121 | 124 |
| 28 | 124 | 121 |
| 28 | 123 | 124 |
| 25 | 124 | 123 |
| 25 | 122 | 124 |
| 9 | 124 | 122 |
| 11 | 125 | 128 |
| 14 | 128 | 125 |
| 14 | 127 | 128 |
| 28 | 128 | 127 |
| 28 | 126 | 128 |
| 11 | 128 | 126 |
| 13 | 129 | 132 |
| 19 | 132 | 129 |
| 19 | 131 | 132 |
| 17 | 132 | 131 |
| 17 | 130 | 132 |
| 13 | 132 | 130 |
| 15 | 133 | 136 |
| 17 | 136 | 133 |
| 17 | 135 | 136 |
| 19 | 136 | 135 |
| 19 | 134 | 136 |
| 15 | 136 | 134 |
| 15 | 137 | 140 |
| 19 | 140 | 137 |
| 19 | 139 | 140 |
| 22 | 140 | 139 |
| 22 | 138 | 140 |
| 15 | 140 | 138 |
| 15 | 141 | 144 |
| 22 | 144 | 141 |
| 22 | 143 | 144 |
| 17 | 144 | 143 |
| 17 | 142 | 144 |
| 15 | 144 | 142 |
| 16 | 145 | 148 |
| 17 | 148 | 145 |
| 17 | 147 | 148 |
| 22 | 148 | 147 |
| 22 | 146 | 148 |
| 16 | 148 | 146 |
| 16 | 149 | 152 |
| 22 | 152 | 149 |
| 22 | 151 | 152 |
| 32 | 152 | 151 |
| 32 | 150 | 152 |
| 16 | 152 | 150 |
| 16 | 153 | 156 |
| 29 | 156 | 153 |
| 29 | 155 | 156 |
| 28 | 156 | 155 |
| 28 | 154 | 156 |
| 16 | 156 | 154 |
| 16 | 157 | 160 |
| 32 | 160 | 157 |
| 32 | 159 | 160 |
| 29 | 160 | 159 |
| 29 | 158 | 160 |
| 16 | 160 | 158 |

TABLE 1-continued

| Triangles forming hull | | |
|---|---|---|
| 19 | 161 | 164 |
| 30 | 164 | 161 |
| 30 | 163 | 164 |
| 22 | 164 | 163 |
| 22 | 162 | 164 |
| 19 | 164 | 162 |
| 22 | 165 | 168 |
| 30 | 168 | 165 |
| 30 | 167 | 168 |
| 32 | 168 | 167 |
| 32 | 166 | 168 |
| 22 | 168 | 166 |
| 25 | 169 | 172 |
| 27 | 172 | 169 |
| 27 | 171 | 172 |
| 26 | 172 | 171 |
| 26 | 170 | 172 |
| 25 | 172 | 170 |
| 25 | 173 | 176 |
| 28 | 176 | 173 |
| 28 | 175 | 176 |
| 29 | 176 | 175 |
| 29 | 174 | 176 |
| 25 | 176 | 174 |
| 25 | 177 | 180 |
| 29 | 180 | 177 |
| 29 | 179 | 180 |
| 32 | 180 | 179 |
| 32 | 178 | 180 |
| 25 | 180 | 178 |
| 25 | 181 | 184 |
| 32 | 184 | 181 |
| 32 | 183 | 184 |
| 27 | 184 | 183 |
| 27 | 182 | 184 |
| 25 | 184 | 182 |
| 26 | 185 | 188 |
| 27 | 188 | 185 |
| 27 | 187 | 188 |
| 32 | 188 | 187 |
| 32 | 186 | 188 |
| 26 | 188 | 186 |
| 26 | 189 | 192 |
| 32 | 192 | 189 |
| 32 | 191 | 192 |
| 30 | 192 | 191 |
| 30 | 190 | 192 |
| 26 | 192 | 190 |

This may lead to some quandaries for gamut mapping, as described below. Also, the gamut model produced can be self-intersecting and thus not have simple topological properties. Since the method described above only operates on the gamut boundary, it does not allow for cases where colors inside the nominal gamut (for example an embedded primary) appear outside the modeled gamut boundary, when in fact they are realizable. To solve this problem, it may be necessary to consider all tetrahedra in the gamut and how their sub-tetrahedra are mapped under the blooming model.

In step (5) the realizable gamut surface model generated in step (4) is used in the gamut mapping stage of a color image rendering process, one may follow a standard gamut mapping procedure that is modified in one or more steps to account for the non-convex nature of the gamut boundary.

The GD method is desirably carried out in a three-dimensional color space in which hue (h*), lightness (L*) and chroma (C*) are independent. Since this is not the case for the L*a*b* color space, the (L*, a*, b*) samples derived from the gamut model should be transformed to a hue-linearized color space such as the CIECAM or Munsell space. However, the following discussion will maintain the (L*, a*, b*) nomenclature with $$C^* = \sqrt{a^{*2} + b^{*2}} \text{ and}$$

$$h^* = a \tan(b^*/a^*).$$

Figure 8A:
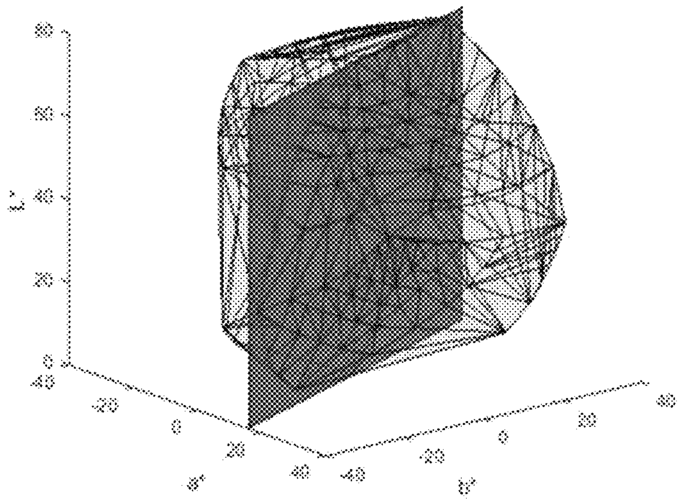
FIGS. 8A and 8B illustrate intersections of a plane at a given hue angle with source and destination gamuts.
Figure 8B:
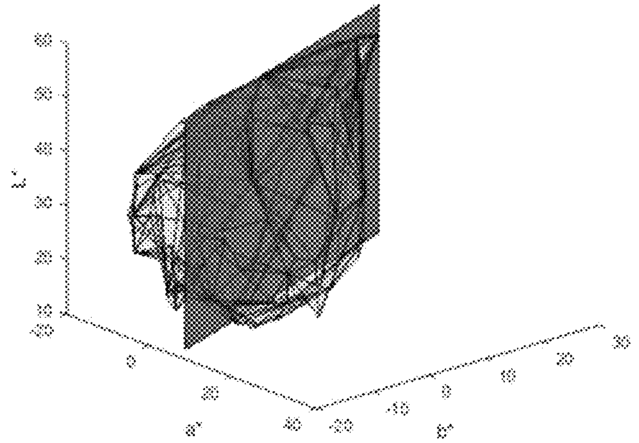
Figure 9:
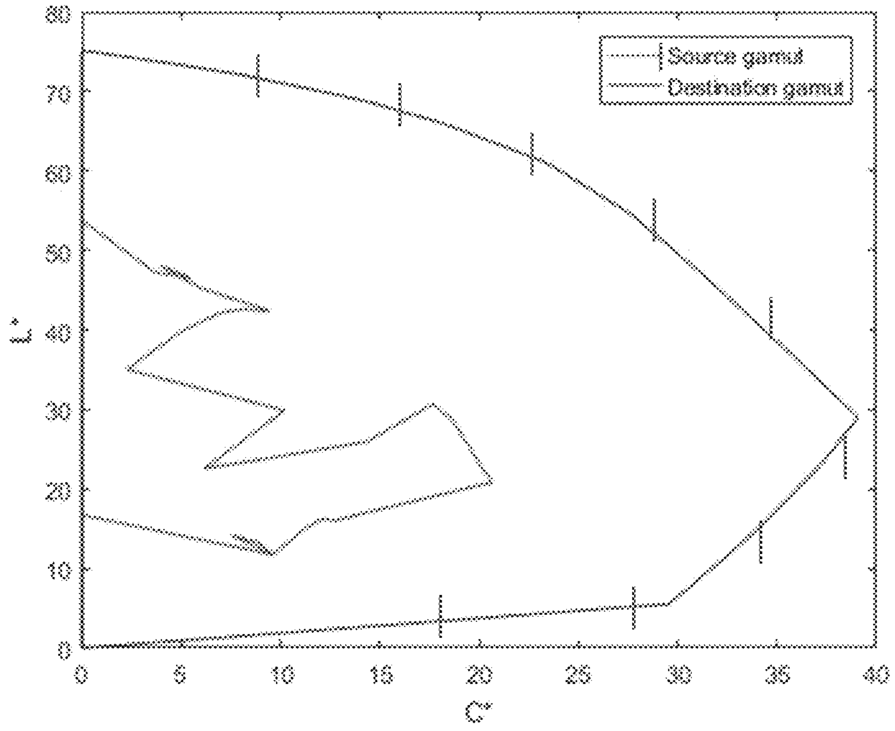
FIG. 9 illustrates source and destination gamut boundaries.

A gamut delineated as described above may then be used for gamut mapping. In an appropriate color space, source colors may be mapped to destination (device) colors by considering the gamut boundaries corresponding to a given hue angle h*. This can be achieved by computing the intersection of a plane at angle h* with the gamut model as shown in FIGS. 8A and 8B; the red line indicates the intersection of the plane with the gamut. Note that the destination gamut is neither smooth nor convex. To simplify the mapping operation, the three-dimensional data extracted from the plane intersections are transformed to L* and C* values, to give the gamut boundaries shown in FIG. 9.

In standard gamut mapping schemes, a source color is mapped to a point on or inside the destination gamut boundary. There are many possible strategies for achieving this mapping, such as projecting along the C* axis or projecting towards a constant point on the L* axis, and it is not necessary to discuss this matter in greater detail here. However, since the boundary of the destination gamut may now be highly irregular (see FIG. 10A), this may lead to difficulties with mapping to the "correct" point is now difficult and uncertain. To reduce or overcome this problem, a smoothing operation may be applied to the gamut boundary so that the "spikiness" of the boundary is reduced. One appropriate smoothing operation is two-dimensional modification of the algorithm set out in Balasubramanian and Dalal, "A method for quantifying the Color Gamut of an Output Device". In Color Imaging: Device-Independent Color, Color Hard Copy, and Graphic Arts II, volume 3018 of Proc. SPIE, (1997, San Jose, Calif.).

This smoothing operation may begin by inflating the source gamut boundary. To do this, define a point R on the L* axis, which is taken to be the mean of the L* values of the source gamut. The Euclidean distance D between points on the gamut and R, the normal vector d, and the maximum value of D which we denote $D_{max}$, may then be calculated. One can then calculate $$D' = D_{max}\left(\frac{D}{D_{max}}\right)^{\gamma}$$

where γ is a constant to control the degree of smoothing; the new C* and L* points corresponding to the inflated gamut boundary are then $$C^{*\prime} = D'd \text{ and}$$

$$L^{*\prime} = R + D'd.$$

Figure 10A:
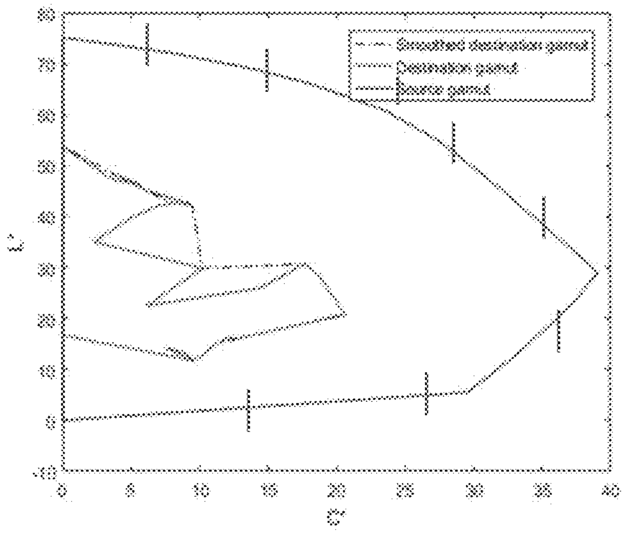
FIGS. 10A and 10B illustrate a smoothed destination gamut obtained after inflation/deflation operations in accordance with the present invention.
Figure 10B:
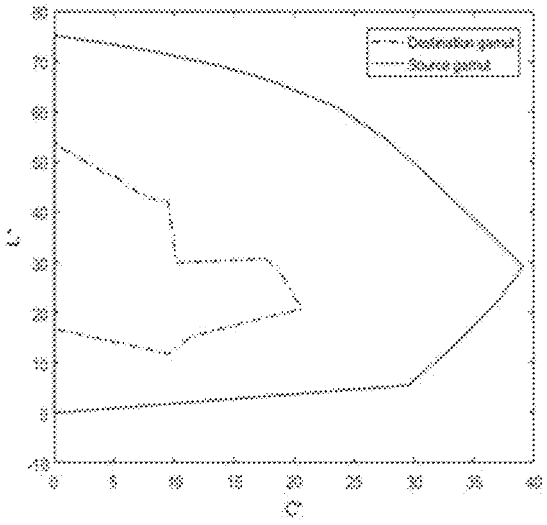

If we now take the convex hull of the inflated gamut boundary, and then effect a reverse transformation to obtain C* and L*, a smoothed gamut boundary is produced. As illustrated in FIG. 10A, the smoothed destination gamut follows the destination gamut boundary, with the exception of the gross concavities, and greatly simplifies the resultant gamut mapping operation in FIG. 10B.

The mapped color may now be calculated by:

$$a^* = C^*\cos(h^*) \text{ and}$$

$$b^* = C^*\cos(h^*)$$

and the (L*, a*, b*) coordinates can if desired be transformed back to the sRGB system.

This gamut mapping process is repeated for all colors in the source gamut, so that one can obtain a one-to-one mapping for source to destination colors. Preferably, one may sample 9×9×9=729 evenly-spaced colors in the sRGB source gamut; this is simply a convenience for hardware implementation.

DHHG Method

Figure 11:
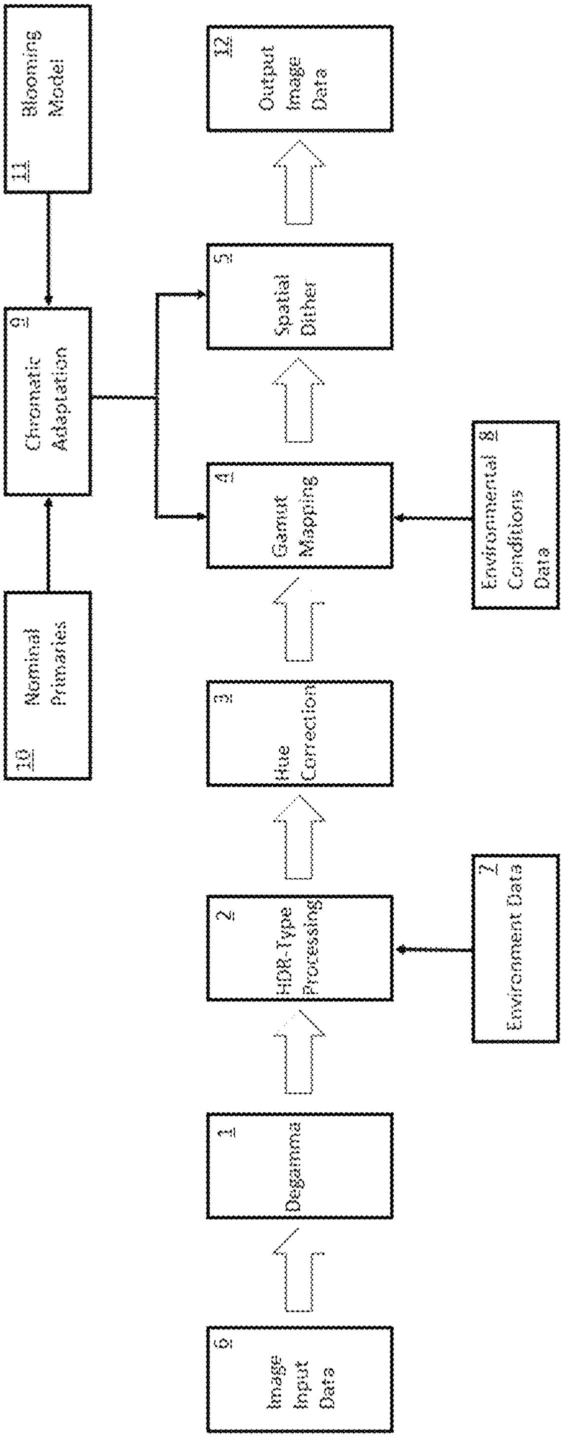
FIG. 11 is a schematic flow diagram of an overall color image rendering method for an electrophoretic display according to the present invention.

A DHHG method according to one embodiment of the present invention is illustrated in FIG. 11 of the accompanying drawings, which is a schematic flow diagram. The method illustrated in FIG. 11 may comprises at least five steps: a degamma operation, HDR-type processing, hue correction, gamut mapping, and a spatial dither; each step is discussed separately below.

1. Degamma Operation

In a first step of the method, a degamma operation (1) is applied to remove the power-law encoding in the input data associated with the input image (6), so that all subsequent color processing operations apply to linear pixel values. The degamma operation is preferably accomplished by using a 256-element lookup table (LUT) containing 16-bit values, which is addressed by an 8-bit sRGB input which is typically in the sRGB color space. Alternatively, if the display processor hardware allows, the operation could be performed by using an analytical formula. For example, the analytic definition of the sRGB degamma operation is $$C' = \begin{cases} \dfrac{C}{12.92} & C < 0.04045 \\ \left(\dfrac{C+a}{1+a}\right)^{2.4} & C > 0.04045 \end{cases} \tag{27}$$

where a=0.055, C corresponds to red, green or blue pixel values and C' are the corresponding de-gamma pixel values.

2. HDR-Type Processing

For color electrophoretic displays having a dithered architecture, dither artifacts at low greyscale values are often visible. This may be exacerbated upon application of a degamma operation, because the input RGB pixel values are effectively raised to an exponent of greater than unity by the degamma step. This has the effect of shifting pixel values to lower values, where dither artifacts become more visible.

To reduce the impact of these artifacts, it is preferable to employ tone-correction methods that act, either locally or globally, to increase the pixel values in dark areas. Such methods are well known to those of skill in the art in high-dynamic range (HDR) processing architectures, in which images captured or rendered with a very wide dynamic range are subsequently rendered for display on a low dynamic range display. Matching the dynamic range of the content and display is achieved by tone mapping, and often results in brightening of dark parts of the scene in order to prevent loss of detail.

Thus, it is an aspect of the HDR-type processing step (2) to treat the source sRGB content as HDR with respect to the color electrophoretic display so that the chance of objectionable dither artifacts in dark areas is minimized. Further, the types of color enhancement performed by HDR algorithms may provide the added benefit of maximizing color appearance for a color electrophoretic display.

As noted above, HDR rendering algorithms are known to those skilled in the art. The HDR-type processing step (2) in the methods according to the various embodiments of the present invention preferably contains as its constituent parts local tone mapping, chromatic adaptation, and local color enhancement. One example of an HDR rendering algorithm that may be employed as an HDR-type processing step is a variant of iCAM06, which is described in Kuang, Jiangtao et al. "iCAM06: A refined image appearance model for HDR image rendering." *J. Vis. Commun. Image R.* 18 (2007): 406-414, the entire contents of which are incorporated herein by reference.

It is typical for HDR-type algorithms to employ some information about the environment, such as scene luminance or viewer adaptation. As illustrated in FIG. 11, such information could be provided in the form of environment data (7) to the HDR-type processing step (2) in the rendering pipeline by a luminance-sensitive device and/or a proximity sensor, for example. The environment data (7) may come from the display itself, or it may be provided by a separate networked device, e.g., a local host, e.g., a mobile phone or tablet.

3. Hue Correction

Because HDR rendering algorithms may employ physical visual models, the algorithms can be prone to modifying the hue of the output image, such that it substantially differs from the hue of the original input image. This can be particularly noticeable in images containing memory colors. To prevent this effect, the methods according to the various embodiments of the present invention may include a hue correction stage (3) to ensure that the output of the HDR-type processing (2) has the same hue angle as the sRGB content of the input image (6). Hue correction algorithms are known to those of skill in the art. One example of a hue correction algorithm that may be employed in the hue correction stage (3) in the various embodiments of the present invention is described by Pouli, Tania et al. "Color Correction for Tone Reproduction" CIC21: Twenty-first Color and Imaging Conference, page 215-220—November 2013, the entire contents of which are incorporated herein by reference.

4. Gamut Mapping

Because the color gamut of a color electrophoretic display may be significantly smaller than the sRGB input of the input image (6), a gamut mapping stage (4) is included in the methods according the various embodiments of the present invention to map the input content into the color space of the display. The gamut mapping stage (4) may comprise a chromatic adaptation model (9) in which a number of nominal primaries (10) are assumed to constitute the gamut or a more complex model (11) involving adjacent pixel interaction ("blooming").

In one embodiment of the present invention, a gamut-mapped image is preferably derived from the sRGB-gamut input by means of a three-dimensional lookup table (3D LUT), such as the process described in Henry Kang, "Computational color technology", SPIE Press, 2006, the entire contents of which are incorporated herein by reference. Generally, the Gamut mapping stage (4) may be achieved by an offline transformation on discrete samples defined on source and destination gamuts, and the resulting transformed values are used to populate the 3D LUT. In one implementation, a 3D LUT which is 729 RGB elements long and uses a tetrahedral interpolation technique may be employed, such as the following example.

EXAMPLE

To obtain the transformed values for the 3D LUT, an evenly spaced set of sample points (R, G, B) in the source gamut is defined, where each of these (R, G, B) triples corresponds to an equivalent triple, (R', G', B'), in the output gamut. To find the relationship between (R, G, B) and (R', G', B') at points other than the sampling points, i.e. "arbitrary points", interpolation may be employed, preferably tetrahedral interpolation as described in greater detail below.

Figure 12:
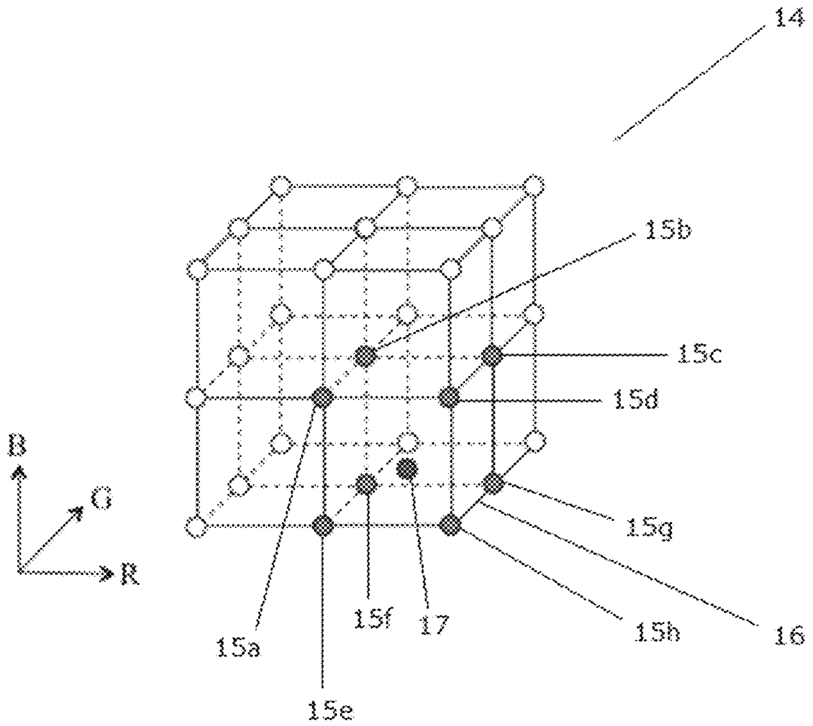
FIG. 12 is a graphic representation of a series of sample points for the input gamut triple (R, G, B) and output gamut triple (R', G', B').

For example, referring to FIG. 12, the input RGB color space is conceptually arranged in the form of a cube 14, and the set of points (R, G, B) (15*a-h*) lie at the vertices of a subcube (16); each (R, G, B) value (15*a-h*) has a corresponding (R' G' B') value in the output gamut. To find an output gamut value (R', G', B') for an arbitrary input gamut pixel value (R G B), as illustrated by the blue circle (17), we simply interpolate between the vertices (15*a-h*) of the subcube (16). In this way we, can find an (R', G', B') value for an arbitrary (R, G, B) using only a sparse sampling of the input and the output gamut. Further, the fact that (R, G, B) are evenly sampled makes the hardware implementation straightforward.

Figure 13:
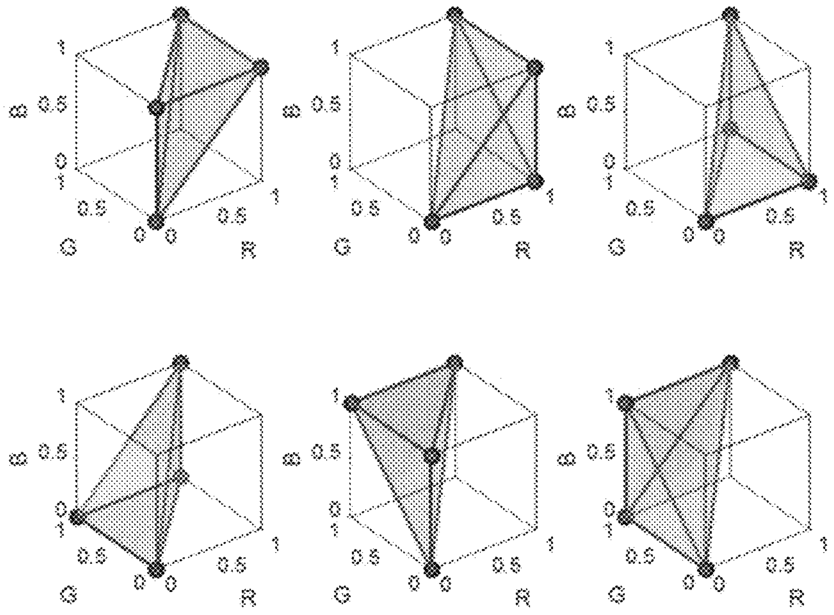
FIG. 13 is an illustration of the decomposition of a unit cube into six tetrahedra.

Interpolation within a subcube can be achieved by a number of methods. In a preferred method according to an embodiment of the present invention tetrahedral interpolation is utilized. Because a cube can be constructed from six tetrahedrons (see FIG. 13), the interpolation may be accomplished by locating the tetrahedron that encloses RGB and using barycentric interpolation to express RGB as weighted vertices of the enclosing tetrahedron.

The barycentric representation of a three-dimensional point in a tetrahedron with vertices $v_{1,2,3,4}$ is found by computing weights $\alpha_{1,2,3,4}/\alpha_0$ where $$\alpha_0 = \begin{vmatrix} v_1(1) & v_1(2) & v_1(3) & 1 \\ v_2(1) & v_2(2) & v_2(3) & 1 \\ v_3(1) & v_3(2) & v_3(3) & 1 \\ v_4(1) & v_4(2) & v_4(3) & 1 \end{vmatrix} \tag{28}$$

$$\alpha_1 = \begin{vmatrix} RGB(1) & RGB(2) & RGB(3) & 1 \\ v_2(1) & v_2(2) & v_2(3) & 1 \\ v_3(1) & v_3(2) & v_3(3) & 1 \\ v_4(1) & v_4(2) & v_4(3) & 1 \end{vmatrix} \tag{29}$$

$$\alpha_2 = \begin{vmatrix} v_1(1) & v_1(2) & v_1(3) & 1 \\ RGB(1) & RGB(2) & RGB(3) & 1 \\ v_3(1) & v_3(2) & v_3(3) & 1 \\ v_4(1) & v_4(2) & v_4(3) & 1 \end{vmatrix} \tag{30}$$

$$\alpha_3 = \begin{vmatrix} v_1(1) & v_1(2) & v_1(3) & 1 \\ v_2(1) & v_2(2) & v_2(3) & 1 \\ RGB(1) & RGB(2) & RGB(3) & 1 \\ v_4(1) & v_4(2) & v_4(3) & 1 \end{vmatrix} \tag{31}$$

$$\alpha_4 = \begin{vmatrix} v_1(1) & v_1(2) & v_1(3) & 1 \\ v_2(1) & v_2(2) & v_2(3) & 1 \\ v_3(1) & v_3(2) & v_3(3) & 1 \\ RGB(1) & RGB(2) & RGB(3) & 1 \end{vmatrix} \tag{32}$$

and $|\cdot|$ is the determinant Because $\alpha_0=1$, the barycentric representation is provided by Equation (33)

$$RGB = [\,\alpha_1 \quad \alpha_2 \quad \alpha_3 \quad \alpha_4\,] \begin{bmatrix} v_1 \\ v_2 \\ v_3 \\ v_4 \end{bmatrix} \tag{33}$$

Equation (33) provides the weights used to express RGB in terms of the tetrahedron vertices of the input gamut. Thus, the same weights can be used to interpolate between the R'G'B' values at those vertices. Because the correspondence between the RGB and R'G'B' vertex values provides the values to populate the 3D LUT, Equation (33) may be converted to Equation (34):

$$R'G'B' = [\alpha_1 \quad \alpha_2 \quad \alpha_3 \quad \alpha_4] \begin{bmatrix} LUT(v_1) \\ LUT(v_2) \\ LUT(v_3) \\ LUT(v_4) \end{bmatrix} \tag{34}$$

where $LUT(v_{1,2,3,4})$ are the RGB values of the output color space at the sampling vertices used for the input color space.

For hardware implementation, the input and output color spaces are sampled using $n^3$ vertices, which requires $(n-1)^3$ unit cubes. In a preferred embodiment, n=9 to provide a reasonable compromise between interpolation accuracy and computational complexity. The hardware implementation may proceed according to the following steps:

1.1 Finding the Subcube

First, the enclosing subcube triple, $RGB_0$, is found by computing $$RGB_0(i) = \left\lfloor \frac{RGB(i)}{32} \right\rfloor \tag{35}$$

where RGB is the input RGB triple and $\lfloor\cdot\rfloor$ is the floor operator and $1 \le i \le 3$. The offset within the cube, rgb, is then found from $$rgb(i) = \begin{cases} 32 & RGB(i) = 255 \\ RGB(i) - 32 \times RGB_0(i) & \text{otherwise} \end{cases} \tag{36}$$

wherein, $0 \le RGB_0(i) \le 7$ and $0 \le rgb(i) \le 31$, if n=9.

1.2 Barycentric Computations

Because the tetrahedron vertices $v_{1,2,3,4}$ are known in advance, Equations (28)-(34) may be simplified by computing the determinants explicitly. Only one of six cases needs to be computed:

rgb(1)>rgb(2) and rgb(3)>rgb(1)

$$\alpha=[32-rgb(3)\, rgb(3)-rgb(1)\, rgb(1)-rgb(2)\, rgb(2)]$$

$$v_1=[0\ 0\ 0]$$

$$v_2=[0\ 0\ 1]$$

$$v_3=[1\ 0\ 1]$$

$$v_4=[1\ 1\ 1] \tag{37}$$

rgb(1)>rgb(2) and rgb(3)>rgb(2)

$$\alpha=[32-rgb(1)\, rgb(1)-rgb(3)\, rgb(3)-rgb(2)\, rgb(2)]$$

$$v_1=[0\ 0\ 0]$$

$$v_2=[1\ 0\ 0]$$

$$v_3=[1\ 0\ 1]$$

$$v_4=[1\ 1\ 1] \tag{38}$$

rgb(1)>rgb(2) and rgb(3)<rgb(2)

$$\alpha=[32-rgb(1)\, rgb(1)-rgb(2)\, rgb(2)-rgb(3)\, rgb(3)]$$

$$v_1=[0\ 0\ 0]$$

$$v_2=[1\ 0\ 0]$$

$$v_3=[1\ 1\ 0]$$

$$v_4=[1\ 1\ 1] \tag{39}$$

rgb(1)<rgb(2) and rgb(1)>rgb(3)

$$\alpha=[32-rgb(2)\, rgb(2)-rgb(1)\, rgb(1)-rgb(3)\, rgb(3)]$$

$$v_1=[0\ 0\ 0]$$

$$v_2=[0\ 1\ 0]$$

$$v_3=[0\ 1\ 1]$$

$$v_4=[1\ 1\ 1] \tag{40}$$

rgb(1)<rgb(2) and rgb(3)>rgb(2)

$$\alpha=[32-rgb(3)\, rgb(3)-rgb(1)\, rgb(2)-rgb(1)\, rgb(1)]$$

$$v_1=[0\ 0\ 0]$$

$$v_2=[0\ 0\ 1]$$

$$v_3=[0\ 1\ 1]$$

$$v_4=[1\ 1\ 1] \tag{41}$$

rgb(1)<rgb(2) and rgb(2)>rgb(3)

$$\alpha=[32-rgb(2)\, rgb(2)-rgb(3)\, rgb(3)-rgb(1)\, rgb(1)]$$

$$v_1=[0\ 0\ 0]$$

$$v_2=[0\ 1\ 0]$$

$$v_3=[0\ 1\ 1]$$

$$v_4=[1\ 1\ 1] \tag{42}$$

1.3 LUT Indexing

Because the input color space samples are evenly spaced, the corresponding destination color space samples contained in the 3D LUT, LUT(v1,2,3,4), are provided according to Equations (43), $$LUT(v_1)=LUT(81\times RGB_0(1)+9\times RGB_0(2)+RGB_0(3)$$

$$LUT(v_2)=LUT(81\times(RGB_0(1)+v_2(1))+9\times(RGB_0(2)+v_2(2))+(RG$$

$$LUT(v_3)=LUT(81\times(RGB_0(1)+v_3(1))+9\times(RGB_0(2)+v_3(2))+(RG$$

$$LUT(v_4)=LUT(81\times(RGB_0(1)+v_4(1))+9\times(RGB_0(2)+v_4(2))+(RG \tag{43}$$

1.4 Interpolation

In a final step, the R' G' B' values may be determined from Equation (17), $$R'G'B' = \frac{1}{32}[\alpha_1 \quad \alpha_2 \quad \alpha_3 \quad \alpha_4] \begin{bmatrix} LUT(v_1) \\ LUT(v_2) \\ LUT(v_3) \\ LUT(v_4) \end{bmatrix}. \tag{44}$$

As noted above, a chromatic adaptation step (9) may also be incorporated into the processing pipeline to correct for display of white levels in the output image. The white point provided by the white pigment of a color electrophoretic display may be significantly different from the white point assumed in the color space of the input image. To address this difference, the display may either maintain the input color space white point, in which case the white state is dithered, or shift the color space white point to that of the white pigment. The latter operation is achieved by chromatic adaptation, and may substantially reduce dither noise in the white state at the expense of a white point shift.

The Gamut mapping stage (4) may also be parameterized by the environmental conditions in which the display is used. The CIECAM color space, for example, contains parameters to account for both display and ambient brightness and degree of adaptation. Therefore, in one implementation, the Gamut mapping stage (4) may be controlled by environmental conditions data (8) from an external sensor.

5. Spatial Dither

The final stage in the processing pipeline for the production of the output image data (12) is a spatial dither (5). Any of a number of spatial dithering algorithms known to those of skill in the art may be employed as the spatial dither stage (5) including, but not limited to those described above. When a dithered image is viewed at a sufficient distance, the individual colored pixels are merged by the human visual system into perceived uniform colors. Because of the trade-off between color depth and spatial resolution, dithered images, when viewed closely, have a characteristic graininess as compared to images in which the color palette available at each pixel location has the same depth as that required to render images on the display as a whole. However, dithering reduces the presence of color-banding which is often more objectionable than graininess, especially when viewed at a distance.

Algorithms for assigning particular colors to particular pixels have been developed in order to avoid unpleasant patterns and textures in images rendered by dithering. Such algorithms may involve error diffusion, a technique in which error resulting from the difference between the color required at a certain pixel and the closest color in the per-pixel palette (i.e., the quantization residual) is distributed to neighboring pixels that have not yet been processed. European Patent No. 0677950 describes such techniques in detail, while U.S. Pat. No. 5,880,857 describes a metric for comparison of dithering techniques. U.S. Pat. No. 5,880,857 is incorporated herein by reference in its entirety.

From the foregoing, it will be seen that DHHG method of the present invention differs from previous image rendering methods for color electrophoretic displays in at least two respects. Firstly, rendering methods according to the various embodiments of the present invention treat the image input data content as if it were a high dynamic range signal with respect to the narrow-gamut, low dynamic range nature of the color electrophoretic display so that a very wide range of content can be rendered without deleterious artifacts. Secondly, the rendering methods according to the various embodiments of the present invention provide alternate methods for adjusting the image output based on external environmental conditions as monitored by proximity or luminance sensors. This provides enhanced usability benefits—for example, the image processing is modified to account for the display being near/far to the viewer's face or the ambient conditions being dark or bright.

Remote Image Rendering System

As already mentioned, this invention provides an image rendering system including an electro-optic display (which may be an electrophoretic display, especially an electronic paper display) and a remote processor connected via a network. The display includes an environmental condition sensor, and is configured to provide environmental condition information to the remote processor via the network. The remote processor is configured to receive image data, receive environmental condition information from the display via the network, render the image data for display on the display under the reported environmental condition, thereby creating rendered image data, and transmit the rendered image data. In some embodiments, the image rendering system includes a layer of electrophoretic display material disposed between first and second electrodes, wherein at least one of the electrodes being light transmissive. The electrophoretic display medium typically includes charged pigment particles that move when an electric potential is applied between the electrodes. Often, the charged pigment particles comprise more than on color, for example, white, cyan, magenta, and yellow charged pigments. When four sets of charged particles are present, the first and third sets of particles may have a first charge polarity, and the second and fourth sets may have a second charge polarity. Furthermore, the first and third sets may have different charge magnitudes, while the second and fourth sets have different charge magnitudes.

The invention is not limited to four particle electrophoretic displays, however. For example, the display may comprises a color filter array. The color filter array may be paired with a number of different media, for example, electrophoretic media, electrochromic media, reflective liquid crystals, or colored liquids, e.g., an electrowetting device. In some embodiments, an electrowetting device may not include a color filter array, but may include pixels of colored electrowetting liquids.

In some embodiments, the environmental condition sensor senses a parameter selected from temperature, humidity, incident light intensity, and incident light spectrum. In some embodiments, the display is configured to receive the rendered image data transmitted by the remote processor and update the image on the display. In some embodiments, the rendered image data is received by a local host and then transmitted from the local host to the display. Sometimes, the rendered image data is transmitted from the local host to the electronic paper display wirelessly. Optionally, the local host additionally receives environmental condition information from the display wirelessly. In some instances, the local host additionally transmits the environmental condition information from the display to the remote processor. Typically, the remote processor is a server computer connected to the internet. In some embodiments, the image rendering system also includes a docking station configured to receive the rendered image data transmitted by the remote processor and update the image on the display when the display and the docking station are in contact.

It should be noted that the changes in the rendering of the image dependent upon an environmental temperature parameter may include a change in the number of primaries with which the image is rendered. Blooming is a complicated function of the electrical permeability of various materials present in an electro-optic medium, the viscosity of the fluid (in the case of electrophoretic media) and other temperature-dependent properties, so, not surprisingly, blooming itself is strongly temperature dependent. It has been found empirically that color electrophoretic displays can operate effectively only within limited temperature ranges (typically of the order of 50 C.°) and that blooming can vary significantly over much smaller temperature intervals.

It is well known to those skilled in electro-optic display technology that blooming can give rise to a change in the achievable display gamut because, at some spatially intermediate point between adjacent pixels using different dithered primaries, blooming can give rise to a color which deviates significantly from the expected average of the two. In production, this non-ideality can be handled by defining different display gamuts for different temperature range, each gamut accounting for the blooming strength at that temperature range. As the temperature changes and a new temperature range is entered, the rendering process should automatically re-render the image to account for the change in display gamut.

As operating temperature increases, the contribution from blooming may become so severe that it is not possible to maintain adequate display performance using the same number of primaries as at lower temperature. Accordingly, the rendering methods and apparatus of the present invention may be arranged to that, as the sensed temperature varies, not only the display gamut but also the number of primaries is varied. At room temperature, for example, the methods may render an image using 32 primaries because the blooming contribution is manageable; at higher temperatures, for example, it may only be possible to use 16 primaries.

In practice, a rendering system of the present invention can be provided with a number of differing pre-computed 3D lookup tables (3D LUTs) each corresponding to a nominal display gamut in a given temperature range, and for each temperature range with a list of P primaries, and a blooming model having P×P entries. As a temperature range threshold is crossed, the rendering engine is notified and the image is re-rendered according to the new gamut and list of primaries. Since the rendering method of the present invention can handle an arbitrary number of primaries, and any arbitrary blooming model, the use of multiple lookup tables, list of primaries and blooming models depending upon temperature provides an important degree of freedom for optimizing performance on rendering systems of the invention.

Also as already mentioned, the invention provides an image rendering system including an electro-optic display, a local host, and a remote processor, wherein the three components are connected via a network. The local host includes an environmental condition sensor, and is configured to provide environmental condition information to the remote processor via the network. The remote processor is configured to receive image data, receive environmental condition information from the local host via the network, render the image data for display on the display under the reported environmental condition, thereby creating rendered image data, and transmit the rendered image data. In some embodiments, the image rendering system includes a layer of electrophoretic display medium disposed between first and second electrodes, at least one of the electrodes being light transmissive. In some embodiments, the local host may also send the image data to the remote processor.

Also as already mentioned, the invention includes a docking station comprising an interface for coupling with an electro-optic display. The docking station is configured to receive rendered image data via a network and to update an image on the display with the rendered image data. Typically, the docking station includes a power supply for providing a plurality of voltages to an electronic paper display. In some embodiments, the power supply is configured to provide three different magnitudes of positive and of negative voltage in addition to a zero voltage.

Thus, the invention provides a system for rendering image data for presentation on a display. Because the image rendering computations are done remotely (e.g., via a remote processor ore server, for example in the cloud) the amount of electronics needed for image presentation is reduced. Accordingly, a display for use in the system needs only the imaging medium, a backplane including pixels, a front plane, a small amount of cache, some power storage, and a network connection. In some instances, the display may interface through a physical connection, e.g., via a docking station or dongle. The remote processor will receive information about the environment of the electronic paper, for example, temperature. The environmental information is then input into a pipeline to produce a primary set for the display. Images received by the remote processor is then rendered for optimum viewing, i.e., rendered image data. The rendered image data are then sent to the display to create the image thereon.

Figure 14:
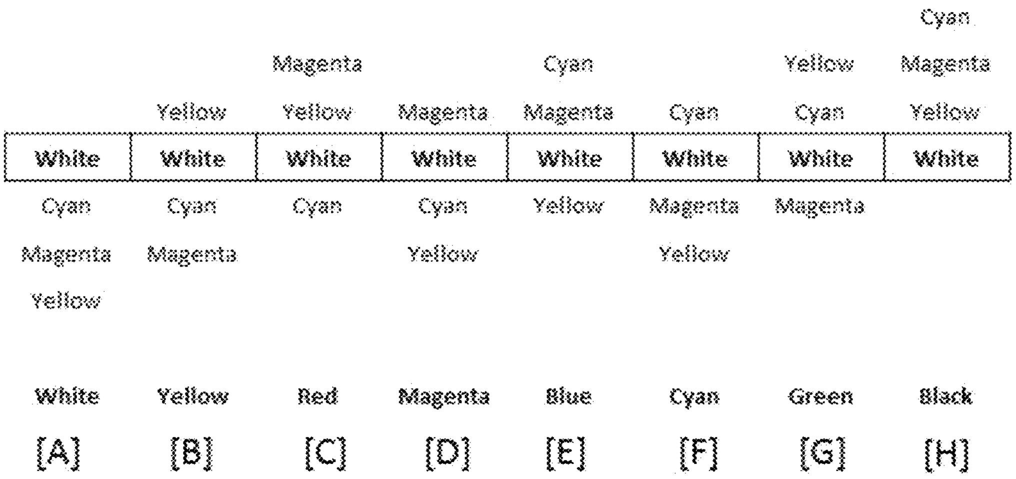
FIG. 14 is a schematic cross-section showing the positions of the various particles in an electrophoretic medium which may be driven by the methods of the present invention, and may be used in the rendering systems of the present invention, the electrophoretic medium being illustrated when displaying black, white, the three subtractive primary and the three additive primary colors.

In a preferred embodiment, the imaging medium will be a colored electrophoretic display of the type described in U.S. Patent Publication Nos. 2016/0085132 and 2016/0091770, which describe a four particle system, typically comprising white, yellow, cyan, and magenta pigments. Each pigment has a unique combination of charge polarity and magnitude, for example +high, +low, −low, and −high. As shown in FIG. 14, the combination of pigments can be made to present white, yellow, red, magenta, blue, cyan, green, and black to a viewer. The viewing surface of the display is at the top (as illustrated), i.e., a user views the display from this direction, and light is incident from this direction. In preferred embodiments only one of the four particles used in the electrophoretic medium substantially scatters light, and in FIG. 14 this particle is assumed to be the white pigment. Basically, this light-scattering white particle forms a white reflector against which any particles above the white particles (as illustrated in FIG. 14) are viewed. Light entering the viewing surface of the display passes through these particles, is reflected from the white particles, passes back through these particles and emerges from the display. Thus, the particles above the white particles may absorb various colors and the color appearing to the user is that resulting from the combination of particles above the white particles. Any particles disposed below (behind from the user's point of view) the white particles are masked by the white particles and do not affect the color displayed. Because the second, third and fourth particles are substantially non-light-scattering, their order or arrangement relative to each other is unimportant, but for reasons already stated, their order or arrangement with respect to the white (light-scattering) particles is critical.

More specifically, when the cyan, magenta and yellow particles lie below the white particles (Situation [A] in FIG. 14), there are no particles above the white particles and the pixel simply displays a white color. When a single particle is above the white particles, the color of that single particle is displayed, yellow, magenta and cyan in Situations [B], [D] and [F] respectively in FIG. 14. When two particles lie above the white particles, the color displayed is a combination of those of these two particles; in FIG. 14, in Situation [C], magenta and yellow particles display a red color, in Situation [E], cyan and magenta particles display a blue color, and in Situation [G], yellow and cyan particles display a green color. Finally, when all three colored particles lie above the white particles (Situation [H] in FIG. 14), all the incoming light is absorbed by the three subtractive primary colored particles and the pixel displays a black color.

It is possible that one subtractive primary color could be rendered by a particle that scatters light, so that the display would comprise two types of light-scattering particle, one of which would be white and another colored. In this case, however, the position of the light-scattering colored particle with respect to the other colored particles overlying the white particle would be important. For example, in rendering the color black (when all three colored particles lie over the white particles) the scattering colored particle cannot lie over the non-scattering colored particles (otherwise they will be partially or completely hidden behind the scattering particle and the color rendered will be that of the scattering colored particle, not black).

FIG. 14 shows an idealized situation in which the colors are uncontaminated (i.e., the light-scattering white particles completely mask any particles lying behind the white particles). In practice, the masking by the white particles may be imperfect so that there may be some small absorption of light by a particle that ideally would be completely masked. Such contamination typically reduces both the lightness and the chroma of the color being rendered. In the electrophoretic medium used in the rendering system of the present invention, such color contamination should be minimized to the point that the colors formed are commensurate with an industry standard for color rendition. A particularly favored standard is SNAP (the standard for newspaper advertising production), which specifies L*, a* and b* values for each of the eight primary colors referred to above. (Hereinafter, "primary colors" will be used to refer to the eight colors, black, white, the three subtractive primaries and the three additive primaries as shown in FIG. 14.)

Methods for electrophoretically arranging a plurality of different colored particles in "layers" as shown in FIG. 14 have been described in the prior art. The simplest of such methods involves "racing" pigments having different electrophoretic mobilities; see for example U.S. Pat. No. 8,040,594. Such a race is more complex than might at first be appreciated, since the motion of charged pigments itself changes the electric fields experienced locally within the electrophoretic fluid. For example, as positively-charged particles move towards the cathode and negatively-charged particles towards the anode, their charges screen the electric field experienced by charged particles midway between the two electrodes. It is thought that, while pigment racing is involved in the electrophoretic media used in systems of the present invention, it is not the sole phenomenon responsible for the arrangements of particles illustrated in FIG. 14.

A second phenomenon that may be employed to control the motion of a plurality of particles is hetero-aggregation between different pigment types; see, for example, US 2014/0092465. Such aggregation may be charge-mediated (Coulombic) or may arise as a result of, for example, hydrogen bonding or van der Waals interactions. The strength of the interaction may be influenced by choice of surface treatment of the pigment particles. For example, Coulombic interactions may be weakened when the closest distance of approach of oppositely-charged particles is maximized by a steric barrier (typically a polymer grafted or adsorbed to the surface of one or both particles). In media used in the systems of the present invention, such polymeric barriers are used on the first and second types of particles, and may or may not be used on the third and fourth types of particles.

A third phenomenon that may be exploited to control the motion of a plurality of particles is voltage- or current-dependent mobility, as described in detail in the aforementioned application Ser. No. 14/277,107.

Figure 15:
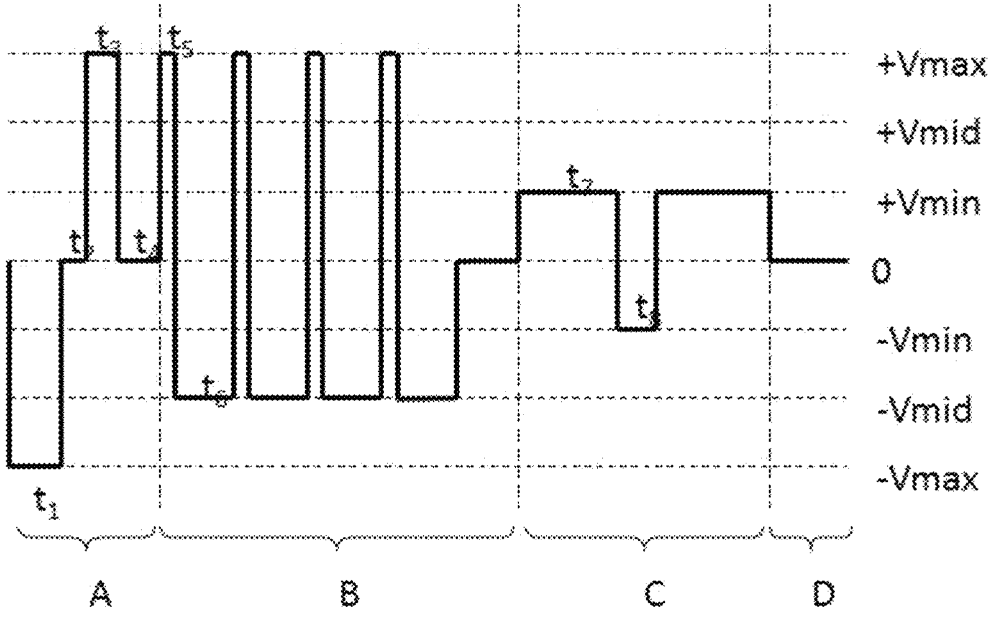
FIG. 15 illustrates a waveform that may be used to drive the four-color electrophoretic medium of FIG. 14 to an exemplary color state.

The driving mechanisms to create the colors at the individual pixels are not straightforward, and typically involve a complex series of voltage pulses (a.k.a. waveforms) as shown in FIG. 15. The general principles used in production of the eight primary colors (white, black, cyan, magenta, yellow, red, green and blue) using this second drive scheme applied to a display of the present invention (such as that shown in FIG. 14) will now be described. It will be assumed that the first pigment is white, the second cyan, the third yellow and the fourth magenta. It will be clear to one of ordinary skill in the art that the colors exhibited by the display will change if the assignment of pigment colors is changed.

The greatest positive and negative voltages (designated ±Vmax in FIG. 15) applied to the pixel electrodes produce respectively the color formed by a mixture of the second and fourth particles, or the third particles alone. These blue and yellow colors are not necessarily the best blue and yellow attainable by the display. The mid-level positive and negative voltages (designated ±Vmid in FIG. 15) applied to the pixel electrodes produce colors that are black and white, respectively.

From these blue, yellow, black or white optical states, the other four primary colors may be obtained by moving only the second particles (in this case the cyan particles) relative to the first particles (in this case the white particles), which is achieved using the lowest applied voltages (designated ±Vmin in FIG. 15). Thus, moving cyan out of blue (by applying −Vmin to the pixel electrodes) produces magenta (cf. FIG. 14, Situations [E] and [D] for blue and magenta respectively); moving cyan into yellow (by applying +Vmin to the pixel electrodes) provides green (cf. FIG. 14, Situations [B] and [G] for yellow and green respectively); moving cyan out of black (by applying −Vmin to the pixel electrodes) provides red (cf. FIG. 14, Situations [H] and [C] for black and red respectively), and moving cyan into white (by applying +Vmin to the pixel electrodes) provides cyan (cf. FIG. 14, Situations [A] and [F] for white and cyan respectively).

While these general principles are useful in the construction of waveforms to produce particular colors in displays of the present invention, in practice the ideal behavior described above may not be observed, and modifications to the basic scheme are desirably employed.

A generic waveform embodying modifications of the basic principles described above is illustrated in FIG. 15, in which the abscissa represents time (in arbitrary units) and the ordinate represents the voltage difference between a pixel electrode and the common front electrode. The magnitudes of the three positive voltages used in the drive scheme illustrated in FIG. 15 may lie between about +3V and +30V, and of the three negative voltages between about −3V and −30V. In one empirically preferred embodiment, the highest positive voltage, +Vmax, is +24V, the medium positive voltage, +Vmid, is 12V, and the lowest positive voltage, +Vmin, is 5V. In a similar manner, negative voltages −Vmax, −Vmid and −Vmin are; in a preferred embodiment −24V, −12V and −9V. It is not necessary that the magnitudes of the voltages |+V|=|−V| for any of the three voltage levels, although it may be preferable in some cases that this be so.

There are four distinct phases in the generic waveform illustrated in FIG. 15. In the first phase ("A" in FIG. 15), there are supplied pulses (wherein "pulse" signifies a monopole square wave, i.e., the application of a constant voltage for a predetermined time) at +Vmax and −Vmax that serve to erase the previous image rendered on the display (i.e., to "reset" the display). The lengths of these pulses ($t_1$ and $t_3$) and of the rests (i.e., periods of zero voltage between them ($t_2$ and $t_4$) may be chosen so that the entire waveform (i.e., the integral of voltage with respect to time over the whole waveform as illustrated in FIG. 15) is DC balanced (i.e., the integral is substantially zero). DC balance can be achieved by adjusting the lengths of the pulses and rests in phase A so that the net impulse supplied in this phase is equal in magnitude and opposite in sign to the net impulse supplied in the combination of phases B and C, during which phases, as described below, the display is switched to a particular desired color.

The waveform shown in FIG. 15 is purely for the purpose of illustration of the structure of a generic waveform, and is not intended to limit the scope of the invention in any way. Thus, in FIG. 15 a negative pulse is shown preceding a positive pulse in phase A, but this is not a requirement of the invention. It is also not a requirement that there be only a single negative and a single positive pulse in phase A.

As described above, the generic waveform is intrinsically DC balanced, and this may be preferred in certain embodiments of the invention. Alternatively, the pulses in phase A may provide DC balance to a series of color transitions rather than to a single transition, in a manner similar to that provided in certain black and white displays of the prior art; see for example U.S. Pat. No. 7,453,445.

In the second phase of the waveform (phase B in FIG. 15) there are supplied pulses that use the maximum and medium voltage amplitudes. In this phase the colors white, black, magenta, red and yellow are preferably rendered. More generally, in this phase of the waveform the colors corresponding to particles of type 1 (assuming that the white particles are negatively charged), the combination of particles of types 2, 3, and 4 (black), particles of type 4 (magenta), the combination of particles of types 3 and 4 (red) and particles of type 3 (yellow), are formed.

As described above, white may be rendered by a pulse or a plurality of pulses at −Vmid. In some cases, however, the white color produced in this way may be contaminated by the yellow pigment and appear pale yellow. In order to correct this color contamination, it may be necessary to introduce some pulses of a positive polarity. Thus, for example, white may be obtained by a single instance or a repetition of instances of a sequence of pulses comprising a pulse with length $T_1$ and amplitude +Vmax or +Vmid followed by a pulse with length $T_2$ and amplitude −Vmid, where $T_2>T_1$. The final pulse should be a negative pulse. In FIG. 15 there are shown four repetitions of a sequence of +Vmax for time $t_5$ followed by −Vmid for time $t_6$. During this sequence of pulses, the appearance of the display oscillates between a magenta color (although typically not an ideal magenta color) and white (i.e., the color white will be preceded by a state of lower L* and higher a* than the final white state).

As described above, black may be obtained by a rendered by a pulse or a plurality of pulses (separated by periods of zero voltage) at +Vmid.

As described above, magenta may be obtained by a single instance or a repetition of instances of a sequence of pulses comprising a pulse with length $T_3$ and amplitude +Vmax or +Vmid, followed by a pulse with length $T_4$ and amplitude −Vmid, where $T_4>T_3$. To produce magenta, the net impulse in this phase of the waveform should be more positive than the net impulse used to produce white. During the sequence of pulses used to produce magenta, the display will oscillate between states that are essentially blue and magenta. The color magenta will be preceded by a state of more negative a* and lower L* than the final magenta state.

As described above, red may be obtained by a single instance or a repetition of instances of a sequence of pulses comprising a pulse with length $T_5$ and amplitude +Vmax or +Vmid, followed by a pulse with length $T_6$ and amplitude −Vmax or −Vmid. To produce red, the net impulse should be more positive than the net impulse used to produce white or yellow. Preferably, to produce red, the positive and negative voltages used are substantially of the same magnitude (either both Vmax or both Vmid), the length of the positive pulse is longer than the length of the negative pulse, and the final pulse is a negative pulse. During the sequence of pulses used to produce red, the display will oscillate between states that are essentially black and red. The color red will be preceded by a state of lower L*, lower a*, and lower b* than the final red state.

Yellow may be obtained by a single instance or a repetition of instances of a sequence of pulses comprising a pulse with length $T_7$ and amplitude +Vmax or +Vmid, followed by a pulse with length $T_8$ and amplitude −Vmax. The final pulse should be a negative pulse. Alternatively, as described above, the color yellow may be obtained by a single pulse or a plurality of pulses at −Vmax.

In the third phase of the waveform (phase C in FIG. 15) there are supplied pulses that use the medium and minimum voltage amplitudes. In this phase of the waveform the colors blue and cyan are produced following a drive towards white in the second phase of the waveform, and the color green is produced following a drive towards yellow in the second phase of the waveform. Thus, when the waveform transients of a display of the present invention are observed, the colors blue and cyan will be preceded by a color in which b* is more positive than the b* value of the eventual cyan or blue color, and the color green will be preceded by a more yellow color in which L* is higher and a* and b* are more positive than L*, a* and b* of the eventual green color. More generally, when a display of the present invention is rendering the color corresponding to the colored one of the first and second particles, that state will be preceded by a state that is essentially white (i.e., having C* less than about 5). When a display of the present invention is rendering the color corresponding to the combination of the colored one of the first and second particles and the particle of the third and fourth particles that has the opposite charge to this particle, the display will first render essentially the color of the particle of the third and fourth particles that has the opposite charge to the colored one of the first and second particles.

Typically, cyan and green will be produced by a pulse sequence in which +Vmin must be used. This is because it is only at this minimum positive voltage that the cyan pigment can be moved independently of the magenta and yellow pigments relative to the white pigment. Such a motion of the cyan pigment is necessary to render cyan starting from white or green starting from yellow.

Finally, in the fourth phase of the waveform (phase D in FIG. 15) there is supplied a zero voltage.

Although the display shown in FIG. 14 has been described as producing the eight primary colors, in practice, it is preferred that as many colors as possible be produced at the pixel level. A full color gray scale image may then be rendered by dithering between these colors, using techniques well known to those skilled in imaging technology. For example, in addition to the eight primary colors produced as described above, the display may be configured to render an additional eight colors. In one embodiment, these additional colors are: light red, light green, light blue, dark cyan, dark magenta, dark yellow, and two levels of gray between black and white. The terms "light" and "dark" as used in this context refer to colors having substantially the same hue angle in a color space such as CIE L*a*b* as the reference color but a higher or lower L*, respectively.

In general, light colors are obtained in the same manner as dark colors, but using waveforms having slightly different net impulse in phases B and C. Thus, for example, light red, light green and light blue waveforms have a more negative net impulse in phases B and C than the corresponding red, green and blue waveforms, whereas dark cyan, dark magenta, and dark yellow have a more positive net impulse in phases B and C than the corresponding cyan, magenta and yellow waveforms. The change in net impulse may be achieved by altering the lengths of pulses, the number of pulses, or the magnitudes of pulses in phases B and C.

Gray colors are typically achieved by a sequence of pulses oscillating between low or mid voltages.

It will be clear to one of ordinary skill in the art that in a display of the invention driven using a thin-film transistor (TFT) array the available time increments on the abscissa of FIG. 15 will typically be quantized by the frame rate of the display. Likewise, it will be clear that the display is addressed by changing the potential of the pixel electrodes relative to the front electrode and that this may be accomplished by changing the potential of either the pixel electrodes or the front electrode, or both. In the present state of the art, typically a matrix of pixel electrodes is present on the backplane, whereas the front electrode is common to all pixels. Therefore, when the potential of the front electrode is changed, the addressing of all pixels is affected. The basic structure of the waveform described above with reference to FIG. 15 is the same whether or not varying voltages are applied to the front electrode.

The generic waveform illustrated in FIG. 15 requires that the driving electronics provide as many as seven different voltages to the data lines during the update of a selected row of the display. While multi-level source drivers capable of delivering seven different voltages are available, many commercially-available source drivers for electrophoretic displays permit only three different voltages to be delivered during a single frame (typically a positive voltage, zero, and a negative voltage). Herein the term "frame" refers to a single update of all the rows in the display. It is possible to modify the generic waveform of FIG. 15 to accommodate a three level source driver architecture provided that the three voltages supplied to the panel (typically +V, 0 and −V) can be changed from one frame to the next. (i.e., such that, for example, in frame n voltages (+Vmax, 0, −Vmin) could be supplied while in frame n+1 voltages (+Vmid, 0, −Vmax) could be supplied).

Since the changes to the voltages supplied to the source drivers affect every pixel, the waveform needs to be modified accordingly, so that the waveform used to produce each color must be aligned with the voltages supplied. The addition of dithering and grayscales further complicates the set of image data that must be generated to produce the desired image.

Figure 16:
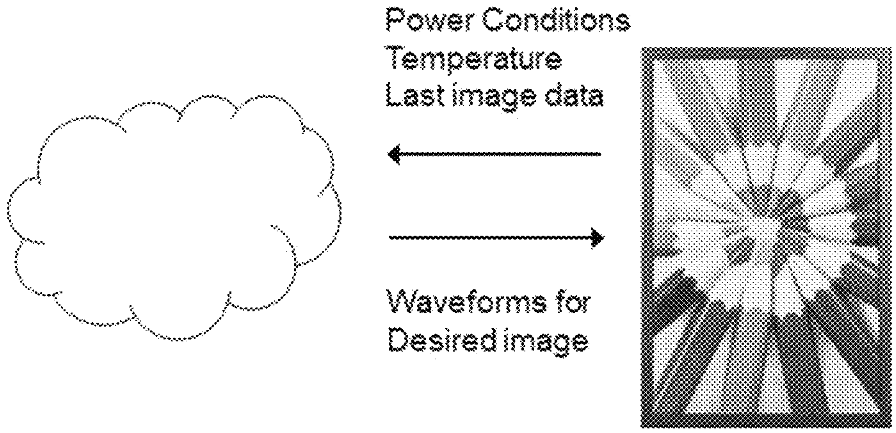
FIG. 16 illustrates a remote image rendering system of the invention whereby an electro-optic display interacts with a remote processor.

An exemplary pipeline for rendering image data (e.g., a bitmap file) has been described above with reference to FIG. 11. This pipeline comprises five steps: a degamma operation, HDR-type processing, hue correction, gamut mapping, and a spatial dither, and together these five steps represent a substantial computational load. The RIRS of the invention provides a solution for removing these complex calculations from a processor that is actually integrated into the display, for example, a color photo frame. Accordingly, the cost and bulk of the display are diminished, which may allow for, e.g., light-weight flexible displays. A simple embodiment is shown in FIG. 16, whereby the display communicates directly with the remote processor via a wireless internet connection. As shown in FIG. 16, the display sends environmental data to the remote processor, which uses the environmental data as in input to e.g., gamma correction. The remote processor then returns rendered image data, which may be in the form of waveform commands.

Figure 17:
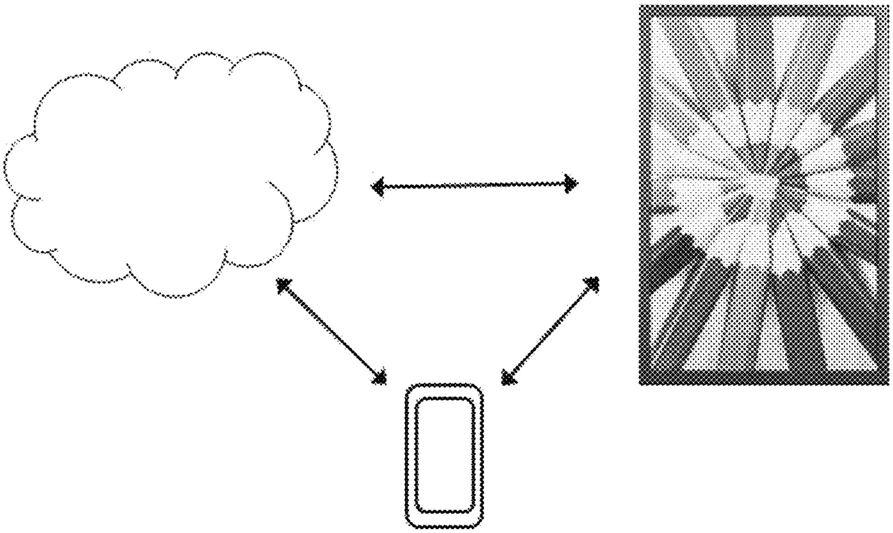
FIG. 17 illustrates an RIRS of the invention whereby an electro-optic display interacts with a remote processor and a local host.
Figure 18:
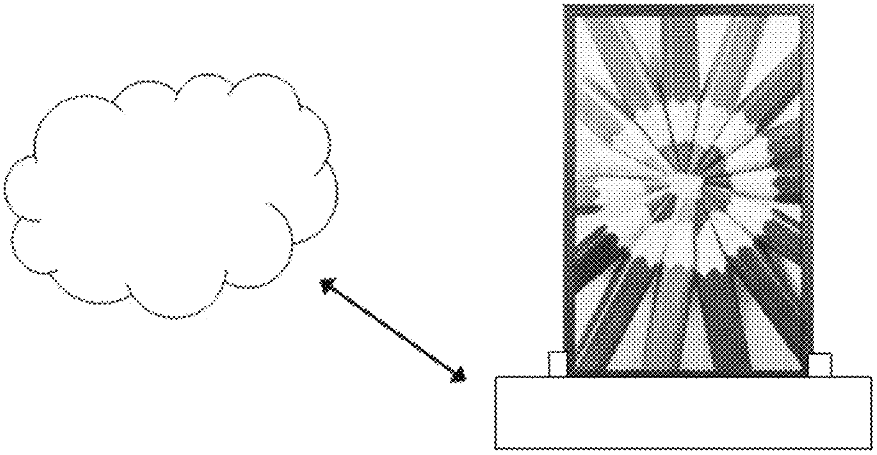
FIG. 18 illustrates an RIRS of the invention whereby an electro-optic display interacts with a remote processor via a docking station, which may also act as a local host and may include a power supply to charge the electro-optic display and to cause it to update to display the rendered image data.

A variety of alternative architectures are available, as evidenced by FIGS. 17 and 18. In FIG. 17, a local host serves as an intermediary between the electronic paper and the remote processor. The local host may additionally be the source of the original image data, e.g., a picture taken with a mobile phone camera. The local host may receive environmental data from the display, or the local host may provide the environmental data using its sensors. Optionally, both the display and the local host will communicate directly with the remote processor. The local host may also be incorporated into a docking station, as shown in FIG. 18. The docking station may have a wired internet connection and a physical connection to the display. The docking station may also have a power supply to provide the various voltages needed to provide a waveform similar to that shown in FIG. 15. By moving the power supply off the display, the display can be made inexpensive and there is little requirement for external power. The display may also be coupled to the docking station via a wire or ribbon cable.

Figure 19:
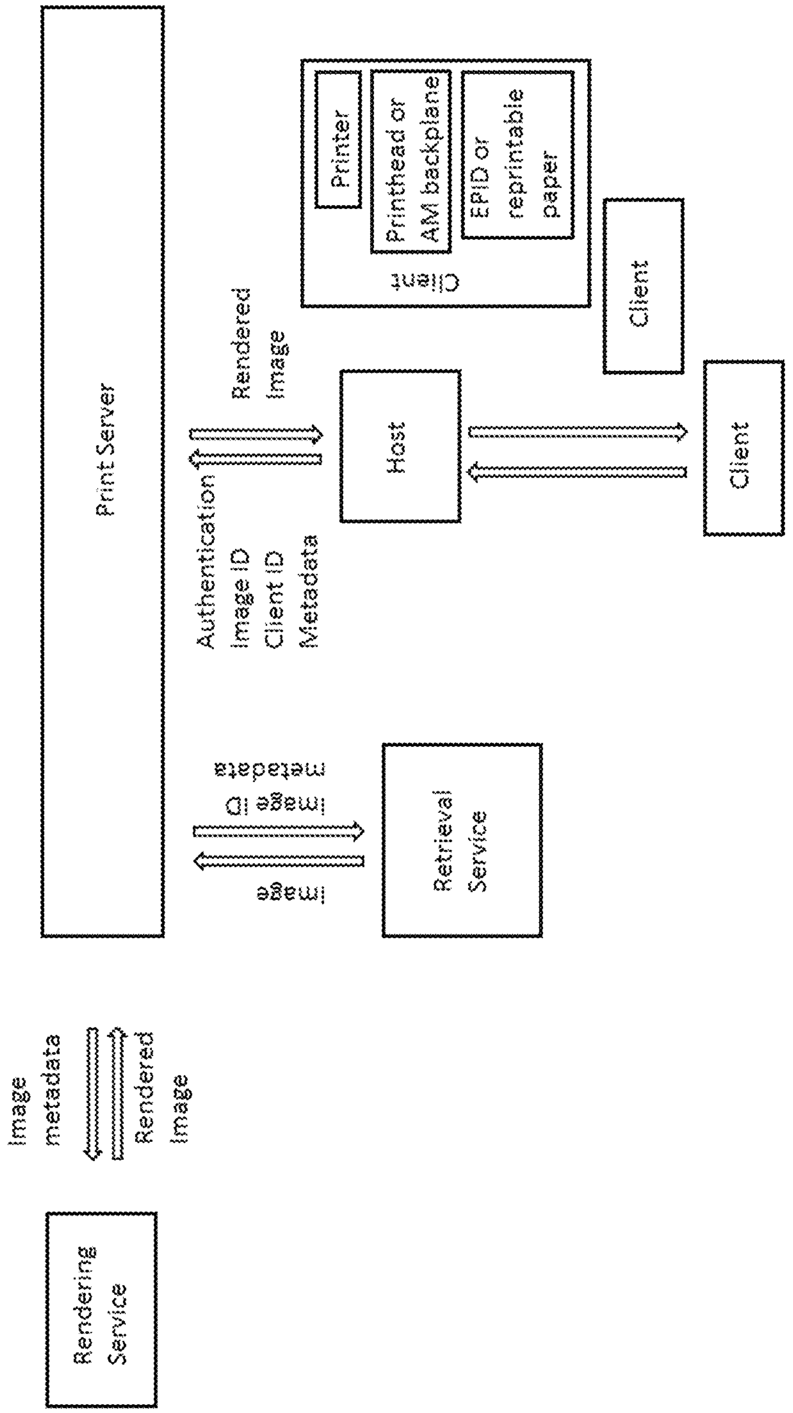
FIG. 19 is a block diagram of a more elaborate RIRS of the present invention which includes various additional components.

A "real world" embodiment is shown in FIG. 19, in which each display is referred to as the "client". Each "client" has a unique ID and reports metadata about its performance (such as temperature, print status, electrophoretic ink version, etc.) to a "host" using a method that is preferably a low power/power sipping communication protocol. In this embodiment, the "host" is a personal mobile device (smart phone, tablet, AR headset or laptop) running a software application. The "host" is able to communicate with a "print server" and the "client". In one embodiment, the "print server" is a cloud based solution that is able to communicate with the "host" and offer the "host" a variety of services like authentication, image retrieval and rendering.

When users decide to display an image on the "client" (the display), they open an application on their "host" (mobile device) and pick out the image they wish to display and the specific "client" they want to display it on. The "host" then polls that particular "client" for its unique device ID and metadata. As mentioned above, this transaction may be over a short range power sipping protocol like Bluetooth 4. Once the "host" has the device ID and metadata, it combines that with the user's authentication, and the image ID and sends it to the "print server" over a wireless connection.

Having received the authentication, the image ID, the client ID and metadata, the "print server" then retrieves the image from a database. This database could be a distributed storage volume (like another cloud) or it could be internal to the "print server". Images might have been previously uploaded to the image database by the user, or may be stock images or images available for purchase. Having retrieved the user-selected image from storage, the "print server" performs a rendering operation which modifies the retrieved image to display correctly on the "client". The rendering operation may be performed on the "print server" or it may be accessed via a separate software protocol on a dedicated cloud based rendering server (offering a "rendering service"). It may also be resource efficient to render all the user's images ahead of time and store them in the image database itself. In that case the "print server" would simply have a LUT indexed by client metadata and retrieve the correct pre-rendered image. Having procured a rendered image, the "print server" will send this data back to the "host" and the "host" will communicate this information to the "client" via the same power sipping communication protocol described earlier.

In the case of the four color electrophoretic system described with respect to FIGS. 14 and 15 (also known as advanced color electronic paper, or ACeP) this image rendering uses as inputs the color information associated with a particular electrophoretic medium as driven using particular waveforms (that could either have been preloaded onto the ACeP module or would be transmitted from the server) along with the user-selected image itself. The user-selected image might be in any of several standard RGB formats (JPG, TIFF, etc.). The output, processed image is an indexed image having, for example, 5 bits per pixel of the ACeP display module. This image could be in a proprietary format and could be compressed.

On the "client" an image controller will take the processed image data, where it may be stored, placed into a queue for display, or directly displayed on the ACeP screen. After the display "printing" is complete the "client" will communicate appropriate metadata with the "host" and the "host" will relay that to the "print server". All metadata will be logged in the data volume that stores the images.

FIG. 19 shows a data flow in which the "host" may be a phone, tablet, PC, etc., the client is an ACeP module, and the print server resides in the cloud. It is also possible that the print server and the host could be the same machine, e.g., a PC. As described previously, the local host may also be integrated into a docking station. It is also possible that the host communicates with the client and the cloud to request an image to be rendered, and that subsequently the print server communicates the processed image directly to the client without the intervention of the host.

A variation on this embodiment which may be more suitable for electronic signage or shelf label applications revolves around removing the "host" from the transactions. In this embodiment the "print server" will communicate directly with the "client" over the internet.

Certain specific embodiments will now be described. In one of these embodiments, the color information associated with particular waveforms that is an input to the image processing (as described above) will vary, as the waveforms that are chosen may depend upon the temperature of the ACeP module. Thus, the same user-selected image may result in several different processed images, each appropriate to a particular temperature range. One option is for the host to convey to the print server information about the temperature of the client, and for the client to receive only the appropriate image. Alternatively, the client might receive several processed images, each associated with a possible temperature range. Another possibility is that a mobile host might estimate the temperature of a nearby client using information extracted from its on-board temperature sensors and/or light sensors.

In another embodiment, the waveform mode, or the image rendering mode, might be variable depending on the preference of the user. For example, the user might choose a high-contrast waveform/rendering option, or a high-speed, lower-contrast option. It might even be possible that a new waveform mode becomes available after the ACeP module has been installed. In these cases, metadata concerning waveform and/or rendering mode would be sent from the host to the print server, and once again appropriately processed images, possibly accompanied by waveforms, would be sent to the client.

The host would be updated by a cloud server as to the available waveform modes and rendering modes.

The location where ACeP module-specific information is stored may vary. This information may reside in the print server, indexed by, for example, a serial number that would be sent along with an image request from the host. Alternatively, this information may reside in the ACeP module itself.

The information transmitted from the host to the print server may be encrypted, and the information relayed from the server to the rendering service may also be encrypted. The metadata may contain an encryption key to facilitate encryption and decryption.

From the foregoing, it will be seen that the present invention can provide improved color in limited palette displays with fewer artifacts than are obtained using conventional error diffusion techniques. The present invention differs fundamentally from the prior art in adjusting the primaries prior to the quantization, whereas the prior art (as described above with reference to FIG. 1) first effects thresholding and only introduces the effect of dot overlap or other inter-pixel interactions during the subsequent calculation of the error to be diffused. The "look-ahead" or "pre-adjustment" technique used in the present method gives important advantages where the blooming or other inter-pixel interactions are strong and non-monotonic, helps to stabilize the output from the method and dramatically reduces the variance of this output. The present invention also provides a simple model of inter-pixel interactions that considers adjacent neighbors independently. This allows for causal and fast processing and reduces the number of model parameters that need to be estimated, which is important for a large number (say 32 or more) primaries. The prior art did not consider independent neighbor interactions because the physical dot overlap usually covered a large fraction of a pixel (whereas in ECD displays it is a narrow but intense band along the pixel edge), and did not consider a large number of primaries because a printer would typically have few.

For further details of color display systems to which the present invention can be applied, the reader is directed to the aforementioned ECD patents (which also give detailed discussions of electrophoretic displays) and to the following patents and publications: U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,182,646; 9,195,111; 9,199,441; 9,268,191; 9,285,649; 9,293,511; 9,341,916; 9,360,733; 9,361,836; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340736; 2014/0362213; 2015/0103394; 2015/0118390; 2015/0124345; 2015/0198858; 2015/

0234250; 2015/0268531; 2015/0301246; 2016/0011484; 2016/0026062; 2016/0048054; 2016/0116816; 2016/0116818; and 2016/0140909.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An image rendering system comprising:

an electro-optic display comprising an environmental condition sensor;

a remote processor connected to the electro-optic display via a network, the remote processor being configured to receive image data, and to receive environmental condition data from the sensor via the network, render the image data for display on the electro-optic display under the received environmental condition data, thereby creating rendered image data, and to transmit the rendered image data to the electro-optic display via the network; and a number of differing pre-computed 3D lookup tables (3D LUTs) each corresponding to a nominal display gamut in a given environmental condition data range.

2. The image rendering system of claim 1, wherein the electro-optic display comprises a layer of electrophoretic display material comprising electrically charged particles disposed in a fluid and capable of moving through the fluid on application of an electric field to the fluid, the electrophoretic display material being disposed between first and second electrodes, at least one of the electrodes being light-transmissive.

3. The image rendering system of claim 2, wherein the electrophoretic display material comprises four types of charged particles having differing colors.

4. An image rendering system including an electro-optic display, a local host, and a remote processor, all connected via a network, the local host comprising an environmental condition sensor, and being configured to provide environmental condition data to the remote processor via the network, and the remote processor being configured to receive image data, receive the environmental condition data from the local host via the network, render the image data for display on the electronic paper display under the received environmental condition data, thereby creating rendered image data, and to transmit the rendered image data.

5. The image rendering system of claim 4, wherein the electro-optic display comprises a layer of electrophoretic display material comprising electrically charged particles disposed in a fluid and capable of moving through the fluid on application of an electric field to the fluid, the electrophoretic display material being disposed between first and second electrodes, at least one of the electrodes being light-transmissive.

6. The image rendering system of claim 4, wherein the local host transmits the image data to the remote processor.

* * * * *